US012769372B2

(12) United States Patent
Yi

(10) Patent No.: US 12,769,372 B2
(45) Date of Patent: Oct. 20, 2026

(54) PHOTOGRAPHING METHOD AND ELECTRONIC DEVICE

(71) Applicant: HONOR DEVICE CO., LTD., Shenzhen (CN)

(72) Inventor: Jie Yi, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 19/330,226

(22) Filed: Sep. 16, 2025

(65) Prior Publication Data

US 2026/0016861 A1 Jan. 15, 2026

Related U.S. Application Data

(63) Continuation of application No. PCT/CN2024/079349, filed on Feb. 29, 2024.

(30) Foreign Application Priority Data

Jul. 12, 2023 (CN) ......................... 202310855290.7

(51) Int. Cl.

| | |
|---|---|
| ***G06F 1/16*** | (2006.01) |
| ***H04M 1/02*** | (2006.01) |
| ***H04M 1/72454*** | (2021.01) |

(52) U.S. Cl.

CPC .......... *G06F 1/1677* (2013.01); *G06F 1/1652* (2013.01); *G06F 1/1686* (2013.01); (Continued)

(58) Field of Classification Search

CPC .... G06F 1/1677; G06F 1/1652; G06F 1/1686; G06F 1/1647; G06F 1/1618; H04M 1/0216; H04M 1/0245; H04M 1/0268; H04M 1/72454; H04M 1/0243; H04M 2250/52; H04M 2250/16; H04M 1/0214; H04M 1/0264; H04M 1/725; H04N 23/631; H04N 23/63; H04N 23/531; H04N 23/663

See application file for complete search history.

(56) References Cited

U.S. PATENT DOCUMENTS

2020/0389578 A1 12/2020 Lee et al.
2023/0044497 A1 2/2023 Zhang et al.

(Continued)

FOREIGN PATENT DOCUMENTS

CN 107613196 A 1/2018
CN 107682635 A 2/2018

(Continued)

*Primary Examiner* — Douglas Wilson

(74) *Attorney, Agent, or Firm* — WOMBLE BOND DICKINSON (US) LLP

(57) ABSTRACT

Embodiments of this application provide a photographing method and an electronic device. The method is applied to an electronic device. The method includes: receiving a first operation of a user when the electronic device is in a folded state, a first screen is in a screen-on state, and a second screen is in a screen-off state; and in response to the first operation, controlling to turn off the first screen and turn on the second screen, and displaying a first photographing preview interface by using the second screen, where the first photographing preview interface includes an image obtained by using the rear-facing camera.

20 Claims, 70 Drawing Sheets

(52) U.S. Cl.
CPC ....... *H04M 1/0216* (2013.01); *H04M 1/0245* (2013.01); *H04M 1/0268* (2013.01); *H04M 1/72454* (2021.01); *H04M 1/0243* (2013.01); *H04M 2250/52* (2013.01)

(56) References Cited

U.S. PATENT DOCUMENTS

| | | | | |
|---|---|---|---|---|
| 2023/0185334 | A1 | 6/2023 | Liao et al. | |
| 2023/0215312 | A1 | 7/2023 | Park et al. | |
| 2023/0221861 | A1 | 7/2023 | Chen et al. | |
| 2024/0155222 | A1* | 5/2024 | Jiang .................. | H04M 1/0214 |
| 2025/0071410 | A1 | 2/2025 | Jang et al. | |

FOREIGN PATENT DOCUMENTS

| | | | |
|---|---|---|---|
| CN | 110290235 | A | 9/2019 |
| CN | 111263005 | A | 6/2020 |
| CN | 114679538 | A | 6/2022 |
| CN | 115002879 | A | 9/2022 |
| CN | 116027886 | A | 4/2023 |
| CN | 116048436 | A | 5/2023 |
| CN | 116055853 | A | 5/2023 |
| CN | 117714568 | A | 3/2024 |
| EP | 3761616 | A1 | 1/2021 |
| EP | 3920008 | A1 | 12/2021 |
| EP | 3985955 | A1 | 4/2022 |
| WO | 2021141287 | A1 | 7/2021 |

* cited by examiner

FIG. 4B
1x
2
Video recording
Photograph
Portrait
Night scene
Large aperture

FIG. 5B
1x
2
Large aperture
Night scene
Portrait
Photograph
Video recording
More

CONT. FROM FIG. 8A

TO FIG. 8C

CONT. FROM FIG. 8B

TO FIG. 8D

CONT. FROM FIG. 8D

CONT. FROM

CONT. FROM

TO FIG. 11C

CONT. FROM

CONT. FROM FIG. 11C

CONT. FROM FIG. 13A

TO FIG. 13C

CONT. FROM

CONT. FROM FIG. 14A

TO FIG. 14C

CONT. FROM

CONT. FROM FIG. 14C

CONT. FROM

TO

CONT. FROM FIG. 16A

TO FIG. 16C

CONT. FROM

CONT. FROM FIG. 17A

TO FIG. 17C

CONT. FROM

CONT. FROM FIG. 17C

TO FIG. 18B

FIG. 18B
1801
AI
–5
1x
5
10
Movie
Video recording
Photograph
Portrait
Night scene

CONT. FROM FIG. 18A

CONT. FROM

CONT.
FROM

TO FIG. 20C

CONT. FROM FIG. 20B

CONT. FROM FIG. 21A

TO FIG. 21C

CONT. FROM FIG. 21B

TO FIG. 21D

CONT. FROM

TO FIG.
21F

CONT. FROM FIG. 22A

CONT. FROM FIG. 23B

Front surface

Back surface

TO FIG. 24B

CONT. FROM

TO FIG. 24C

CONT. FROM

PHOTOGRAPHING METHOD AND ELECTRONIC DEVICE

CROSS-REFERENCE TO RELATED APPLICATIONS

This application is a continuation of International Application No. PCT/CN2024/079349, filed on Feb. 29, 2024, which claims priority to Chinese Patent Application No. 202310855290.7, filed on Jul. 12, 2023, both of which are incorporated herein by reference in their entireties.

TECHNICAL FIELD

This application relates to the field of electronic technologies, and specifically, to a photographing method and an electronic device.

BACKGROUND

As requirements of people on display and portability of mobile phones gradually increase, foldable mobile phones are increasingly favored by users.

The foldable mobile phone includes a front-facing camera and a rear-facing camera. Generally, when the foldable mobile phone is used to take a selfie, only the front-facing camera can be used for photographing, resulting in a poor photographing effect.

SUMMARY

This application provides a photographing method, an apparatus, an electronic device, a chip, a computer-readable storage medium, and a computer program product, so that a selfie effect and user experience can be improved.

According to a first aspect, this application provides a photographing method. The method is performed by an electronic device. The electronic device includes a foldable screen and a rear-facing camera. The foldable screen includes a first screen and a second screen. The rear-facing camera is disposed away from the first screen. The first screen and the second screen are located on a same side when the electronic device is in an unfolded state. The second screen and the rear-facing camera are located on a same side when the electronic device is in a folded state. The method includes:

receiving a first operation of a user when the electronic device is in the folded state, the first screen is in a screen-on state, and the second screen is in a screen-off state; and in response to the first operation, controlling to turn off the first screen and turn on the second screen, and displaying a first photographing preview interface by using the second screen, where the first photographing preview interface includes an image obtained by using the rear-facing camera.

The electronic device may be an outward-foldable device, such as an outward-foldable mobile phone. The first screen is also referred to as a home screen, and the second screen is also referred to as a sub screen. Optionally, the first screen and the first screen may be two parts of one foldable screen.

The first photographing preview interface is a photographing preview interface in a rear-facing selfie scenario.

Optionally, the first operation may be any one of the following operations: tapping a rear-facing selfie control, flipping the electronic device, tapping a selfie icon or a selfie option on a main interface, exiting a camera setting interface after a rear-facing selfie function is enabled on the camera setting interface, or exiting a camera setting interface after a default selfie manner is set to rear-facing selfie on the camera setting interface.

According to the photographing method provided in the first aspect, when the electronic device is in the folded state, the first screen is in the screen-on state, and the second screen is in the screen-off state, the user may trigger, through the first operation, to enter the rear-facing selfie function. To be specific, the first screen of the electronic device is turned off, the second screen is turned on, and the first photographing preview interface in the rear-facing selfie scenario is displayed by using the second screen. Because the second screen and the rear-facing camera are located on the same side in the folded state, the user may photograph a person or an object (that is, a selfie) on a side of the user by using the rear-facing camera, and view the first photographing preview interface on the second screen, to facilitate taking a selfie by the user. In addition, the image photographed by the rear-facing camera is displayed on the first photographing preview interface, that is, the image is obtained by using the rear-facing camera in the rear-facing selfie scenario. A specification, a hardware configuration, and the like of the rear-facing camera are high, the photographed image has high quality, a photographing effect is good, and user experience can be improved.

In a possible implementation, before the receiving a first operation of a user, the method further includes: displaying a second photographing preview interface by using the first screen, where the second photographing preview interface includes a first control, and the first operation is an operation performed on the first control.

The second photographing preview interface may be a photographing preview interface in a rear-facing non-selfie scenario, or may be a photographing preview interface in a front-facing selfie scenario. In other words, the user may enter the rear-facing selfie function through the first operation performed on the first control in the rear-facing non-selfie scenario. Alternatively, the user may enter the rear-facing selfie function through the first operation performed on the first control in the front-facing selfie scenario.

The operation performed on the first control may be, for example, tapping the first control. When the user enters the rear-facing selfie function in the rear-facing non-selfie scenario, the first control may be, for example, a rear-facing selfie control on the photographing preview interface in the rear-facing non-selfie scenario, and the operation performed on the first control may be tapping the rear-facing selfie control. When the user enters the rear-facing selfie function in the front-facing selfie scenario, the first control may be, for example, a setting control or a rear-facing selfie control on the photographing preview interface in the rear-facing non-selfie scenario. When the first control is the setting control, the operation performed on the first control may sequentially include tapping the setting control (where the camera setting interface is entered after the tapping), turning on a switch of the rear-facing selfie function or selecting the rear-facing selfie as the selfie manner, and exiting the camera setting interface. When the first control is the rear-facing selfie control, the first operation may be tapping the rear-facing selfie control.

In this implementation, the user can quickly enter the rear-facing selfie function through the first operation performed on the first control, to facilitate operation and improve the user experience.

In a possible implementation, the electronic device further includes a front-facing camera. The front-facing camera and the first screen are located on a same side. The second photographing preview interface includes the image obtained by using the rear-facing camera or an image obtained by using the front-facing camera.

When the second photographing preview interface includes the image obtained by the rear-facing camera, corresponding to that the rear-facing selfie function is entered in the rear-facing non-selfie scenario, the second photographing preview interface is the photographing preview interface in the rear-facing non-selfie scenario. When the second photographing preview interface includes the image obtained by the front-facing camera, corresponding to that the rear-facing selfie function is entered in the front-facing selfie scenario, the second photographing preview interface is the photographing preview interface in the front-facing selfie scenario.

In this implementation, the user enters the rear-facing selfie function from the front-facing selfie scenario, or can enter the rear-facing selfie function from the rear-facing selfie scenario, so that a plurality of manners of entering the rear-facing selfie function are provided for the user, thereby facilitating the operation of the user and improving the user experience.

In a possible implementation, the in response to the first operation, controlling to turn off the first screen and turn on the second screen, and displaying a first photographing preview interface by using the second screen includes: in response to the first operation, displaying a first flipping guidance interface by using the first screen, where the first flipping guidance interface is used to guide the user to flip the electronic device; and after the first flipping guidance interface is displayed for first preset duration, controlling to turn off the first screen and turn on the second screen, and displaying the first photographing preview interface by using the second screen.

In this implementation, when the rear-facing selfie is entered, before a screen is controlled to be switched, the first flipping guidance interface is first displayed, to guide the user to flip the electronic device, so that the user learns a manner of using the rear-facing selfie function, and the user experience is improved.

Optionally, when the first flipping guidance interface is displayed on the second screen, the electronic device may shield touch functions of the first screen and the second screen, in other words, the touch functions of the first screen and the second screen are shielded within preset duration (such as 3*s*) after the user performs the first operation. In this way, a case in which entering the rear-facing selfie function is affected by accidental touch of the user can be avoided, and the user experience is improved.

In a possible implementation, the second photographing preview interface includes the image obtained by using the rear-facing camera. The second photographing preview interface further includes guidance information, and the guidance information is used to guide the user to tap the first control.

In this implementation, the guidance information is displayed to guide the user to use the rear-facing selfie function, so that the user learns a method of using the rear-facing selfie function, and the user experience is improved.

In a possible implementation, the second photographing preview interface includes the image obtained by the rear-facing camera. The method further includes: additionally displaying a second control on the second photographing preview interface in response to a second operation performed by the user on the first control.

Optionally, the second control may be a slide-up operation performed on a region in which the first control is located. The second control is a camera flipping control. The second control is tapped to enter the front-facing selfie scenario.

In this implementation, the user triggers, through the second operation, to additionally display the second control on the interface. In this way, the interface includes both the first control used to enter the rear-facing selfie function and the second control used to enter the front-facing selfie scenario. In this way, the user can select rear-facing selfie or front-facing selfie based on a use requirement, thereby facilitating use by the user and improving the user experience.

In a possible implementation, the second photographing preview interface includes the image obtained by the rear-facing camera, and the second photographing preview interface further includes a setting control. The method further includes: when the second photographing preview interface is displayed on the first screen, in response to a third operation performed by the user on the setting control, displaying a camera setting interface by using the first screen, where the camera setting interface includes a setting option of a selfie manner; displaying a first pop-up window in response to an operation performed by the user on the setting option, where the first pop-up window includes a front-facing selfie option and a rear-facing selfie option, and the rear-facing selfie option is in a selected state; in response to an operation performed by the user on the front-facing selfie option, displaying the rear-facing selfie option in an unselected state, and displaying the front-facing selfie option in the selected state; and in response to an operation of closing the first pop-up window and exiting the camera setting interface by the user, displaying a third photographing preview interface by using the first screen, where the third photographing preview interface includes the image obtained by the rear-facing camera and the second control.

In other words, in the rear-facing non-selfie scenario, the user selects the front-facing selfie option in the first pop-up window, and changes a default selfie manner from the rear-facing selfie to the front-facing selfie. In this way, after the user exits the camera setting interface, a photographing scenario is still the rear-facing non-selfie scenario, but a control displayed on the interface is changed to the second control (a camera switching control). The user taps the camera switching control to enter the front-facing selfie scenario. In this implementation, the user may actively select the default selfie manner, and the control on the photographing preview interface is changed based on selection of the user, so that display of the interface more conforms to habit selection of the user, and the user experience is improved.

In a possible implementation, the method further includes: in response to tapping the second control by the user, displaying a fourth photographing preview interface by using the first screen, where the fourth photographing preview interface includes the image obtained by using the front-facing camera.

The fourth photographing preview interface is a photographing preview interface in the front-facing selfie scenario.

In a possible implementation, the fourth photographing preview interface includes the first control. The method further includes: in response to a fourth operation performed by the user on the first control on the fourth photographing preview interface, displaying the first flipping guidance interface by using the first screen, where the first flipping guidance interface is used to guide the user to flip the electronic device; and after the first flipping guidance interface is displayed for the first preset duration, controlling to turn off the first screen and turn on the second screen, and displaying the first photographing preview interface by using the second screen.

Optionally, the first control may be the rear-facing selfie control or the setting control. The fourth operation may be an operation such as tapping the rear-facing selfie control or setting the selfie manner by using the setting control.

In a possible implementation, before the receiving a first operation of a user, the method further includes: displaying a second photographing preview interface by using the first screen, where the first operation is an operation of flipping the electronic device.

In this implementation, the user may enter the rear-facing selfie function by flipping the electronic device, and the user does not need to perform an operation such as tapping the rear-facing selfie control on the interface, so that the rear-facing selfie function can be entered quickly and conveniently, thereby improving intelligence of the electronic device, and further improving the user experience.

In a possible implementation, the second photographing preview interface includes the image obtained by using the rear-facing camera.

In other words, the user may enter the rear-facing selfie function from the rear-facing selfie scenario by flipping the electronic device.

In a possible implementation, a photographing mode on the first photographing preview interface is the same as a photographing mode on the second photographing preview interface.

For example, when the photographing mode selected by the user on the first photographing preview interface is a portrait mode, the photographing mode on the second photographing preview interface is also the portrait mode, so that selection of the user can be inherited, and the user experience is improved. Certainly, after entering the rear-facing selfie function, the user may alternatively switch the photographing mode to another mode as required.

In a possible implementation, before the receiving a first operation of a user, the method further includes: displaying a main interface by using the first screen, where the main interface includes an icon of a camera application; and in response to long pressing the icon of the camera application by the user, displaying a first service card by using the first screen, where the first service card includes a selfie option, and the first operation is tapping the selfie option.

In this implementation, the user may enter the rear-facing selfie function by using the selfie option on the main interface, and the user does not need to perform operations such as opening the second photographing preview interface and tapping the rear-facing selfie control or the setting control on the second photographing preview interface, so that an operation process of entering the rear-facing selfie function by the user is simplified, and the user experience is improved.

In a possible implementation, before the receiving a first operation of a user, the method further includes: displaying a main interface by using the first screen, where the main interface includes an icon of a camera application; in response to tapping the icon of the camera application by the user, displaying a first service card by using the first screen, where the first service card includes a selfie option; and in response to dragging the selfie option to the main interface by the user, displaying, on the main interface, a selfie icon corresponding to the selfie option, where the first operation is tapping the selfie icon.

In this implementation, the user may enter the rear-facing selfie function by using the selfie icon on the main interface, and the user does not need to perform operations such as opening the second photographing preview interface and tapping the rear-facing selfie control or the setting control on the second photographing preview interface, so that an operation process of entering the rear-facing selfie function by the user is simplified, and the user experience is improved.

In a possible implementation, the in response to the first operation, controlling to turn off the first screen and turn on the second screen, and displaying a first photographing preview interface by using the second screen includes: starting the camera application in response to the first operation; displaying a first flipping guidance interface by using the first screen, where the first flipping guidance interface is used to guide the user to flip the electronic device; and after the first flipping guidance interface is displayed for first preset duration, controlling to turn off the first screen and turn on the second screen, and displaying the first photographing preview interface by using the second screen.

In this implementation, the first flipping guidance interface is displayed to guide the user to use the rear-facing selfie function, so that the user learns a method of using the rear-facing selfie function, and the user experience is improved.

In a possible implementation, the method further includes: when the first photographing preview interface is displayed on the second screen, in response to a fourth operation performed by the user on the first screen, exiting the camera application to a background; controlling to turn off the second screen and turn on the first screen; in response to the fourth operation performed by the user on the first screen, controlling to run the camera application at a foreground, and displaying the first flipping guidance interface by using the first screen; after the first flipping guidance interface is displayed for the first preset duration, controlling to turn off the first screen and turn on the second screen, and displaying the first photographing preview interface by using the second screen.

The fourth operation is an operation of exiting the camera application to the background. In this implementation, if the user exits the camera application to the background application, the electronic device may maintain a memory of running of the camera application. When the user starts the camera application again, the rear-facing selfie function continues to run. In this way, for the user, the user does not need to perform repeated operations to enter the rear-facing selfie function, so that the user operation is simplified, and the user experience is improved.

In a possible implementation, the first photographing preview interface includes a third control, and the third control includes a thumbnail. The method further includes: when the first photographing preview interface is displayed on the second screen, in response to tapping the third control by the user, displaying a first interface by using the second screen, where the first interface includes an image corresponding to the thumbnail.

The third control is a thumbnail of an image photographed by the user in the photographing preview interface. The first interface is an image preview interface in the folded state.

In this implementation, in a process in which the user uses the rear-facing selfie function, the user may view the photographed image through the image thumbnail on the first photographing preview interface. The image may be displayed by using the second screen. In this way, the user can view the image at any time without exiting the rear-facing selfie function, thereby facilitating use of the user, and improving the user experience.

In a possible implementation, the method further includes: when the first interface is displayed on the second screen, in response to unfolding the electronic device to the unfolded state by the user, controlling to turn on the first screen, and displaying a second interface by using the first screen and the second screen together, where the second interface includes the image corresponding to the thumbnail.

The second interface is an image preview interface in the unfolded state.

In this implementation, when the rear-facing selfie function is not exited, in a process in which the user views the image by using the second screen, if the user unfolds the electronic device to the unfolded state, the electronic device displays the image by using the first screen and the second screen together. In other words, when viewing the image by using the second screen, the user may unfold the foldable screen at any time, and the image is displayed by using the first screen and the second screen together, that is, large-image preview is supported, thereby facilitating the use of the user, and improving the user experience.

In a possible implementation, the method further includes: when the first photographing preview interface is displayed on the second screen, in response to unfolding the electronic device to the unfolded state by the user, controlling to turn on the first screen, and displaying a fifth photographing preview interface by using the first screen and the second screen together, where the fifth photographing preview interface includes the image obtained by using the rear-facing camera.

The fifth photographing preview interface is a photographing preview interface of the rear-facing non-selfie scenario in the unfolded state.

In this implementation, if the user unfolds the electronic device in a process of using the rear-facing selfie function, the camera application exits the rear-facing selfie function, and enters the rear-facing non-selfie scenario in the unfolded state. When the user unfolds the electronic device to the unfolded state, it indicates that the user no longer needs the rear-facing selfie function. Therefore, a rear-facing photographing scenario after the electronic device is in the unfolded state is directly entered, so that there is a high probability that a use requirement of the user is satisfied, and the user experience is improved.

In a possible implementation, the first photographing preview interface includes the second control and a fourth control. The method further includes: when the first photographing preview interface is displayed on the second screen, in response to tapping the fourth control or the second control by the user, displaying a second flipping guidance interface by using the second screen, where the second flipping guidance interface is used to guide the user to flip the electronic device; and after the second flipping guidance interface is displayed for second preset duration, controlling to turn off the second screen and turn on the first screen, and displaying the second photographing preview interface by using the first screen, where the second photographing preview interface includes the image obtained by using the rear-facing camera.

The second control may be a camera flipping control. The fourth control may be a control for switching to a home screen or a control for exiting the rear-facing selfie.

In a process of using the rear-facing selfie function, the user may exit the rear-facing selfie function by using the control for switching to the home screen, the camera flipping control, or the control for exiting the rear-facing selfie on the first photographing preview interface. After the rear-facing selfie function is exited, the camera application enters the rear-facing non-selfie scenario in the folded state, and the electronic device turns off the second screen, turns on the first screen, and display the second photographing preview interface by using the first screen. In other words, in a process of using the rear-facing selfie function, the user may exit the rear-facing selfie function by using one key at any time, thereby facilitating the user operation and use, and improving the user experience.

According to a second aspect, this application provides an apparatus. The apparatus is included in an electronic device, and the apparatus has a function of implementing behaviors of the electronic device in the first aspect and the possible implementations of the first aspect. The function may be implemented by using hardware, or may be implemented by using hardware executing corresponding software. The hardware or software includes one or more modules or units corresponding to the foregoing function, for example, a receiving module or unit, or a processing module or unit.

According to a third aspect, this application provides an electronic device. The electronic device includes a processor, a memory, and an interface. The processor, the memory, and the interface cooperate with each other, to enable the electronic device to perform the method in any one of the technical solutions of the first aspect.

According to a fourth aspect, this application provides a chip, including a processor. The processor is configured to read and execute a computer program stored in a memory, to perform the method in any one of the first aspect and the possible implementations of the first aspect.

Optionally, the chip further includes the memory, and the memory is connected to the processor by using a circuit or a wire.

Further optionally, the chip further includes a communication interface.

According to a fifth aspect, this application provides a computer-readable storage medium. The computer-readable storage medium stores a computer program, and when the computer program is executed by a processor, the processor is enabled to perform the method in any one of the technical solutions of the first aspect.

According to a sixth aspect, this application provides a computer program product. The computer program product includes computer program code, and when the computer program code is run on an electronic device, the electronic device is enabled to perform the method in any one of the technical solutions of the first aspect.

DESCRIPTION OF EMBODIMENTS

Figure 1:
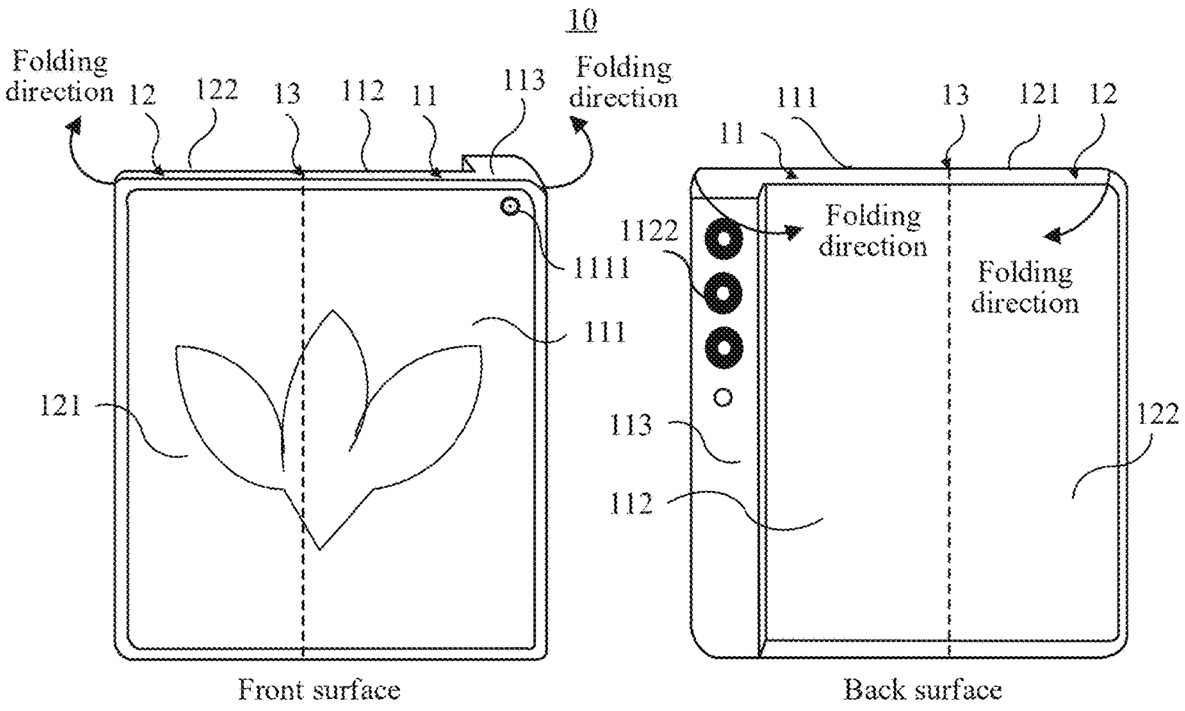
FIG. 1 is a diagram of a front view and a back view of a foldable mobile phone 10 in an unfolded state according to an embodiment of this application.

The technical solutions in embodiments of this application are described below with reference to the accompanying drawings in the embodiments of this application. In descriptions of the embodiments of this application, unless otherwise specified, "/" indicates or. For example, A/B may indicate A or B. The term "and/or" in this specification is only an association relationship for describing associated objects, and represents that three relationships may exist. For example, A and/or B may represent the following three cases: Only A exists, both A and B exist, and only B exists. In addition, in the descriptions of the embodiments of this application, "a plurality of" means two or more.

The terms "first", "second", and "third" are merely intended for a purpose of description, and shall not be understood as indicating or implying relative significance or implicitly indicating a quantity of indicated technical features. Therefore, features defining "first", "second", and "third" can explicitly or implicitly include one or more of the features.

Reference to "an embodiment", "some embodiments", or the like described in this specification of this application indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification of this application do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

Foldable mobile phones are mainly classified into outward-foldable mobile phones and inward-foldable mobile phones. Both the outward-foldable mobile phones and the inward-foldable mobile phones may include several states: a folded state, a bracket state, and an unfolded state. The bracket state refers to a state between the folded state and the unfolded state. Both the outward-foldable mobile phones and the inward-foldable mobile phones include a foldable screen. In the unfolded state, the foldable screen is in a state of being unfolded. When the outward-foldable mobile phone is in the unfolded state, and the foldable screen faces a user, the mobile phone is folded to a side away from the user (which is referred to as outward folded), and a state of the outward-foldable mobile phone is changed to the bracket state. The mobile phone continues to be folded outward, and the state is changed to the folded state. When the inward-foldable screen is in the unfolded state, and the foldable screen faces a user, the mobile phone is folded to a side closer to the user (which is referred to as inward folded), and a state of the outward-foldable mobile phone is changed to the bracket state. The mobile phone continues to be folded inward, and the state is changed to the folded state.

In the embodiments of this application, the outward-foldable mobile phone is mainly used as an example to describe a photographing method. For ease of understanding, a structure of the outward-foldable mobile phone is first described.

For example, FIG. 1 shows a front view and a back view of a foldable mobile phone 10 in an unfolded state. The foldable mobile phone 10 is an outward-foldable mobile phone. As shown in FIG. 1, the foldable mobile phone 10 includes a first structural member 11, a second structural member 12, and a connection assembly 13 (which is located at a position shown by a dashed line in FIG. 1) connecting the first structural member 11 and the second structural member 12. The first structural member 11 and the second structural member 12 are flipped and folded by using the connection assembly 13.

The first structural member 11 may include a main display screen (which is referred to as a home screen for short below, and is also referred to as a first screen) 111, a first back housing 112, and a protrusion 113. A front-facing camera 1111 is disposed on the home screen 111. The first back housing 112 and the protrusion 113 are disposed at a back of the home screen 111. A rear-facing camera 1122 may be disposed on the protrusion 113.

The second structural member 12 may include a sub display screen (which is referred to as a sub screen for short below, and is also referred to as a second screen) 121 and a second back housing 122. The second back housing 122 is disposed at a back of the sub screen 121.

During use, an angle between the first structural member 11 and the second structural member 12 is changed by using the connection assembly 13, to implement a plurality of states of the foldable mobile phone 10. It may be understood that the sub screen 121 and the home screen 111 may actually be an integrally formed flexible display screen (that is, a foldable screen). When the foldable mobile phone 10 is folded by using the connection assembly 13, the connection assembly 13 divides the screen into two parts: the home screen 111 and the sub screen 121. The home screen 111 and the rear-facing camera 1122 are located on a same side of the connection assembly.

As shown in FIG. 1, when the angle between the first structural member 11 and the second structural member 12 is approximately 180°, the foldable mobile phone 10 is in the unfolded state. In this case, a surface of the first back housing 112 of the first structural member 11 and a surface of the second back housing 122 of the second structural member 12 are approximately located on a same plane. Surfaces of the home screen 111 and the sub screen 121 are approximately located on a same plane, that is, the home screen 111 and the sub screen 121 are located on a same side. In the unfolded state, light outlet directions of the home screen 111 and the sub screen 121 are the same as a light inlet direction of the rear-facing camera 1122. In the unfolded state, the foldable mobile phone 10 simultaneously displays, by using both the home screen 111 and the sub screen 121, content that needs to be displayed. Optionally, in the unfolded state, the home screen 111 and the sub screen 121 may together display an interface of a same application, or may display interfaces of different applications in a split-screen manner.

Figure 2:
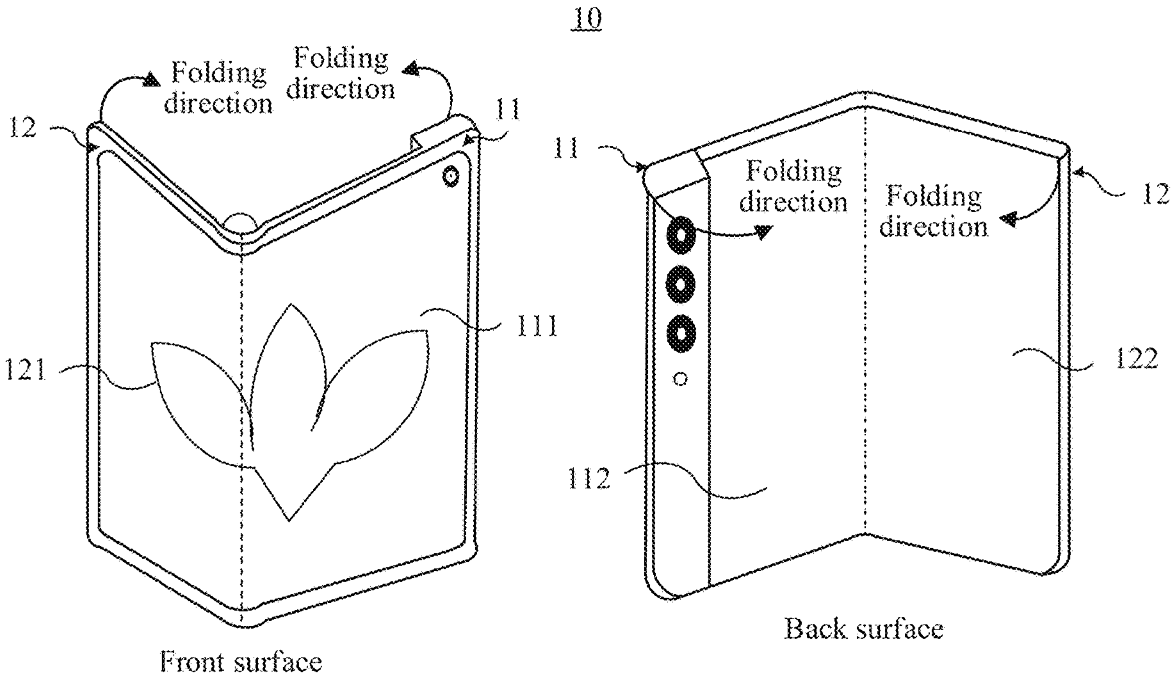
FIG. 2 is a schematic diagram of a structure of a foldable mobile phone 10 in a bracket state according to an embodiment of this application.

As shown in FIG. 2, when the foldable mobile phone 10 is in the unfolded state shown in FIG. 1, and the home screen 111 and the sub screen 121 are simultaneously turned on, a user may gradually fold the foldable mobile phone 10 outward (in a direction shown by an arrow in FIG. 1), so that the foldable mobile phone 10 enters a bracket state.

As shown in FIG. 2, when the foldable mobile phone 10 is in the bracket state, if the angle between the first structural member 11 and the second structural member 12 is greater than 45°, the home screen and the sub screen are maintained to be simultaneously turned on. When the angle between the first structural member 11 and the second structural member 12 is gradually reduced to approximately 45°, the sub screen 121 is turned off, and only the home screen 111 is in a screen-on state, to display the content that needs to be displayed. In a subsequent folding process, only the home screen 111 is maintained to be turned on until the angle between the first structural member 11 and the second structural member 12 is approximately 0°, and a folded state shown in FIG. 3 is presented.

Figure 3:
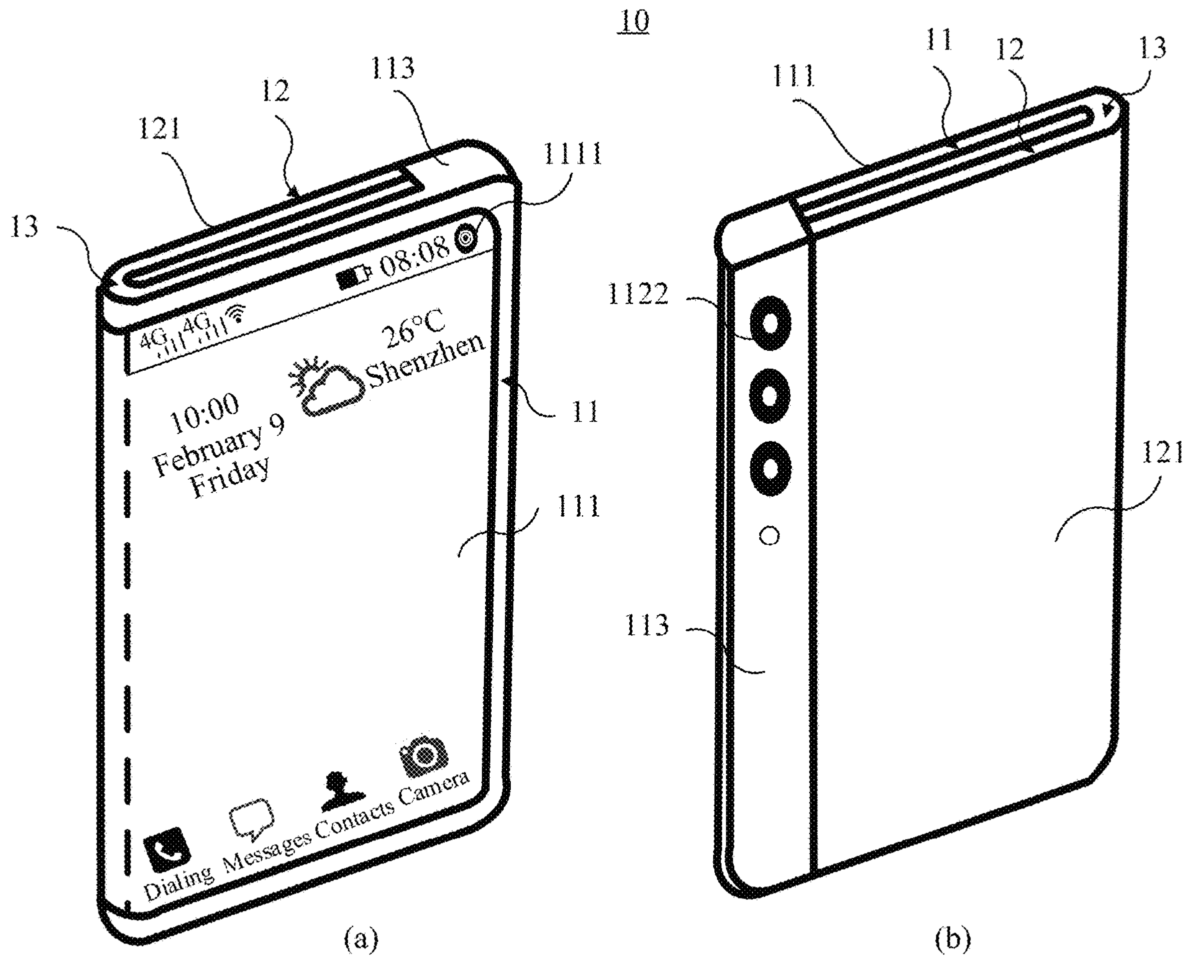
FIG. 3 is a schematic diagram of a structure of a foldable mobile phone 10 in a folded state according to an embodiment of this application.

As shown in (a) and (b) in FIG. 3, when the foldable mobile phone 10 is in the folded state, a surface of the sub screen 121 of the second structural member 12 and a surface of the protrusion 113 of the first structural member 11 are approximately located on a same plane. In this case, the sub screen 121 and the rear-facing camera 1122 are located on a same side. In the folded state, the light outlet direction of the sub screen 121 is opposite to the light inlet direction of the rear-facing camera 1122.

In the folded state, the foldable mobile phone 10 displays, by using the home screen 111, the content that needs to be displayed. The sub screen 121 does not display the content, and may be in a screen-off state. It should be noted that, when the sub screen 121 is in the screen-off state, the sub screen 121 does not receive a touch operation. Therefore, in the folded state, the user performs the touch operation by using the home screen 111.

A process in which the foldable mobile phone 10 is gradually unfolded from the folded state to the unfolded state, a state change of the screen, and the like are a reverse process of the foregoing process from the unfolded state to the folded state, and details are not described again.

Figure 4A:
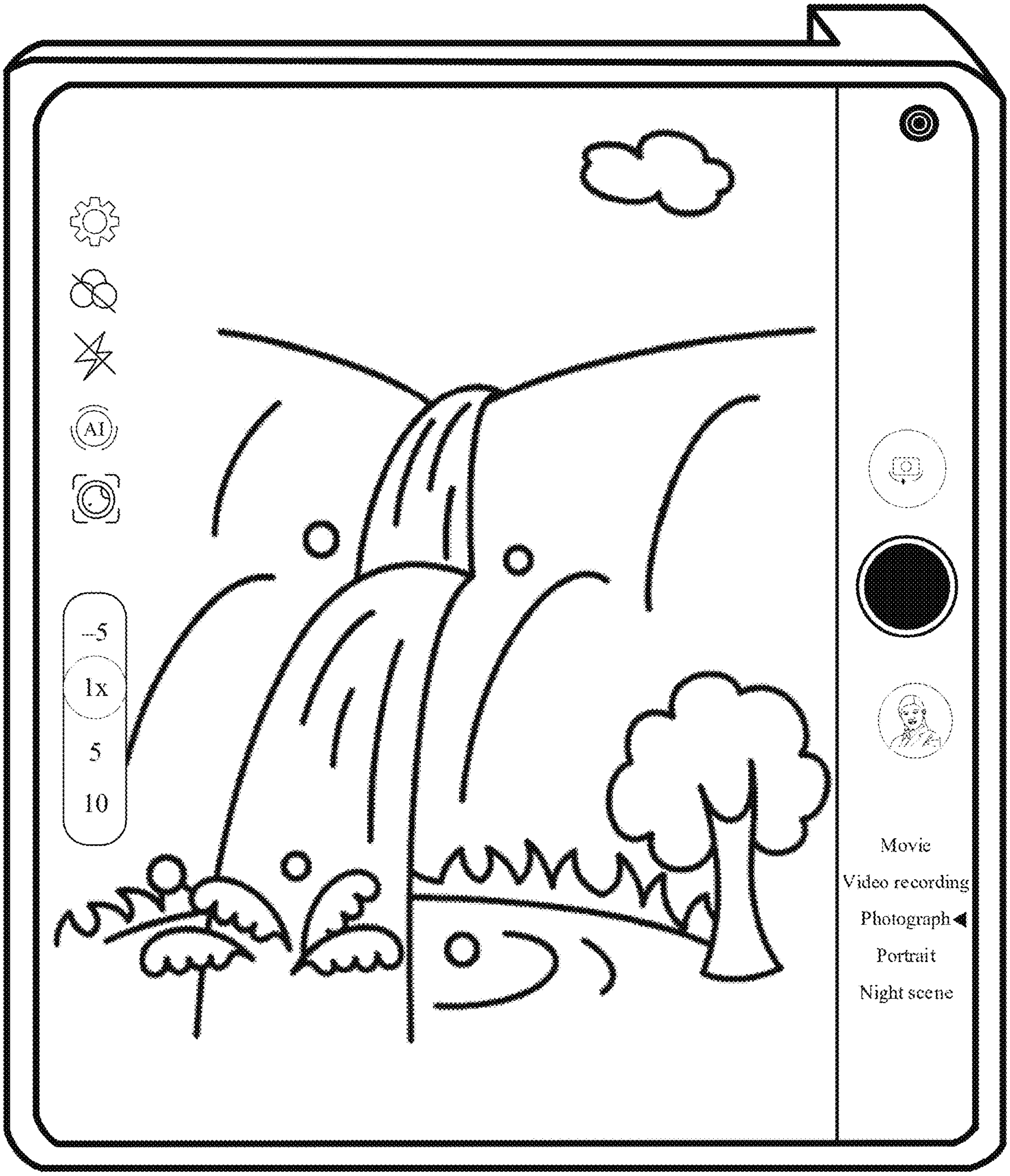
FIG. 4A and FIG. 4B are a schematic diagram of a photographing scenario when a foldable mobile phone 10 is in an unfolded state according to an embodiment of this application.
Figure 4B:

Supported by the structure of the foldable mobile phone 10 in FIG. 1 to FIG. 3, in a photographing scenario, when the foldable mobile phone 10 is in the unfolded state shown in FIG. 1, a user may photograph a surrounding person or object by using the rear-facing camera 1122, and a photographed image may be simultaneously displayed by using both the home screen 111 and the sub screen 121. As shown in FIG. 4A, this photographing scenario is also referred to as a rear-facing non-selfie scenario in the unfolded state. In addition, when the foldable mobile phone 10 is in the unfolded state shown in FIG. 1, the user may further take a selfie by using the front-facing camera 1111, and a photographed image may be simultaneously displayed by using both the home screen 111 and the sub screen 121. As shown in FIG. 4B, this photographing scenario is also referred to as a front-facing selfie scenario in the unfolded state.

Figure 5A:
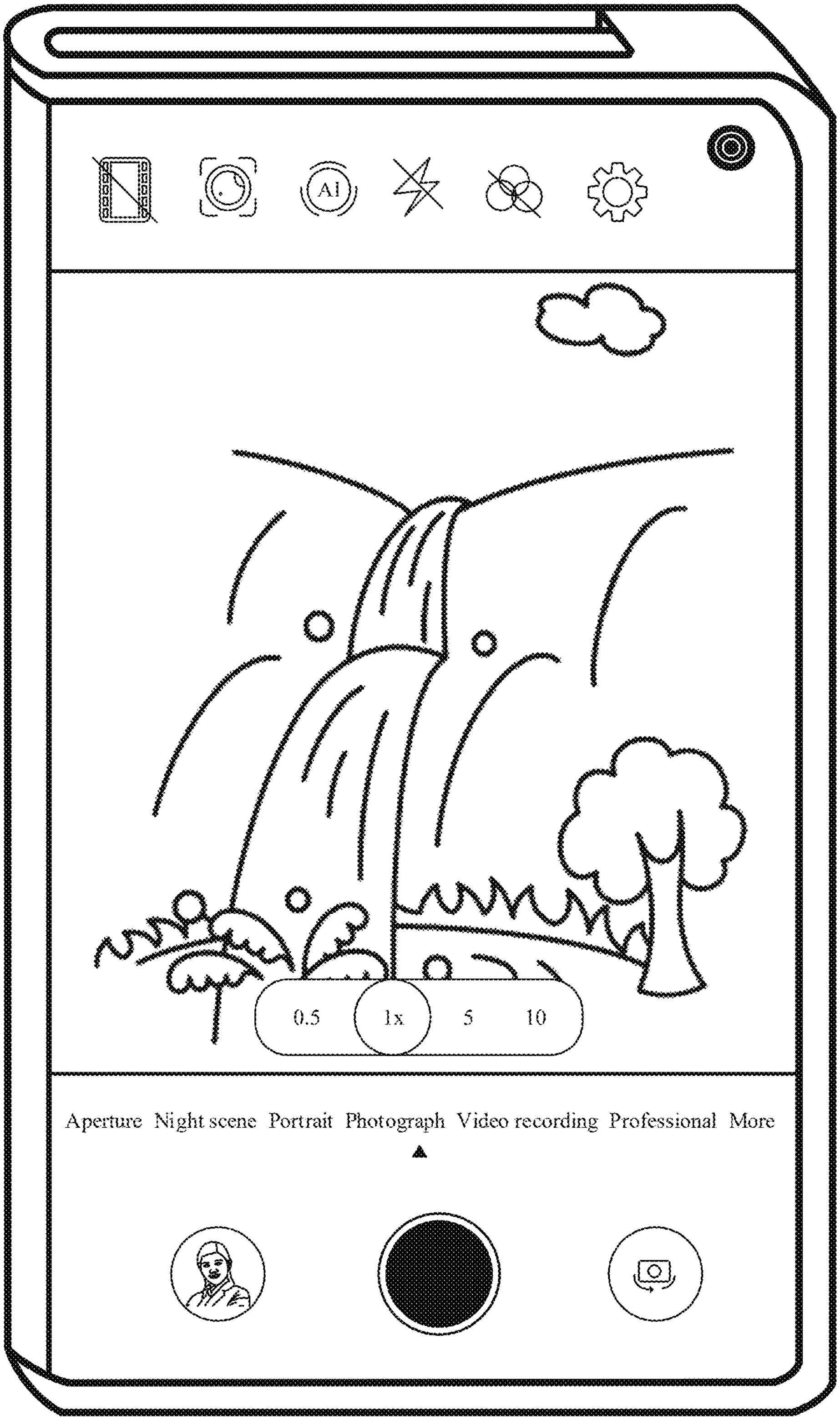
FIG. 5A to FIG. 5C are a schematic diagram of a photographing scenario when a foldable mobile phone 10 is in a folded state according to an embodiment of this application.
Figure 5B:

When the foldable mobile phone 10 is in the folded state shown in FIG. 3, the user may photograph a surrounding person or object by using the rear-facing camera 1122, and a photographed image is displayed by using the home screen 111. As shown in FIG. 5A, this photographing scenario is also referred to as a rear-facing non-selfie scenario in the folded state. When the foldable mobile phone 10 is in the folded state shown in FIG. 3, the user may further take a selfie by using the front-facing camera 1111, and a photographed image is displayed by using the home screen 111. As shown in FIG. 5B, this photographing scenario is also referred to as a front-facing selfie scenario in the folded state.

However, a specification of the front-facing camera of the mobile phone is generally low, and quality and an effect of an image photographed by using the front-facing camera are low.

Figure 5C:
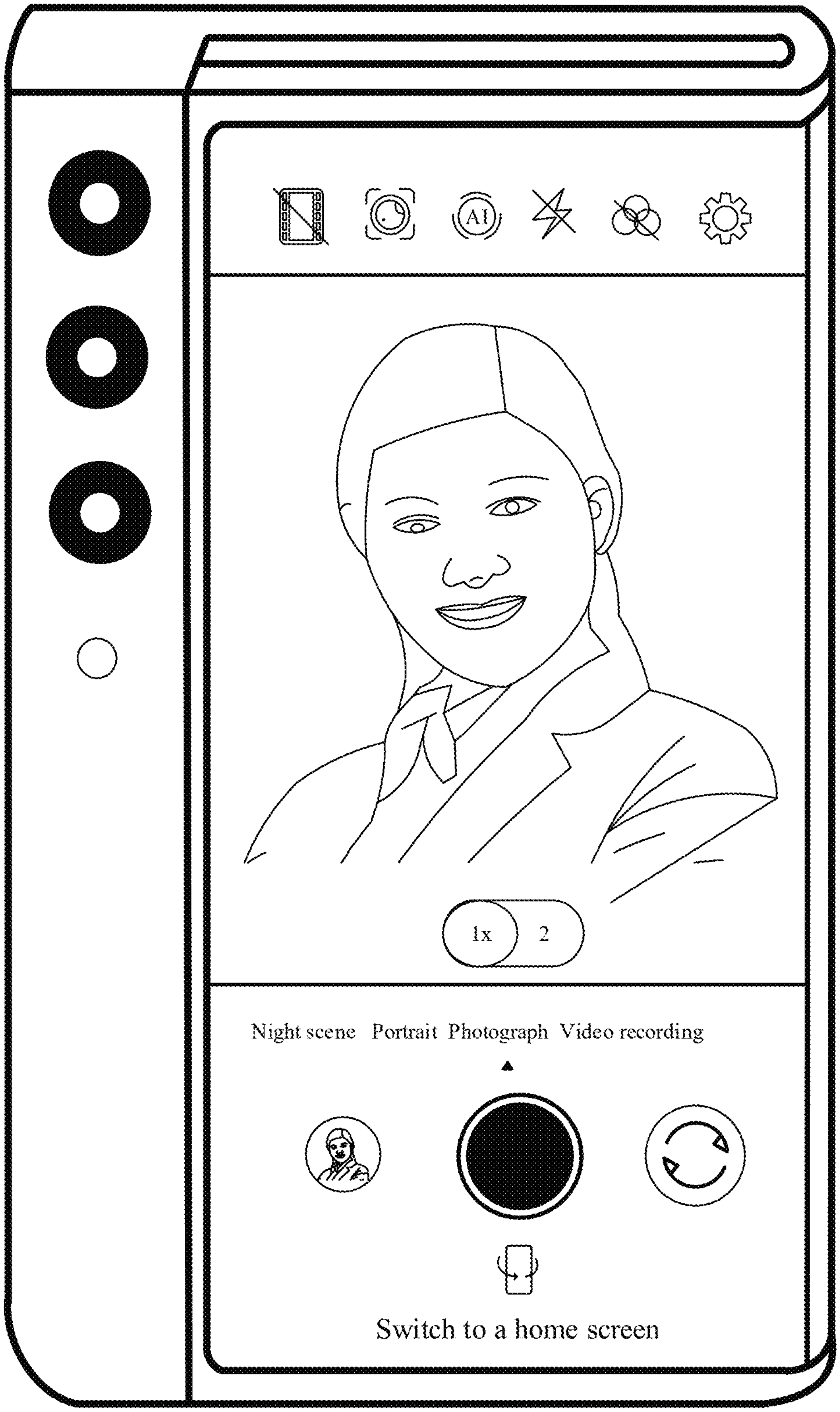

In view of this, an embodiment of this application provides a photographing method, to provide, when the foldable mobile phone is in the folded state, a rear-facing selfie (which is also referred to as super selfie) function for the user when the user performs photographing by using the foldable mobile phone. After the rear-facing selfie function is enabled, the mobile phone enables the rear-facing camera 1122 to photograph an image, and the sub screen 121 is turned on, so that the user can control photographing and view the photographed image by using the sub screen 121. In this way, photographing quality and a photographing effect of a selfie can be improved, thereby improving photographing experience of the user. In this embodiment of this application, a scenario in which photographing is performed by using the rear-facing selfie function may be referred to as a rear-facing selfie scenario, and a photographing preview interface in the rear-facing selfie scenario may be shown in FIG. 5C.

It may be understood that the photographing method provided in this embodiment of this application may be applied to any electronic device whose screen can be folded and has a camera application program, which is not limited to the foldable mobile phone. The foldable mobile phone is used as an example to describe this embodiment of this application.

Figure 6:
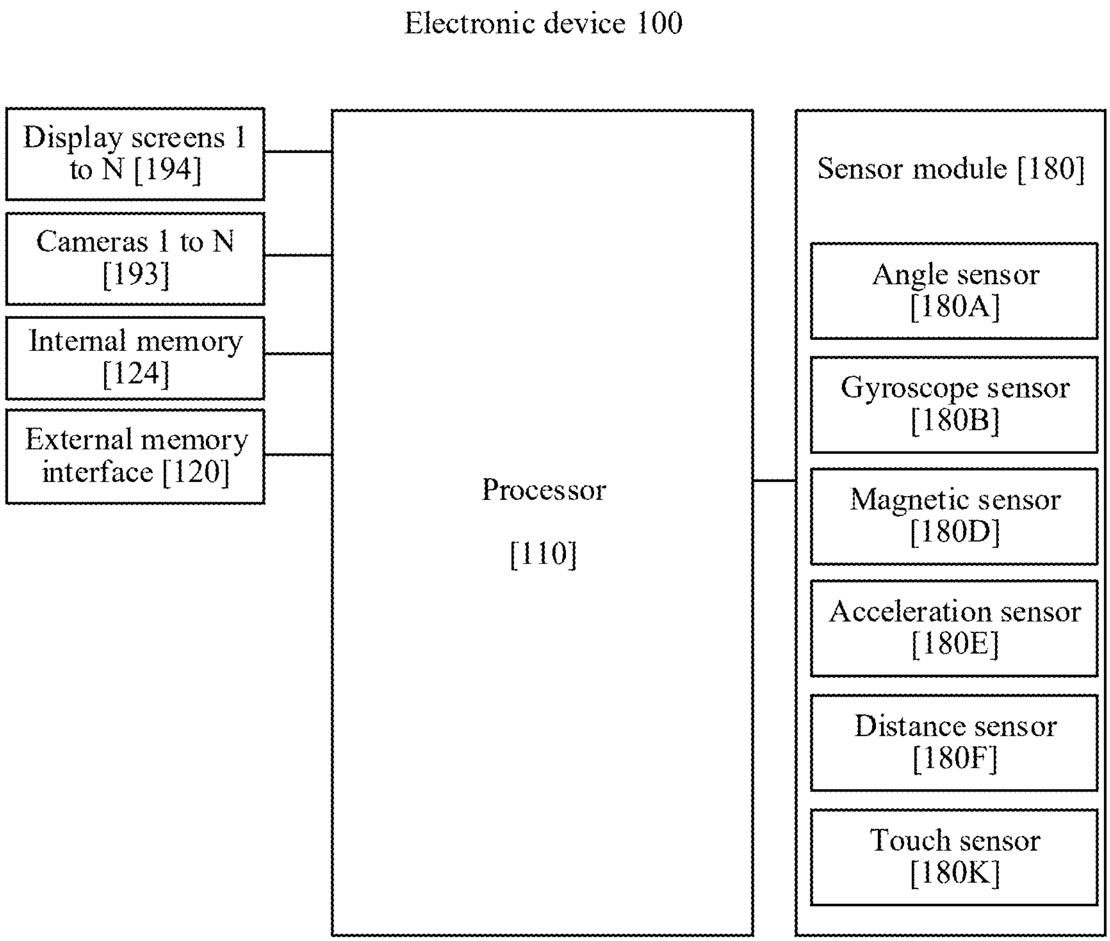
FIG. 6 is a schematic diagram of a structure of an electronic device 100 according to an embodiment of this application.

For example, FIG. 6 is a schematic diagram of a structure of an electronic device 100 according to an embodiment of this application. The electronic device 100 may include a processor 110, an external memory interface 120, an internal memory 124, a sensor module 180, a key 190, a camera 193, a display screen 194, and the like. The sensor module 180 may include an angle sensor 180A, a gyroscope sensor 180B, a magnetic sensor 180D, an acceleration sensor 180E, a distance sensor 180F, a touch sensor 180K, and the like.

It may be understood that the structure shown in this embodiment of this application does not constitute a particular limitation on the electronic device 100. In some other embodiments of this application, the electronic device 100 may include more or fewer components than shown in the figure, or some components are combined, or some components are split, or the components are differently arranged. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that is just used or cyclically used by the processor 110. If the processor 110 needs to use the instructions or the data again, the processor may directly invoke the instructions or the data from the memory. This avoids repeated access, reduces waiting time of the processor 110, and improves system efficiency.

The electronic device 100 may implement a display function through the GPU, the display screen 194, the application processor, and the like. The GPU is a microprocessor for image processing, and is connected to the display screen 194 and the application processor. The GPU is configured to: perform mathematical and geometric computation, and render an image.

The display screen 194 is configured to display an image, a video, and the like. The display screen 194 includes a display panel. In some embodiments, the electronic device 100 may include one or N display screens 194, where N is a positive integer greater than 1. In this embodiment of this application, N may be equal to 2, that is, the electronic device 100 may include two display screens 194, one of which is a home screen, and the other of which is a sub screen. The home screen and the sub screen may be integrally connected and made of a flexible material.

The electronic device 100 may implement a photographing function through the ISP, the camera 193, the video codec, the GPU, the display screen 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV In some embodiments, the electronic device 100 may include one or N cameras 193, where N is a positive integer greater than 1. In this embodiment of this application, N may be equal to 2, that is, the electronic device 100 may include two cameras, one of which is a front-facing camera, and the other of which is a rear-facing camera. The front-facing camera is disposed on the home screen, and the rear-facing camera is disposed on the protrusion.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 124 may be configured to store computer-executable program code. The executable program code includes instructions. The processor 110 runs the instructions stored in the internal memory 124, to perform various function applications of the electronic device 100 and data processing.

The angle sensor 180A is configured to detect the angle between the first structural member and the second structural member, to determine, based on the angle, whether the state of the electronic device is the folded state or the unfolded state, so as to control states of the home screen and the sub screen.

The gyroscope sensor 180B may be configured to determine a motion posture of the electronic device 100. The magnetic sensor 180D includes a Hall sensor. The electronic device 100 may use the magnetic sensor 180D to detect opening/closing of a flip case. The acceleration sensor 180E may detect sizes of acceleration of the electronic device 100 in various directions (usually in three axial directions). The distance sensor 180F is configured to measure a distance. The electronic device 100 may measure a distance by using infrared light or a laser. In some embodiments, in a photographing scenario, the electronic device 100 may perform ranging by using the distance sensor 180F, to implement fast focusing.

In this embodiment of this application, one or more of the gyroscope sensor 180B, the magnetic sensor 180D, the acceleration sensor 180E, the distance sensor 180F cooperate to implement flipping detection on the electronic device 100, that is, detect whether the electronic device is flipped.

The touch sensor 180K is also referred to as a "touch panel". The touch sensor 180K may be disposed on the display screen 194, and the touch sensor 180K and the display screen 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display screen 194. In some other embodiments, the touch sensor 180K may alternatively be disposed on a surface of the electronic device 100 at a location different from a location of the display screen 194.

The foregoing describes a hardware system of the electronic device 100 in detail, and the following describes a software system of the electronic device 100. The software system may use a layered architecture, an event-driven architecture, a microkernel architecture, a micro service architecture, or a cloud architecture. In this embodiment of this application, the software system of the electronic device 100 is described by using the layered architecture as an example.

Figure 7:
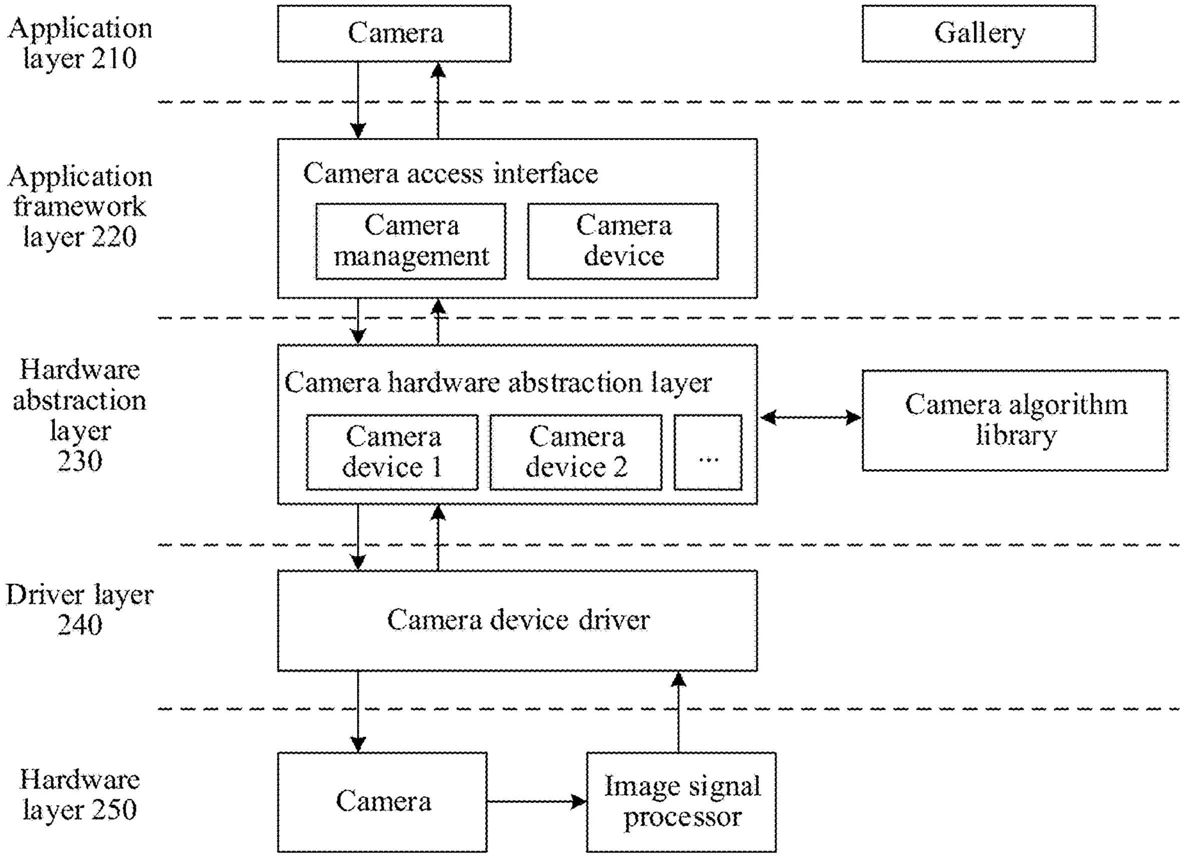
FIG. 7 is a schematic diagram of a software architecture of an electronic device 100 according to an embodiment of this application.

As shown in FIG. 7, the software system using the layered architecture is divided into several layers, and each layer has a clear role and task. The layers communicate with each other through a software interface. In some embodiments, the software system may be divided into four layers, which are respectively, from top to bottom, an application layer 210, an application framework layer 220, a hardware abstraction layer 230, and a driver layer 240. In addition, for ease of description, FIG. 7 further shows a hardware layer 250 of the electronic device.

The application layer 210 may include application programs of Camera and Gallery, and may further include application programs such as Calendar, Call, Map, Navigation, WLAN, Bluetooth, Music, Video, and SMS Message.

The application framework layer 220 provides an application program access interface and a programming framework for an application program at the application layer 210.

For example, the application framework layer 220 includes a camera access interface, and the camera access interface is configured to provide a photographing service of a camera through camera management and a camera device.

The camera management at the application framework layer 220 is configured to manage the camera. The camera management may obtain a parameter of the camera, for example, determine a working status of the camera.

The camera device at the application framework layer 220 is configured to provide data access interfaces between different camera devices and the camera management.

The hardware abstraction layer 230 is configured to abstract hardware. For example, the hardware abstraction layer 230 may include a camera hardware abstraction layer and another hardware device abstraction layer. The camera hardware abstraction layer may include a camera device 1, a camera device 2, and the like. The camera hardware abstraction layer may be connected to a camera algorithm library, and the camera hardware abstraction layer may invoke an algorithm in the camera algorithm library.

The driver layer 240 is configured to provide drivers for different hardware devices. For example, the driver layer may include a camera driver. a digital signal processor driver and a graphics processing unit driver.

The hardware layer 250 may include a sensor, an image signal processor, a digital signal processor, a graphics processing unit, and another hardware device. The sensor may include a sensor 1, a sensor 2, and the like, and may further include a depth sensor (time of flight, TOF) and a multispectral sensor.

A working procedure of the software system of the electronic device 100 is described by using an example below with reference to a photographing scenario.

When a user performs a single-tap operation on the touch sensor 180K corresponding to a photographing control, after a camera APP is awakened by the single-tap operation, each camera device at the camera hardware abstraction layer is invoked through the camera access interface. For example, the camera hardware abstraction layer determines that a current zoom ratio is within a zoom ratio range of [0.6, 0.9]. Therefore, an instruction for invoking a wide-angle camera may be delivered to a camera device driver, and the camera algorithm library simultaneously starts to load a preset algorithm.

After the sensor at the hardware layer is invoked, for example, after a sensor 1 in the wide-angle camera is invoked, the sensor 1 obtains a raw image, and sends the raw image to the image signal processing for preliminary processing such as registration. A preliminarily processed image is returned to the hardware abstraction layer via the camera device driver, and is then processed by using the preset algorithm in the camera algorithm library, to obtain a photographed image (that is, a photograph). The obtained image is sent back to the camera application via the camera hardware abstraction layer and the camera access interface for displaying and storing.

It should be noted that the foregoing process describes the working procedure of the software system after the user taps the photographing control. In a photographing preview scenario, a working procedure of obtaining an image by the software system of the electronic device is similar to the foregoing process. A difference lies in that the user does not tap the photographing control. Therefore, the image may not be stored, and is only displayed on a photographing preview interface.

The following specifically describes the photographing method provided in this embodiment of this application with reference to an application scenario and the accompanying drawings and by using an example in which the electronic device is an outward-foldable mobile phone.

For ease of understanding, several terms involved in the following embodiments are first described.

1. Enable a Function

In this embodiment of this application, when a foldable mobile phone has a function, enabling the function refers to turning on a switch of the function, so that the foldable mobile phone can use the function. After a function is enabled, the function is in an enabled state or an open state, or the function is already enabled.

2. Disable a Function

In this embodiment of this application, when a foldable mobile phone has a function, disabling the function refers to turning off a switch of the function, so that the foldable mobile phone cannot use the function. After a function is disabled, the function is in a disabled state or a closed state, or the function is already disabled.

3. Enter a Function

In this embodiment of this application, when a foldable mobile phone enables a function, entering the function refers to starting to use the function through an operation of a user or automatic triggering by the foldable mobile phone. Enter the function is also referred to as using the function, starting the function, or the like.

4. Exit a Function

In this embodiment of this application, when a foldable mobile phone exits a function, exiting the function refers to stopping using the function through an operation of a user or automatic triggering by the foldable mobile phone.

In this embodiment of this application, a camera application in a foldable mobile phone has a rear-facing selfie function. When the rear-facing selfie function is enabled, a user may take a selfie by using a rear-facing camera, thereby improving quality and an effect of an image obtained through selfie. The following describes a related process based on a use phase of the rear-facing selfie function and with reference to an application scenario.

I. Enable and Disable the Rear-Facing Selfie Function

1. Enable the Rear-Facing Selfie Function

Figure 8A:
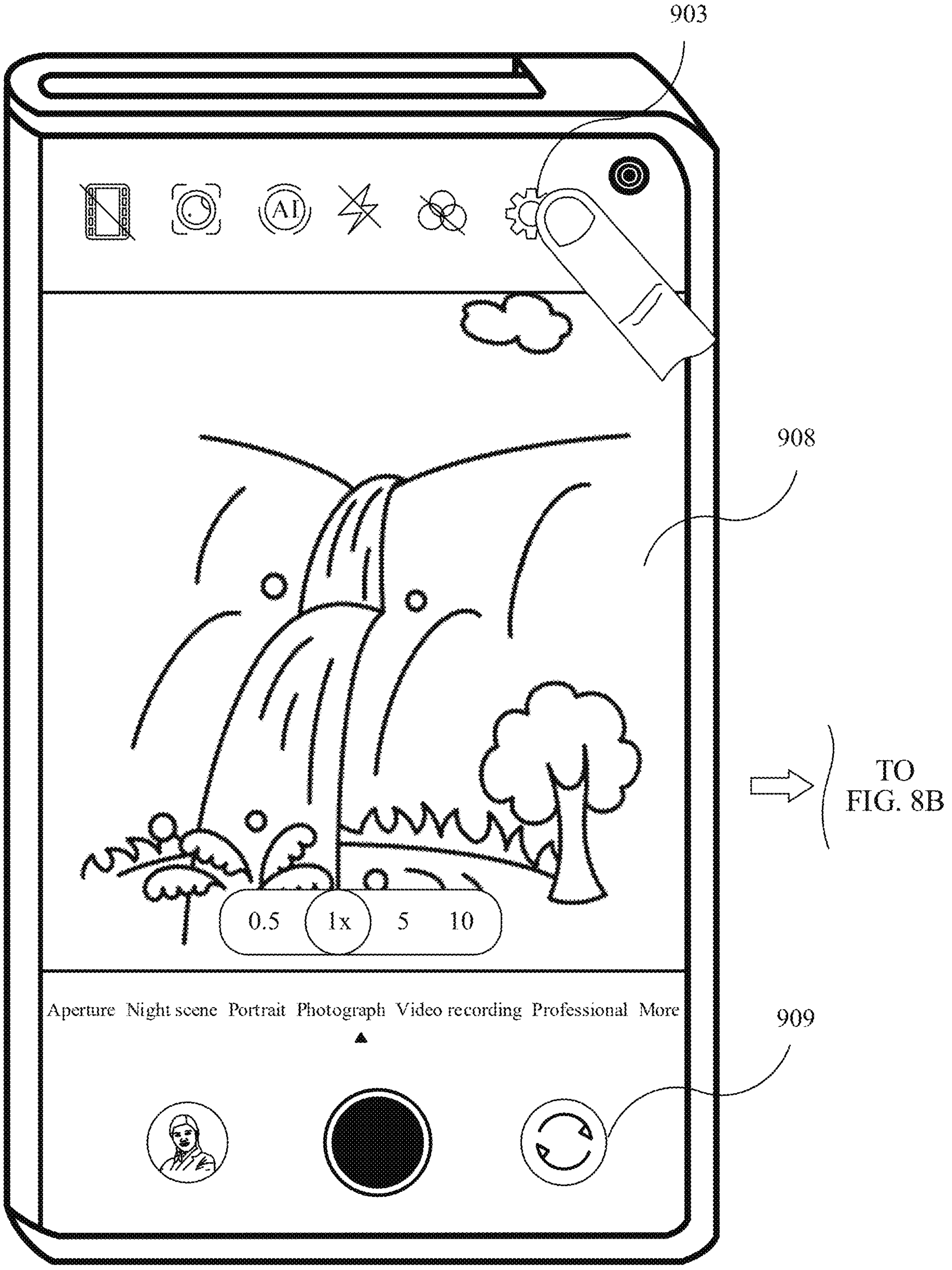
FIG. 8A to FIG. 8E are a schematic diagram of changes of an interface in a process in which a rear-facing selfie function is enabled according to an embodiment of this application.

For example, FIG. 8A to FIG. 8E are a schematic diagram of changes of an interface in a process in which a rear-facing selfie function is enabled according to an embodiment of this application. Using an example in which a foldable mobile phone is in a folded state, when the rear-facing selfie function is not enabled, after a camera application is started, the foldable mobile phone obtains an image by using a rear-facing camera and displays a photographing preview interface 908 by using a home screen. The photographing preview interface 908 includes the image obtained by the rear-facing camera, as shown in FIG. 8A. In other words, the photographing preview interface 908 is a preview interface in a rear-facing non-selfie scenario when the foldable mobile phone is in the folded state and the rear-facing selfie function is disabled. In addition, as shown in FIG. 8A, if the rear-facing selfie function is enabled, the photographing preview interface 908 includes a camera flipping control 909 (which is also referred to as a second control). The camera flipping control 909 is used by a user to control switching between the rear-facing camera and a front-facing camera.

Figure 8B:
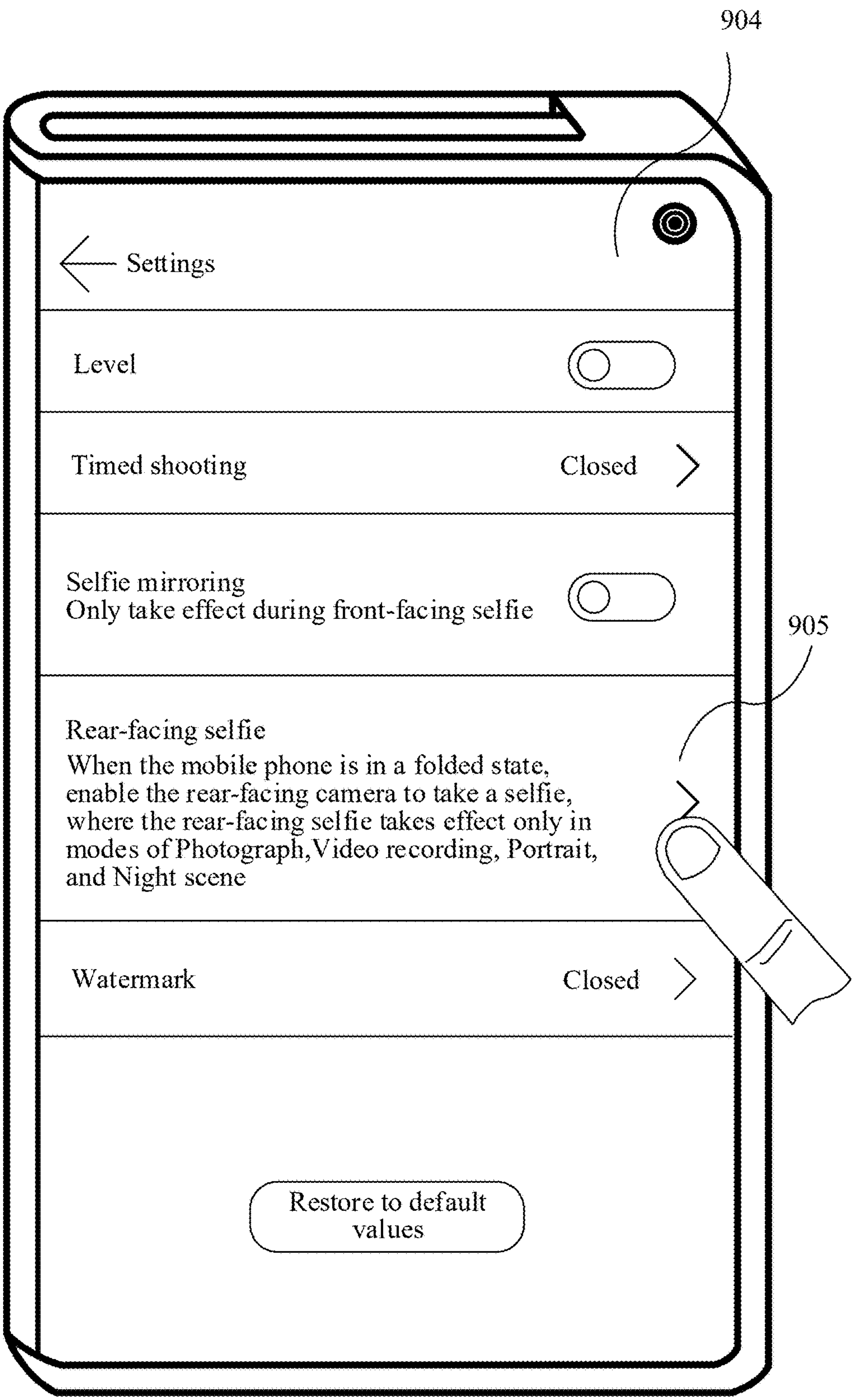
Figure 8C:
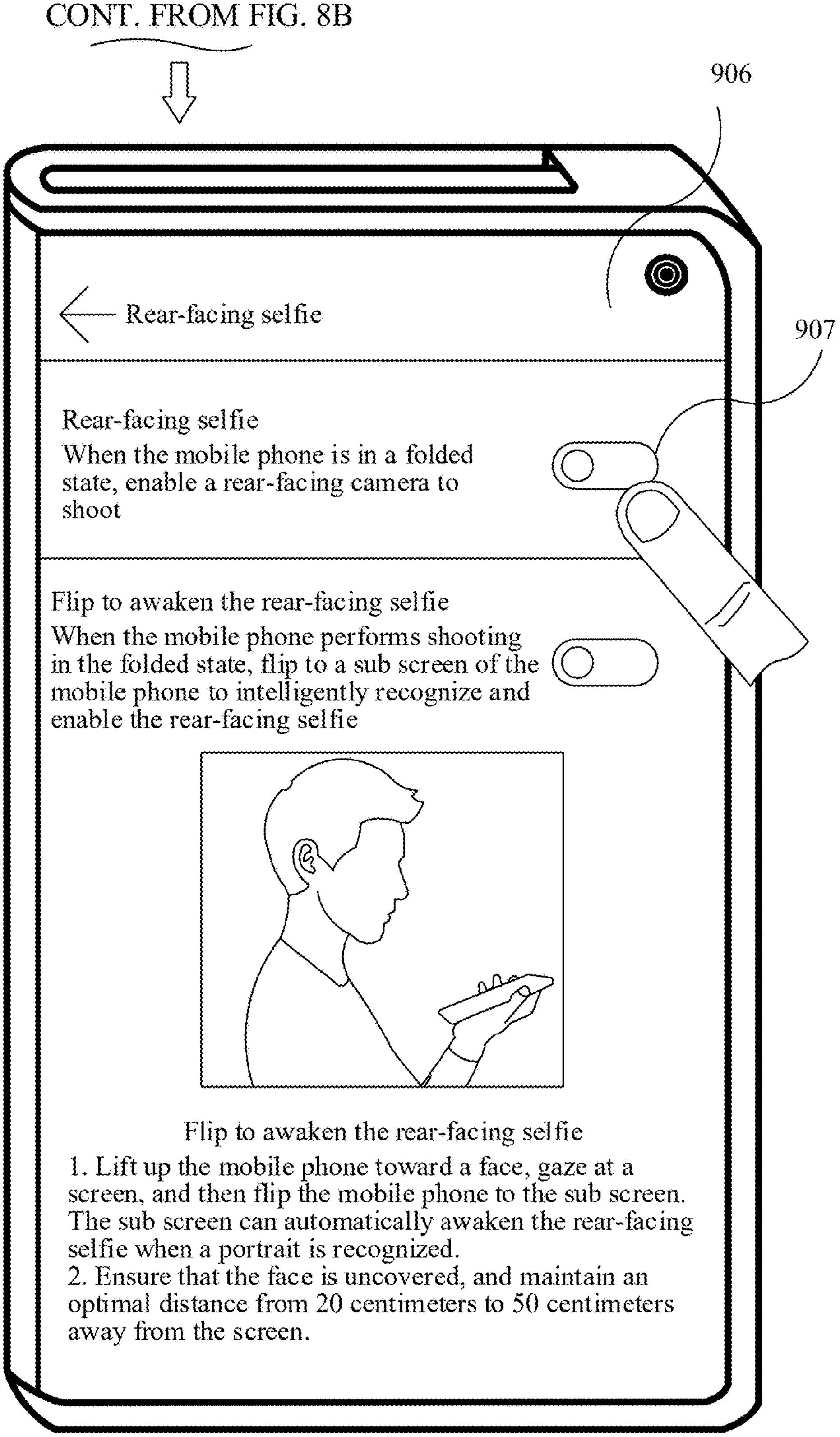

The photographing preview interface 908 further includes a setting control 903. The user taps the setting control 903, and the foldable mobile phone displays a camera setting interface 904 in response to the operation of the user, as shown in FIG. 8B. The camera setting interface 904 includes a rear-facing selfie option 905. The user taps the rear-facing selfie option 905, and the foldable mobile phone displays a rear-facing selfie setting interface 906 in response to the operation of the user, as shown in FIG. 8C.

Figure 8D:
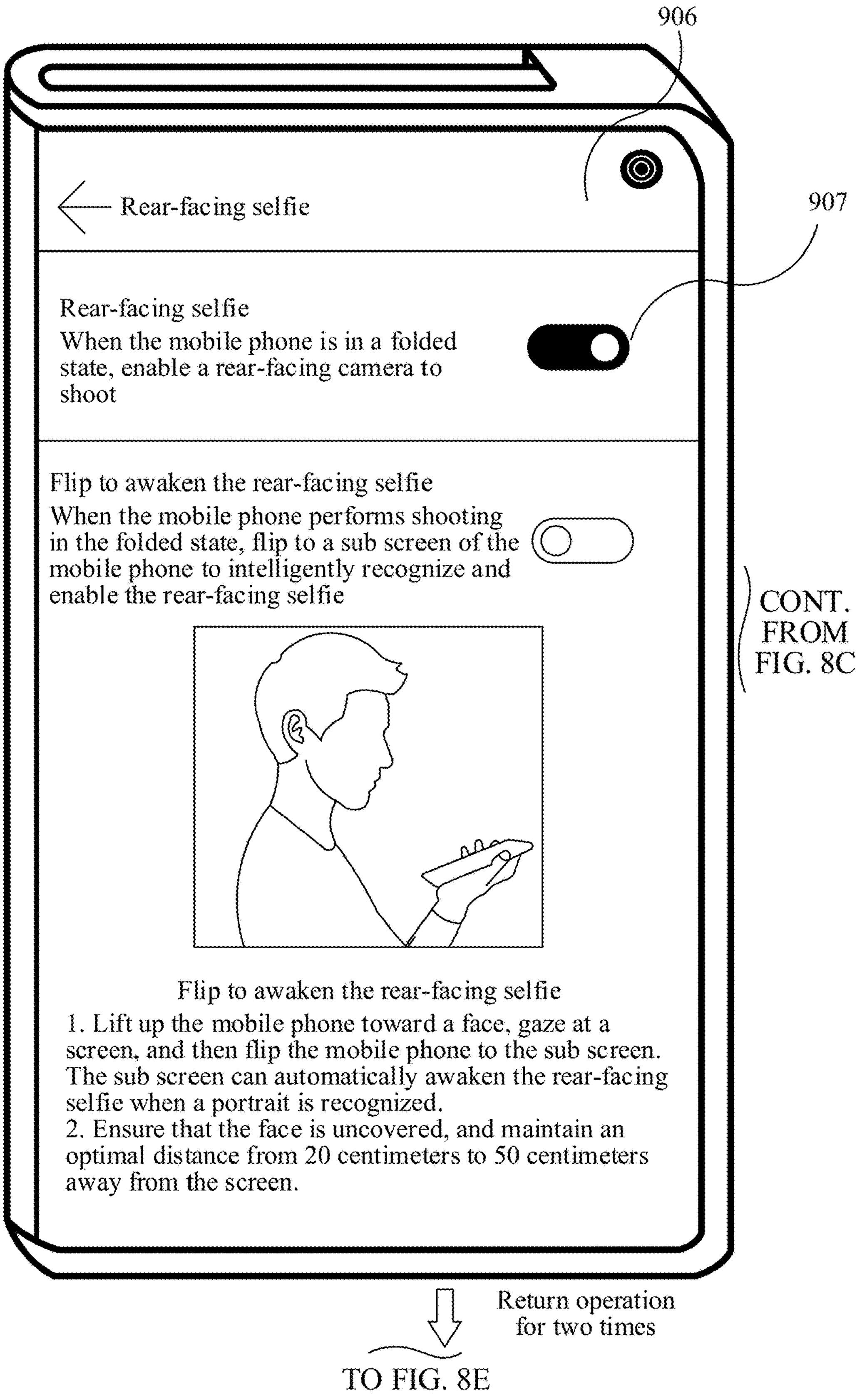

The rear-facing selfie setting interface 906 includes a switch control (which is referred to as a rear-facing selfie switch for short) 907 of the rear-facing selfie function. As shown in FIG. 8C, in this case, the rear-facing selfie switch 907 is in a turned-off state, and is displayed in gray. The user taps the rear-facing selfie switch 907, the foldable mobile phone enables the rear-facing selfie function in response to the operation of the user, and the rear-facing selfie switch 907 is highlighted, as shown in FIG. 8D.

Figure 8E:
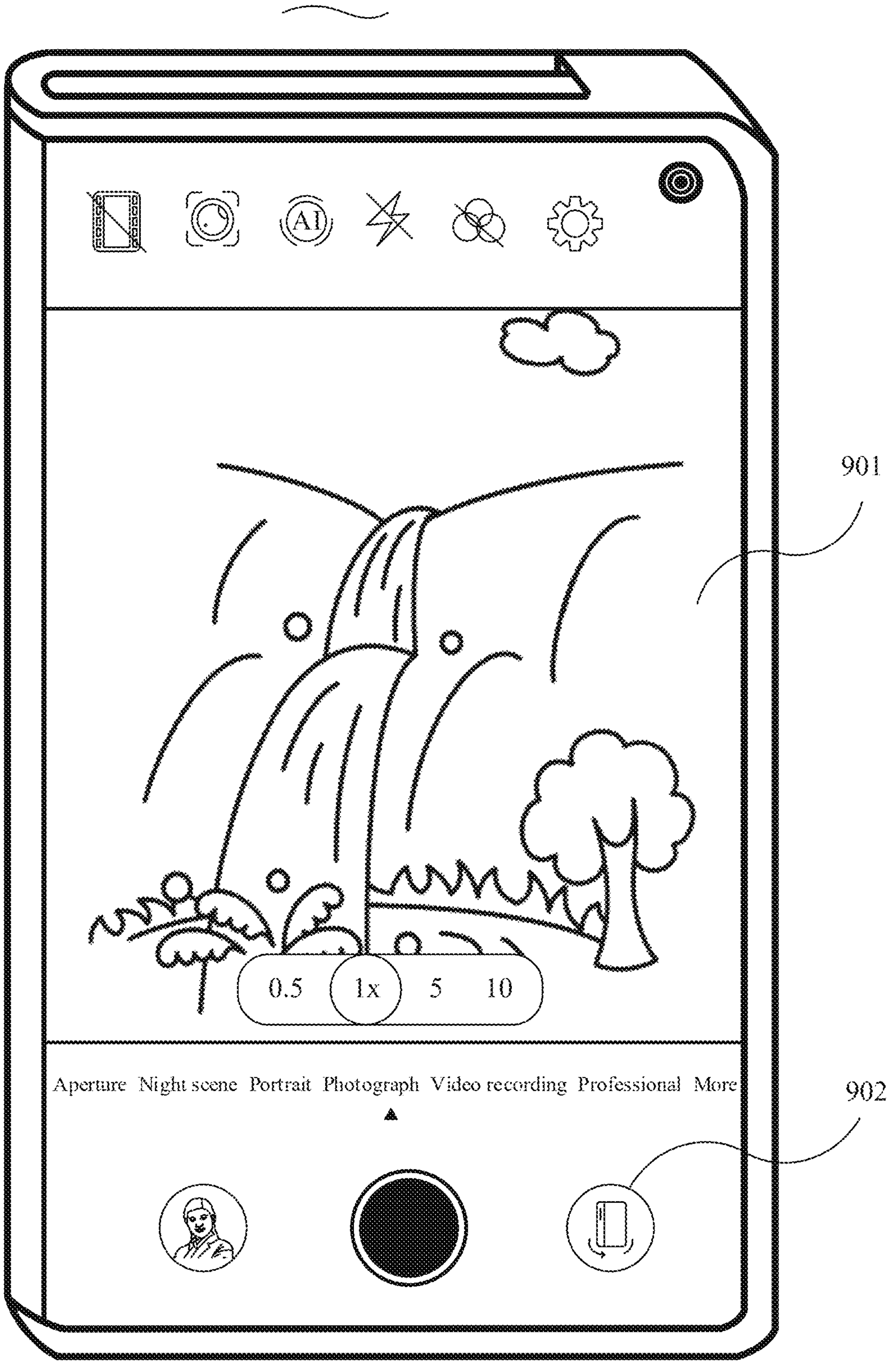

Then, the user may perform a return operation for two times, to sequentially exit the rear-facing selfie setting interface 906 and the camera setting interface 904, and the foldable mobile phone displays a photographing preview interface 901 (which is also referred to as a second photographing preview interface), as shown in FIG. 8E. The photographing preview interface 901 is a preview interface in the rear-facing non-selfie scenario when the foldable mobile phone is in the folded state and the rear-facing selfie function is enabled. Different from the photographing preview interface 908, the photographing preview interface 901 displays a rear-facing selfie control (which is also referred to as a first control) 902. Optionally, the photographing preview interface 901 may be an interface obtained by replacing, based on the photographing preview interface 908, the camera flipping control 909 on the photographing preview interface 908 with the rear-facing selfie control 902. Optionally, the photographing preview interface 901 may alternatively be an interface obtained by additionally displaying the rear-facing selfie control 902 based on the photographing preview interface 908. In other words, the rear-facing selfie control 902 and the camera flipping control 909 may be simultaneously displayed on the interface. The rear-facing selfie control is used to enter the rear-facing selfie function. Optionally, the return operation may be, for example, a side-sliding operation (that is, sliding inward from a side edge of a screen), tapping a return key in a three-key navigation bar, or tapping a return control on the interface. This is not limited in this embodiment of this application. The same is true for a return operation in the following embodiments, and details are not described again.

It may be understood that, when the foldable mobile phone is at delivery, the rear-facing selfie function may alternatively be enabled by default. Then, in a use process, the user may disable the rear-facing selfie function as required.

2. Disable the Rear-Facing Selfie Function

A process of disabling the rear-facing selfie function is similar to the foregoing enabling process, and a difference lies in that the rear-facing selfie switch 907 is switched from the turned-off state to a turned-on state in the enabling process, and the rear-facing selfie switch 907 is switched from the turned-on state to the turned-off state in the disabling process. Details are not described herein again.

It should be noted that the foregoing describes the processes of enabling and disabling the rear-facing selfie function by using an example in which the foldable mobile phone is in the folded state. When the foldable mobile phone is in the unfolded state, the rear-facing selfie function may also be enabled or disabled. An operation process and an interface change process are similar to those in the foregoing process, and details are not described again. In addition, in this embodiment, the rear-facing selfie setting interface 906 is entered via the camera setting interface 904, to enable or disable the rear-facing selfie function. In another embodiment, the rear-facing selfie setting interface 906 may alternatively be entered in another manner. For example, the rear-facing selfie setting interface 906 may be entered by using a setting application program of the foldable mobile phone. This is not limited in this application.

In this embodiment, the user may actively set enabling and disabling of the rear-facing selfie function as required, to satisfy use requirements of different scenarios, facilitate user operation, and improve user experience.

II. Display of the Rear-Facing Selfie Control and the Camera Flipping Control

Figure 9A:
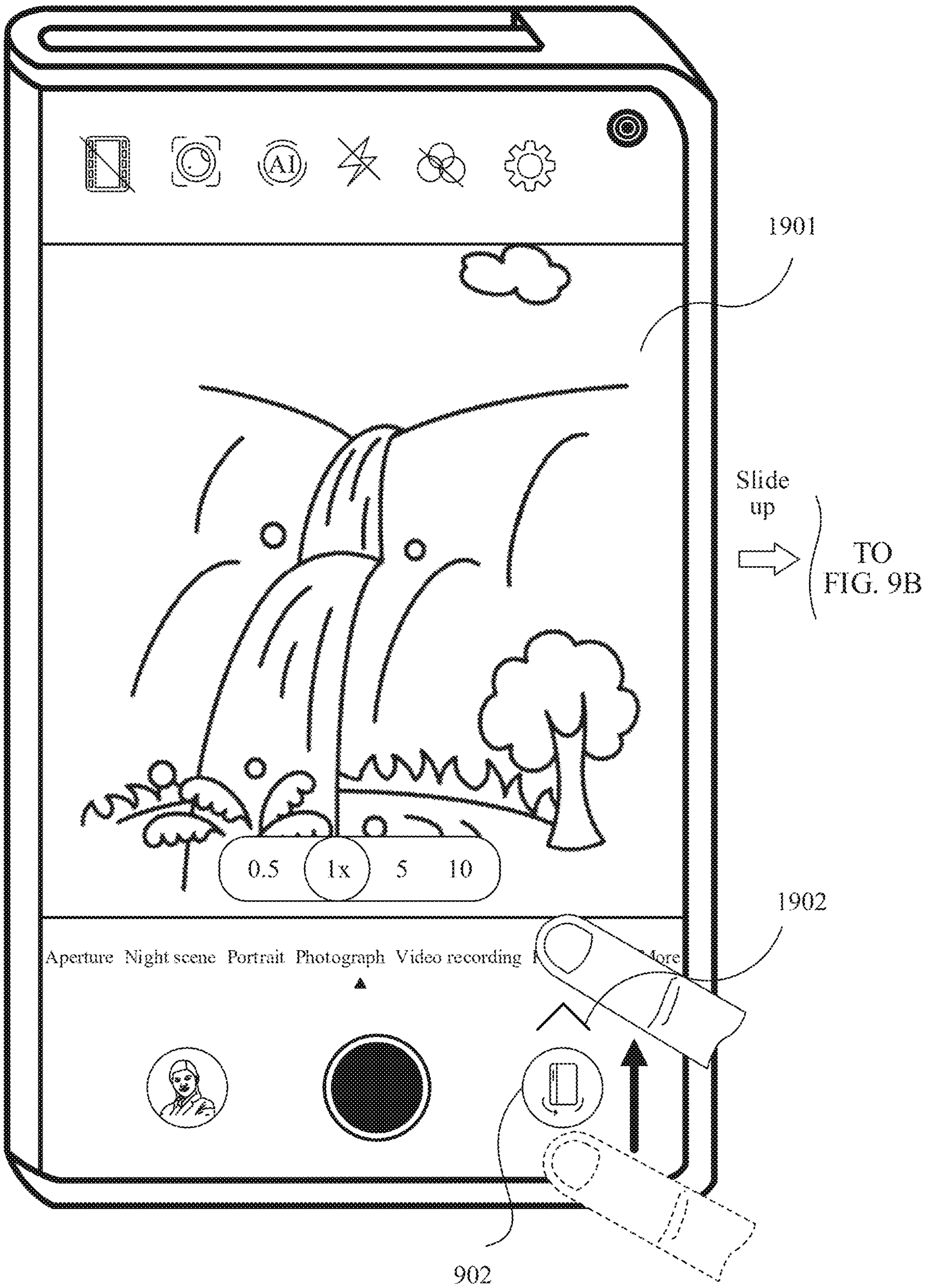
FIG. 9A to FIG. 9C are a schematic diagram of a process in which a camera flipping control is awakened according to an embodiment of this application.

As shown in FIG. 9A, when the rear-facing selfie function is enabled, the photographing preview interface 901 includes the rear-facing selfie control 902. In another embodiment, the photographing preview interface 901 may further include the camera flipping control 909. The user taps the camera flipping control 909 to enter a front-facing selfie scenario, and display a photographing preview interface 1501 (which is the same as the interface shown in FIG. 5B) in the front-facing selfie scenario. The front-facing selfie scenario is a scenario in which a selfie is taken by using a front-facing camera. For the photographing preview interface 1501, refer to FIG. 15B in a subsequent embodiment. In other words, in this embodiment, the photographing preview interface 901 may include both the control for entering the rear-facing selfie and the control for entering the front-facing selfie. In this way, the user can select the rear-facing selfie or the front-facing selfie based on a use requirement, thereby facilitating use by the user and improving the user experience.

Figure 9B:
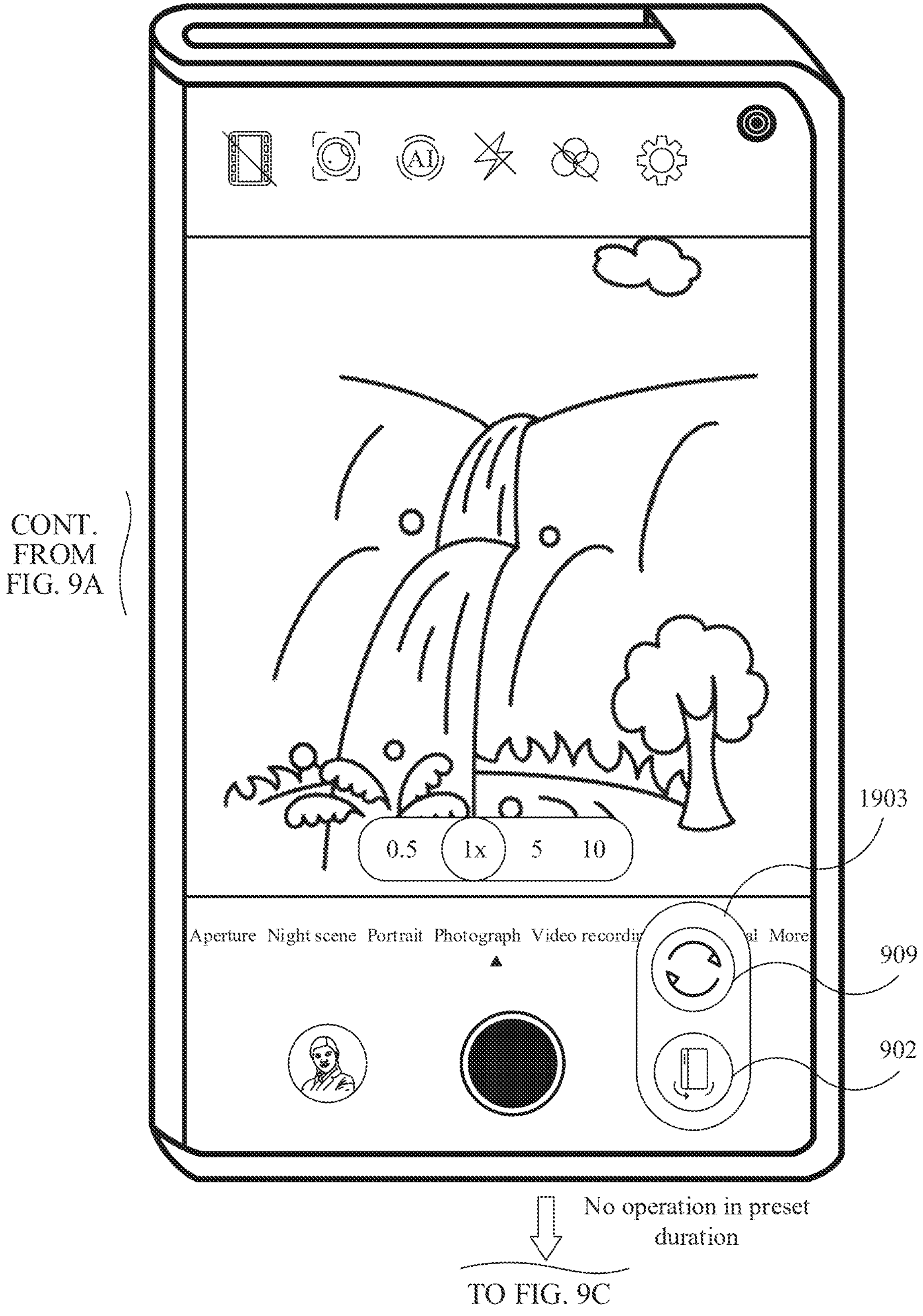
Figures 9B, 9C:
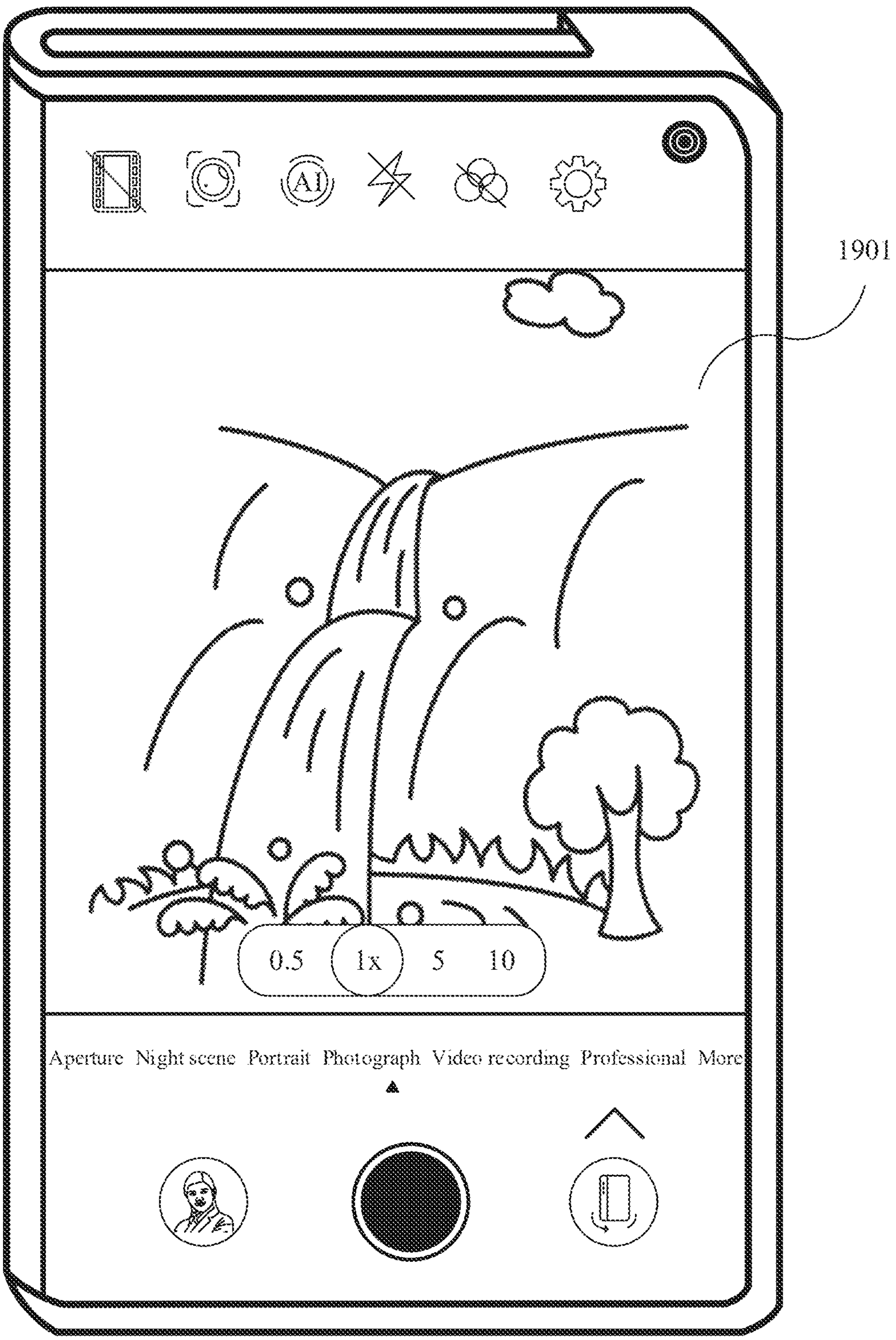

In another embodiment, when the foldable mobile phone displays the photographing preview interface 901 by using the home screen, the user may awaken the camera flipping control 909 by using a preset gesture. For example, FIG. 9A to FIG. 9C are a schematic diagram of a process in which a camera flipping control is awakened according to an embodiment of this application. As shown in FIG. 9A, when the foldable mobile phone is in the folded state and the rear-facing selfie function is enabled, after the camera application is started, a photographing preview interface 1901 is displayed.

The photographing preview interface 1901 includes the rear-facing selfie control 902, and an arrow identifier 1902 is displayed above the rear-facing selfie control 902. Optionally, the user may tap the arrow identifier 1902 (where this operation is also referred to as a second operation), or slide up at the rear-facing selfie control 902 (where this operation is also referred to as a second operation). In response to the operation of the user, the foldable mobile phone displays a capsule 1903 in a region in which the rear-facing selfie control 902 is originally located, as shown in FIG. 9B. The capsule 1903 includes the rear-facing selfie control 902 and the camera flipping control 909, and the user may select and tap as required.

If the user does not select the control in the capsule 1903 after the capsule 1903 is displayed for preset duration, that is, the user performs no operation on the capsule 1903 within the preset duration, the capsule 1903 is hidden, and the interface is restored to the photographing preview interface 1901, as shown in FIG. 9C.

In this embodiment, the user may awaken the capsule through the preset operation, and select to tap the rear-facing selfie control 902 or the camera flipping control 909 in the capsule, to control the camera to enter the rear-facing selfie function or the front-facing selfie scenario. In this way, on one hand, the user may select the rear-facing selfie or the front-facing selfie based on a use requirement, thereby facilitating use by the user and improving the user experience. On the other hand, when the user does not perform the preset gesture, the interface does not display the front-facing selfie scenario, to facilitate arrangement of the controls on the interface, avoid a case in which the controls on the interface are excessively congested and affect the user operation, and further improve the user experience.

III. Setting of Flipping to Awaken

In this embodiment of this application, when the rear-facing selfie function is enabled, the camera application of the foldable mobile phone may further have a "function of flipping to awaken the rear-facing selfie" (which is referred to as a function of flipping to awaken for short). The function of flipping to awaken is in a disabled state by default, and the user may manually enable the function. After the function of flipping to awaken is enabled, after the user lifts up the mobile phone toward a face and gazes at the screen based on a requirement of flipping to awaken, then the user flips the mobile phone, and the foldable mobile phone recognizes the face by using the front-facing camera, detects, by using the sensor, that the user flips the mobile phone, and then recognizes the face by using the rear-facing camera, the camera application is triggered to automatically enter the rear-facing selfie function. The operation in which the user flips the mobile phone based on the foregoing requirement is also referred to as a first operation.

A setting process of the function of flipping to awaken is similar to the setting process of the rear-facing selfie function, and is briefly described below with reference to the accompanying drawings.

1. Enable the Function of Flipping to Awaken

Figure 10A:
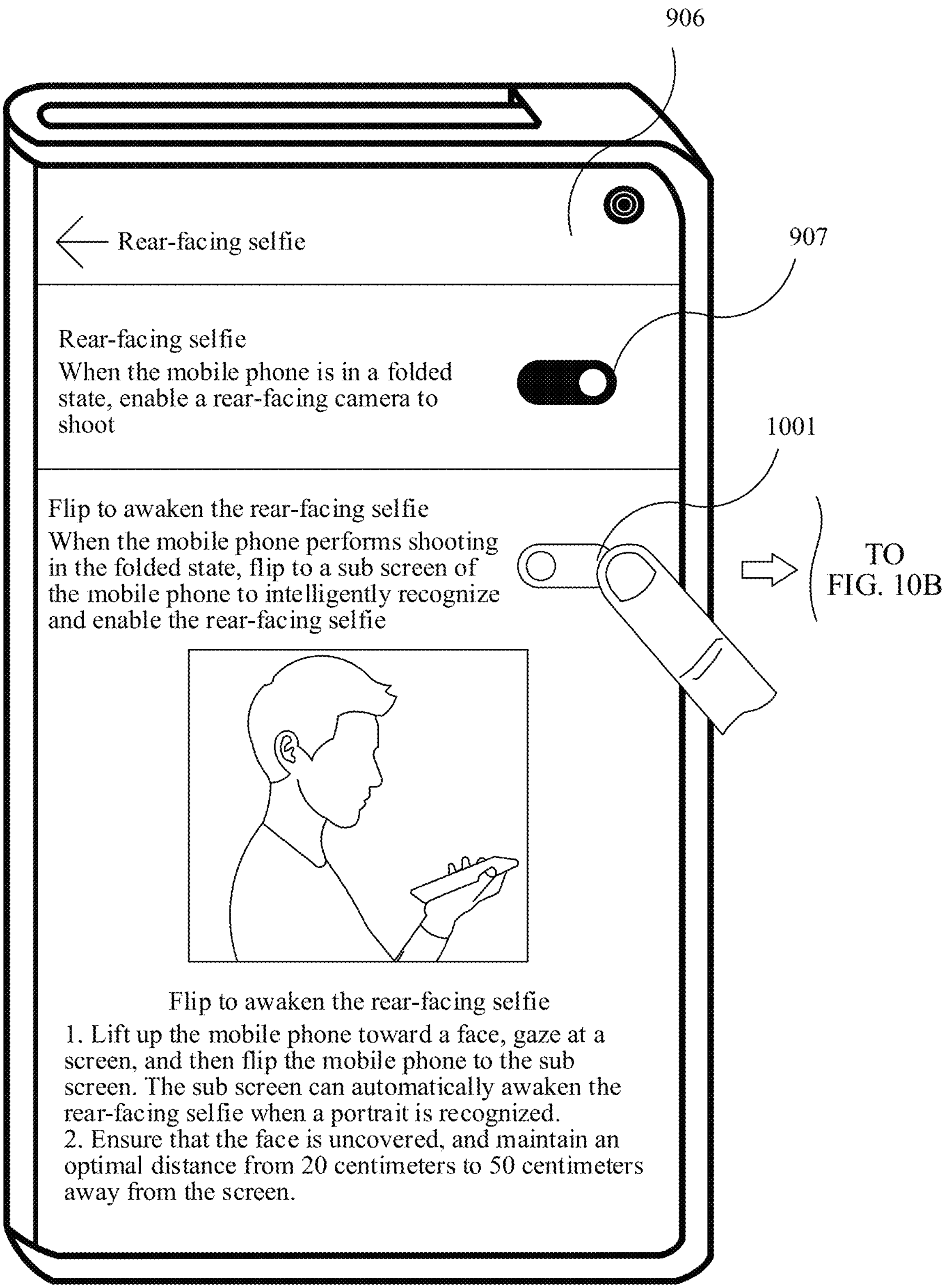
FIG. 10A to FIG. 10C are a schematic diagram of changes of an interface in a setting process of a function of flipping to awaken according to an embodiment of this application.
Figure 10B:
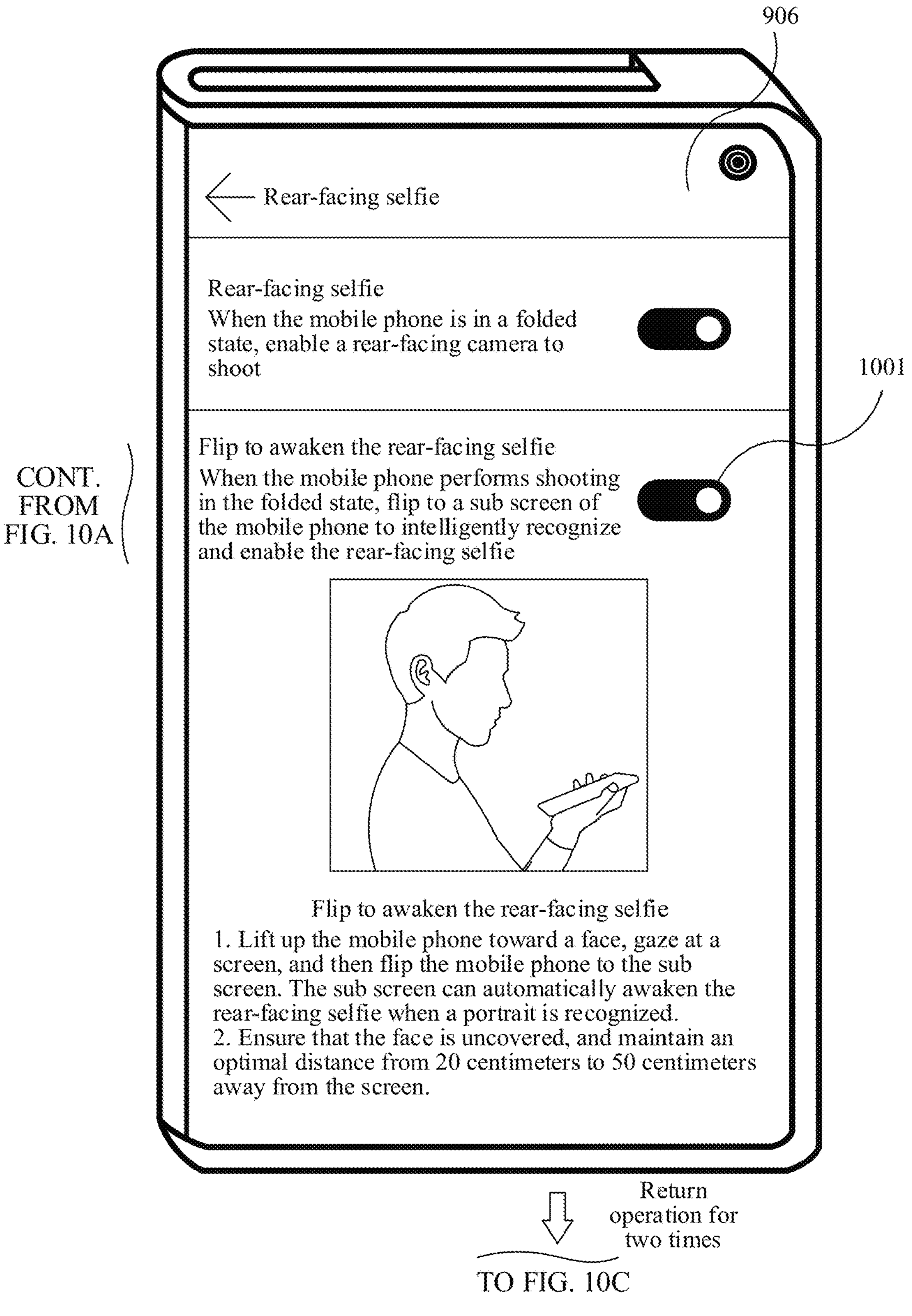
Figures 10B, 10C:
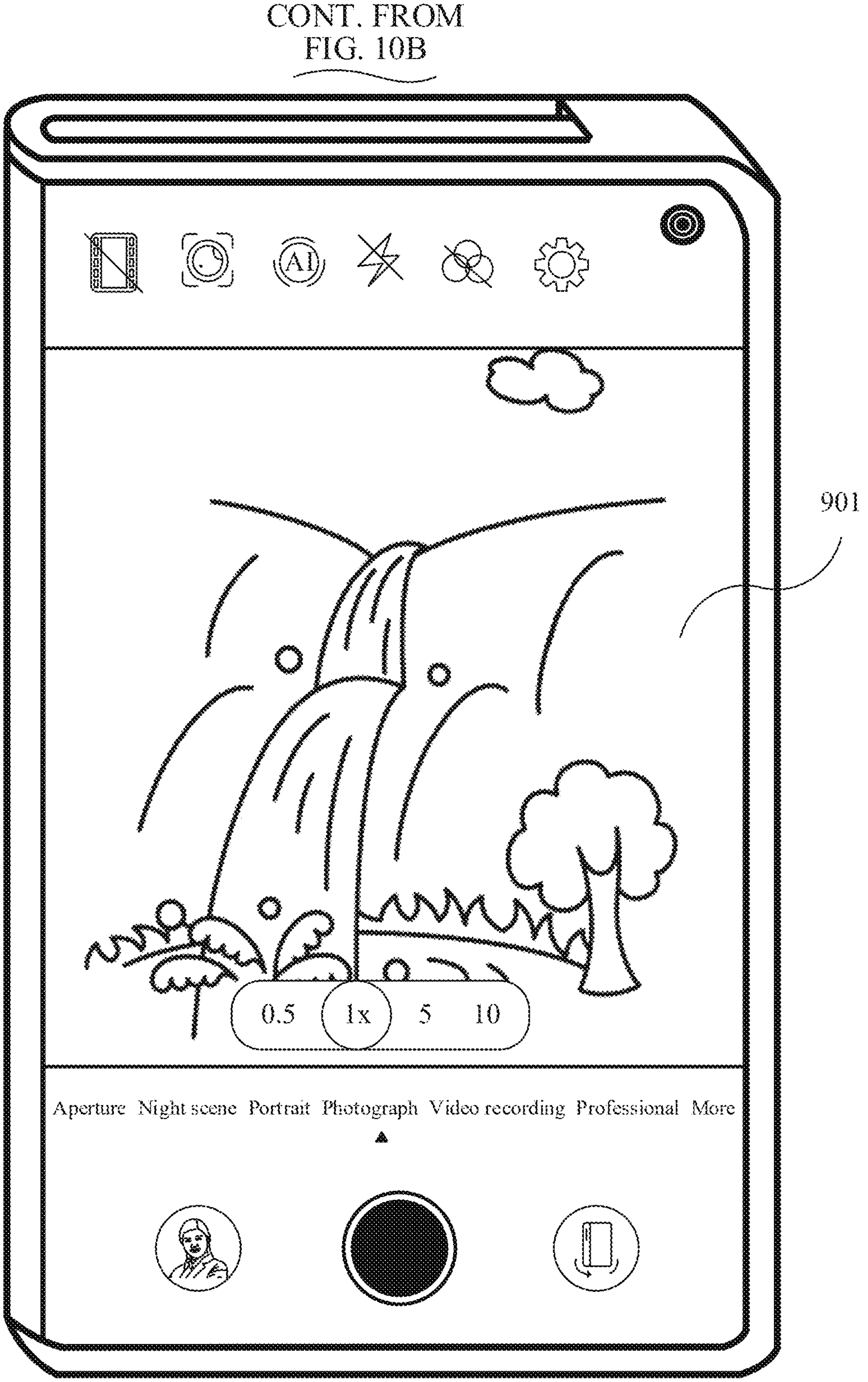

For example, FIG. 10A to FIG. 10C are a schematic diagram of changes of an interface in a setting process of a function of flipping to awaken according to an embodiment of this application. As shown in FIG. 10A, when the foldable mobile phone is in the folded state, after the camera application is started, the user may enter the rear-facing selfie setting interface 906 according to the process shown in (a) to FIG. 8C. For a specific process, refer to the embodiment shown in FIG. 8A to FIG. 8E, and details are not described again.

As shown in FIG. 10A, in this case, the rear-facing selfie switch 907 on the rear-facing selfie setting interface 906 is in the turned-on state, and is highlighted. The rear-facing selfie setting interface 906 includes a switch control (which is referred to as a switch of flipping to awaken) 1001 for flipping to awaken the rear-facing selfie function. The switch 1001 of flipping to awaken is in the turned-off state by default, and is displayed in gray. The user taps the switch 1001 of flipping to awaken, the foldable mobile phone enables the function of flipping to awaken in response to the operation of the user, and the switch 1001 of flipping to awaken is highlighted, as shown in FIG. 10B.

Then, the user performs the return operation for two times, and the foldable mobile phone sequentially exits the rear-facing selfie setting interface 906 and the camera setting interface 904, and restores to display the photographing preview interface 901, as shown in FIG. 10C.

2. Disable the Function of Flipping to Awaken

A process of disabling the function of flipping to awaken is similar to the foregoing enabling process, and a difference lies in that the switch 1001 of flipping to awaken is switched from the turned-on state to the turned-off state in the disabling process. Details are not described herein again.

In this embodiment, the user may actively set enabling and disabling of the function of flipping to awaken as required, to satisfy different use requirements of the user, so as to satisfy requirements of the user in different use scenarios, facilitate the user operation, and improve the user experience.

IV. Enter the Rear-Facing Selfie Function

When the rear-facing selfie function is enabled, when using the camera application, the user may enter the rear-facing selfie function through a corresponding operation. After the rear-facing selfie function is entered, the home screen of the foldable mobile phone is turned off and the sub screen is turned on. The foldable mobile phone obtains an image by using the rear-facing camera and displays a photographing preview interface 1106 (which is also referred to as a first photographing preview interface) on the sub screen. The photographing preview interface 1106 includes the image obtained by using the rear-facing camera. In other words, the photographing preview interface 1106 is a photographing preview interface in the rear-facing selfie scenario, that is, a photographing preview interface when the rear-facing selfie function is used. When the foldable mobile phone displays the photographing preview interface 1106, after flipping the mobile phone, the user may take a selfie by using the rear-facing camera, so that quality and an effect of an image obtained through selfie are better, and the user experience is improved. In addition, in a process of using the rear-facing selfie function, the user may perform, by using the sub screen, an operation related to the selfie, thereby facilitating the use, and further improving the user experience.

In this embodiment of this application, a plurality of manners of entering the rear-facing selfie function are provided, and are respectively described below with reference to scenarios.

1. Guide to Enter the Rear-Facing Selfie Function when a Camera is Initially Started As described above, when the foldable mobile phone is ay delivery, the rear-facing selfie function is enabled by default. When the user initially starts the camera application of the foldable mobile phone, the foldable mobile phone starts the photographing preview interface 901 by default, and displays guidance information on the photographing preview interface 901, to guide the user to use the rear-facing selfie function, so that the user learns a method of using the rear-facing selfie function, and the user experience is improved.

Figure 11A:
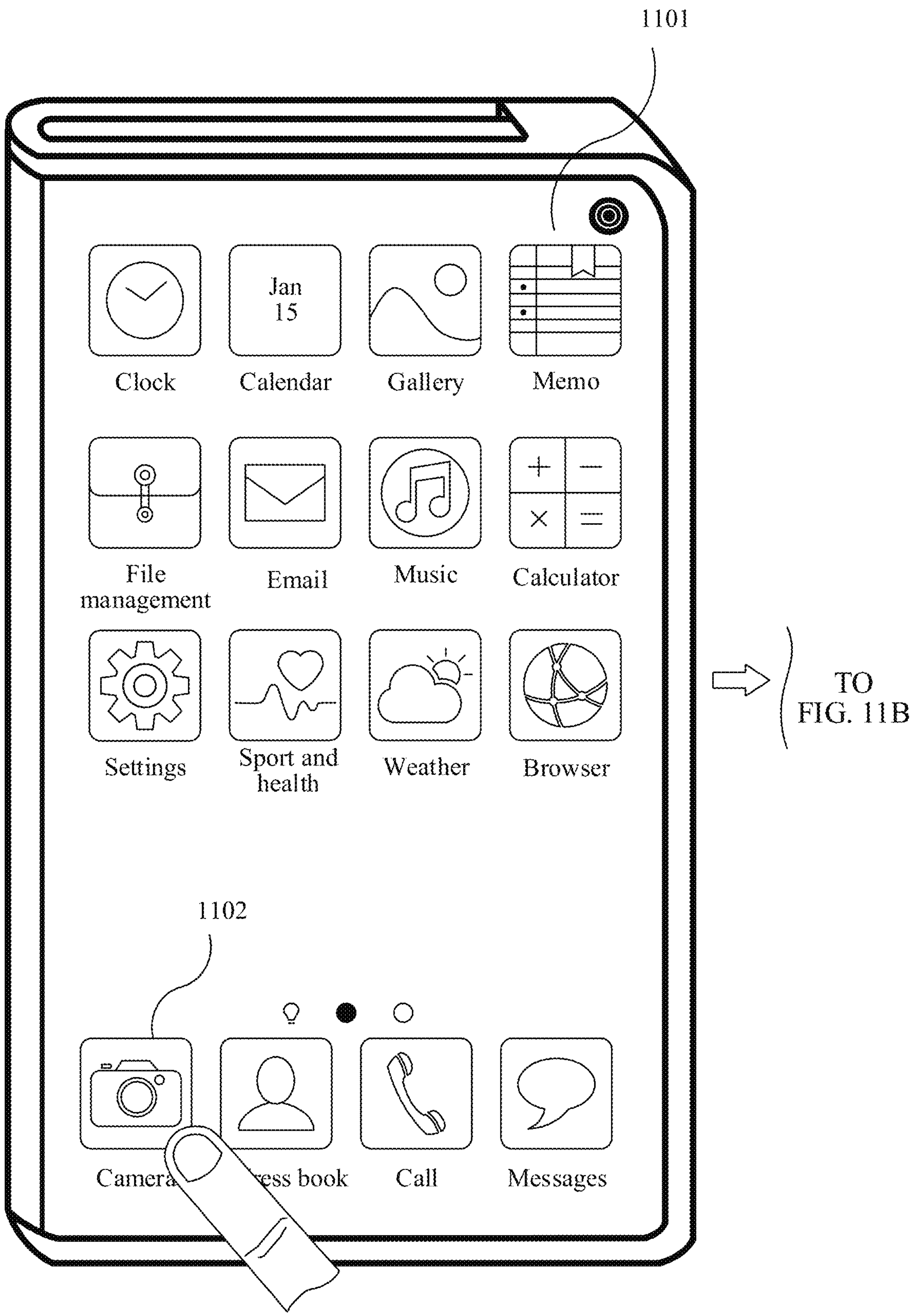
FIG. 11A to FIG. 11D are a schematic diagram of changes of an interface in a process of guidance to enter a rear-facing selfie function according to an embodiment of this application.

For example, FIG. 11A to FIG. 11D are a schematic diagram of changes of an interface in a process of guidance to enter a rear-facing selfie function according to an embodiment of this application. As shown in FIG. 11A, when the foldable mobile phone is in the folded state, the sub screen of the foldable mobile phone is in a screen-off state, the home screen is in a screen-on state, and the home screen displays a main interface 1101.

It should be noted that, generally, in the folded state, when the home screen is turned on, the user faces a surface on which the home screen of the foldable mobile phone is located toward the user, and faces a surface on which the sub screen is located (that is, a surface on which the rear-facing camera is located) away from the user. The embodiments of this application are all described by using this example, to facilitate describing cases that are before and after the user flips the foldable mobile phone.

Figure 11B:
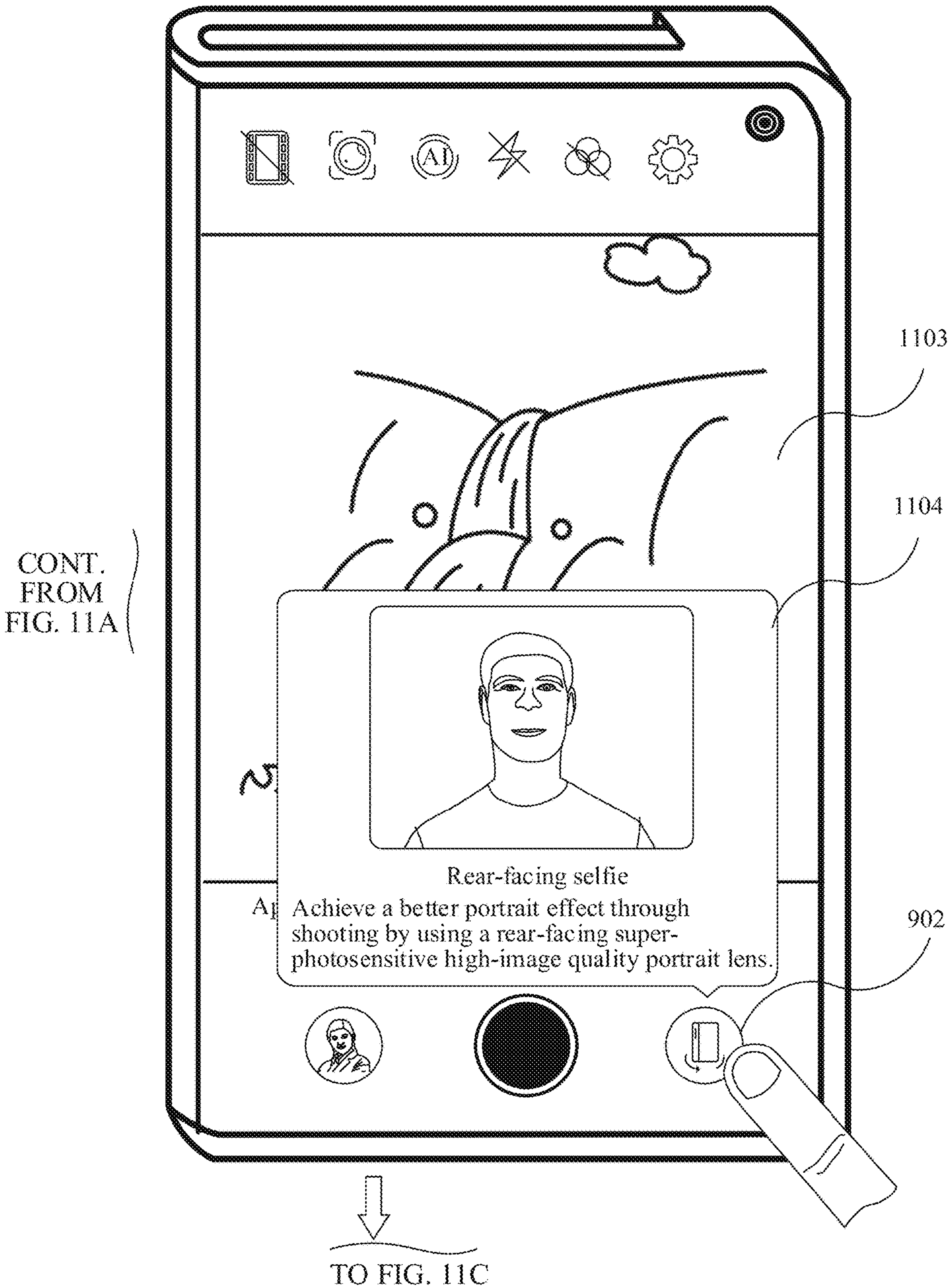

The main interface 1101 includes an icon 1102 of the camera application. The user taps the icon 1102 of the camera application, to trigger to initially start the camera application. In response to the operation of the user, the foldable mobile phone obtains an image by using the rear-facing camera by default, and displays a photographing preview interface 1103 (which is also referred to as a second photographing preview interface) by using the home screen, as shown in FIG. 11B. The photographing preview interface 1103 is similar to the photographing preview interface 901 shown in FIG. 8A. A difference lies in that, in this embodiment, the user initially starts the camera application of the foldable mobile phone. Therefore, the photographing preview interface 1103 further includes guidance information 1104. The guidance information 1104 is used to guide the user to enter the rear-facing selfie function by using the rear-facing selfie control 902.

Optionally, the guidance information 1104 may be displayed in a form of a bubble, a card, a capsule, or the like. The guidance information 1104 may include a prompt text, a prompt picture, or the like used to describe the rear-facing selfie function. For example, in FIG. 11B, the guidance information 1104 may include a prompt picture (a person selfie picture), and a prompt text such as "Achieve a better portrait effect through shooting by using a rear-facing super-photosensitive high-image quality portrait lens".

Figures 11B, 11C:
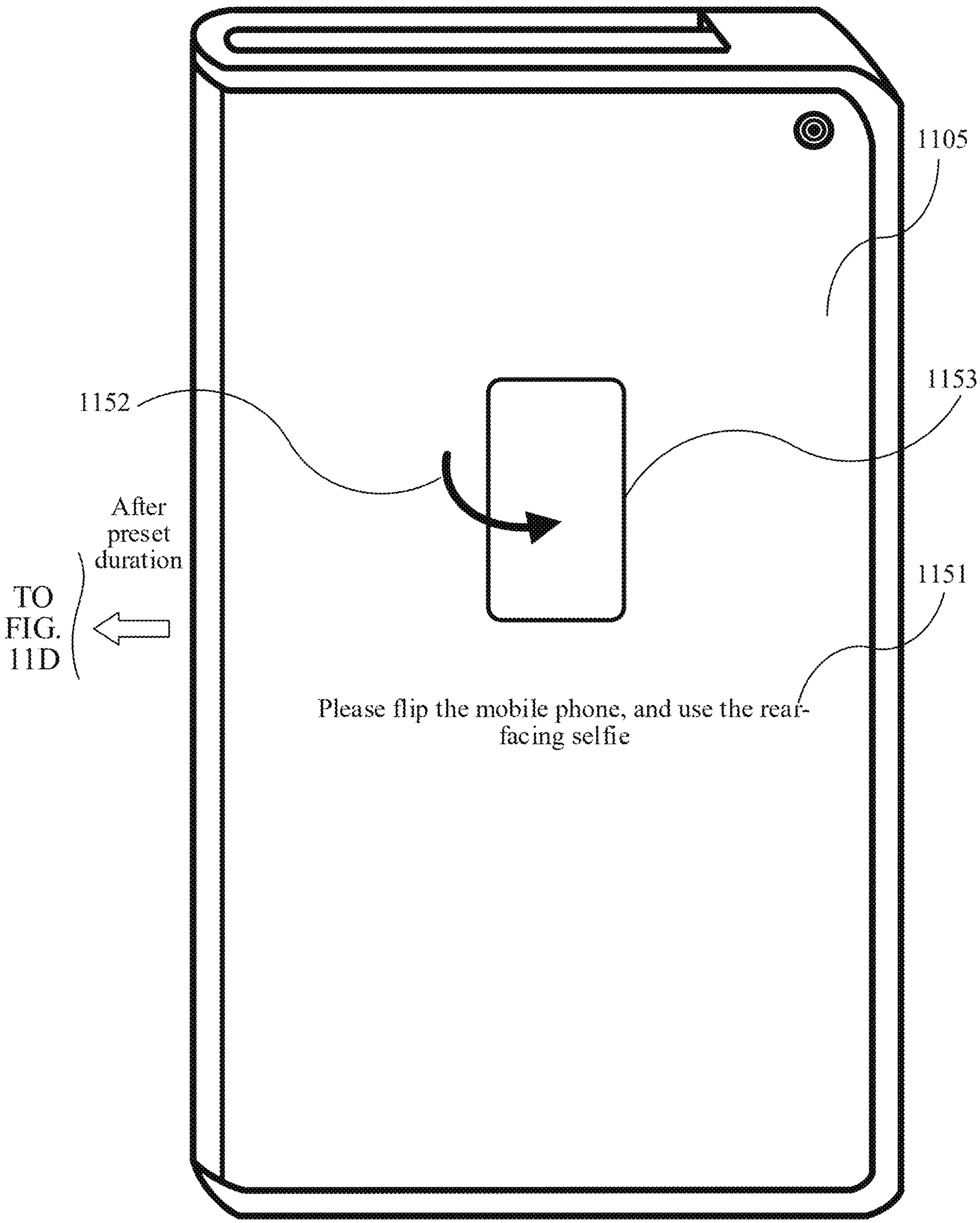

The user taps the rear-facing selfie control 902 (where this operation is also referred to as a first operation), and the foldable mobile phone displays, in response to the operation of the user, a flipping guidance interface (which is also referred to as a first flipping guidance interface) 1105 by using the home screen, as shown in FIG. 11C. The flipping guidance interface 1105 is used to guide the user to flip the foldable mobile phone, so that the surface on which the sub screen is located (that is, the surface on which the rear-facing camera is located) faces the user and the surface on which the home screen is located faces away from the user. Optionally, the flipping guidance interface 1105 may include text prompt information 1151, an arrow 1152 indicating a flipping direction, and a schematic diagram 1153 of the foldable mobile phone. Optionally, a plurality of schematic diagrams 1153 of the foldable mobile phone from different angles may be continuously displayed on the flipping guidance interface 1105, to present a dynamic image of flipping the mobile phone, so as to more clearly guide the user to flip the mobile phone, thereby improving the user experience. Optionally, the text prompt information 1151 may be, for example, "Please flip the mobile phone, and use the rear-facing selfie".

Optionally, in this embodiment of this application, when the flipping guidance interface is displayed on the home screen or the sub screen, a touch function of the screen may be hidden (that is, shielded), that is, the screen does not respond to a touch operation of the user. In this way, a case in which entering the rear-facing selfie function is affected by accidental touch of the user on the screen can be avoided, and the user experience is improved.

Figure 11D:
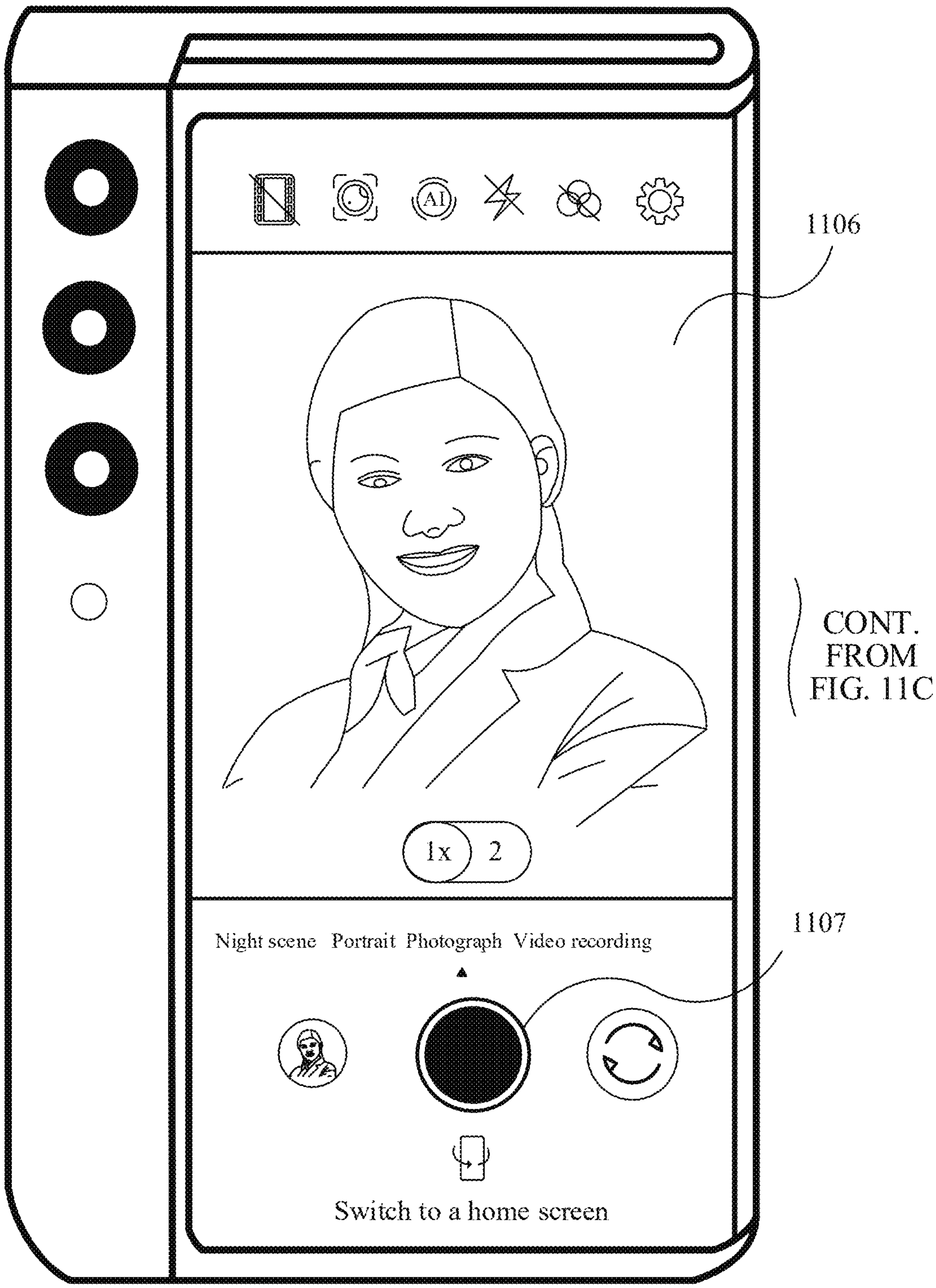

After the flipping guidance interface 1105 is displayed for preset duration (for example, three seconds), the camera application enters the rear-facing selfie function. Specifically, the foldable mobile phone turns off the home screen, and controls to turn on the sub screen. Meanwhile, an image is obtained by using the rear-facing camera, and the photographing preview interface 1106 is displayed by using the sub screen. The photographing preview interface 1106 includes the image obtained by the rear-facing camera. After the user flips the foldable mobile phone, the surface on which the sub screen is located (that is, the surface on which the rear-facing camera is located) faces the user, and the surface on which the home screen is located faces away from the user. In this way, as shown in FIG. 11D, the photographing preview interface 1106 may display the image (that is, a selfie image) of the user that is obtained by using the rear-facing camera.

Optionally, in some other embodiments, when the home screen displays the flipping guidance interface 1105, the sub screen may be simultaneously turned on, an image is obtained by using the rear-facing camera, and the photographing preview interface 1106 is displayed by using the sub screen. In other words, after the user taps the rear-facing selfie control, the sub screen displays the flipping guidance interface 1105, the sub screen is turned on, and the photographing preview interface 1106 is displayed by using the sub screen.

Optionally, when the sub screen displays the flipping guidance interface 1105, the foldable mobile phone may shield the touch functions of the home screen and the sub screen, in other words, the touch functions of the home screen and the sub screen are shielded within preset duration (such as 3*s*) after the user taps the rear-facing selfie control 902. In this way, the accidental touch of the user can be avoided, and the user experience is improved.

The photographing preview interface 1106 includes a photographing control 1107. The user taps the photographing control 1107, and the camera application stores the image obtained by using the rear-facing camera.

Optionally, photographing modes supported by the rear-facing selfie function may include a photographing mode, a video recording mode, a portrait mode, a night scene mode, and the like. In a possible implementation, after the user enters the rear-facing selfie function according to the foregoing process, a default photographing mode is consistent with a photographing mode before the rear-facing selfie function is entered, that is, a photographing mode on the photographing preview interface 1106 is consistent with a photographing mode on the photographing preview interface 1103. In this way, selection of the user can be inherited, and the user experience is improved. Certainly, after entering the rear-facing selfie function, the user may alternatively switch the photographing mode to another mode as required.

It may be understood that, when the user does not initially use the camera (uses the camera for the second time and each time later), the guidance information may no longer be displayed on the photographing preview interface, to prevent disturbance to the user, and further improve the user experience. When the camera is not initially used, a manner of entering the rear-facing selfie function and interface display are the same as those in the foregoing process, and details are not described again.

2. Flip the Mobile Phone to Awaken the Rear-Facing Selfie Function

As described above, the camera application of the foldable mobile phone may have the function of flipping to awaken the rear-facing selfie. When the function of flipping to awaken the rear-facing selfie and the rear-facing selfie function are simultaneously enabled (referring to FIG. 10A to FIG. 10C), the foldable mobile phone may automatically detect an operation of the user. If the operation of the user satisfies a requirement of flipping to awaken, the camera application automatically enters the rear-facing selfie function. In this way, the user does not need to perform an operation such as tapping the rear-facing selfie control on the interface, so that the rear-facing selfie function can be entered quickly and conveniently, thereby improving intelligence of the mobile phone, and further improving the user experience. Descriptions are provided below with reference to the accompanying drawings.

Figure 12A:
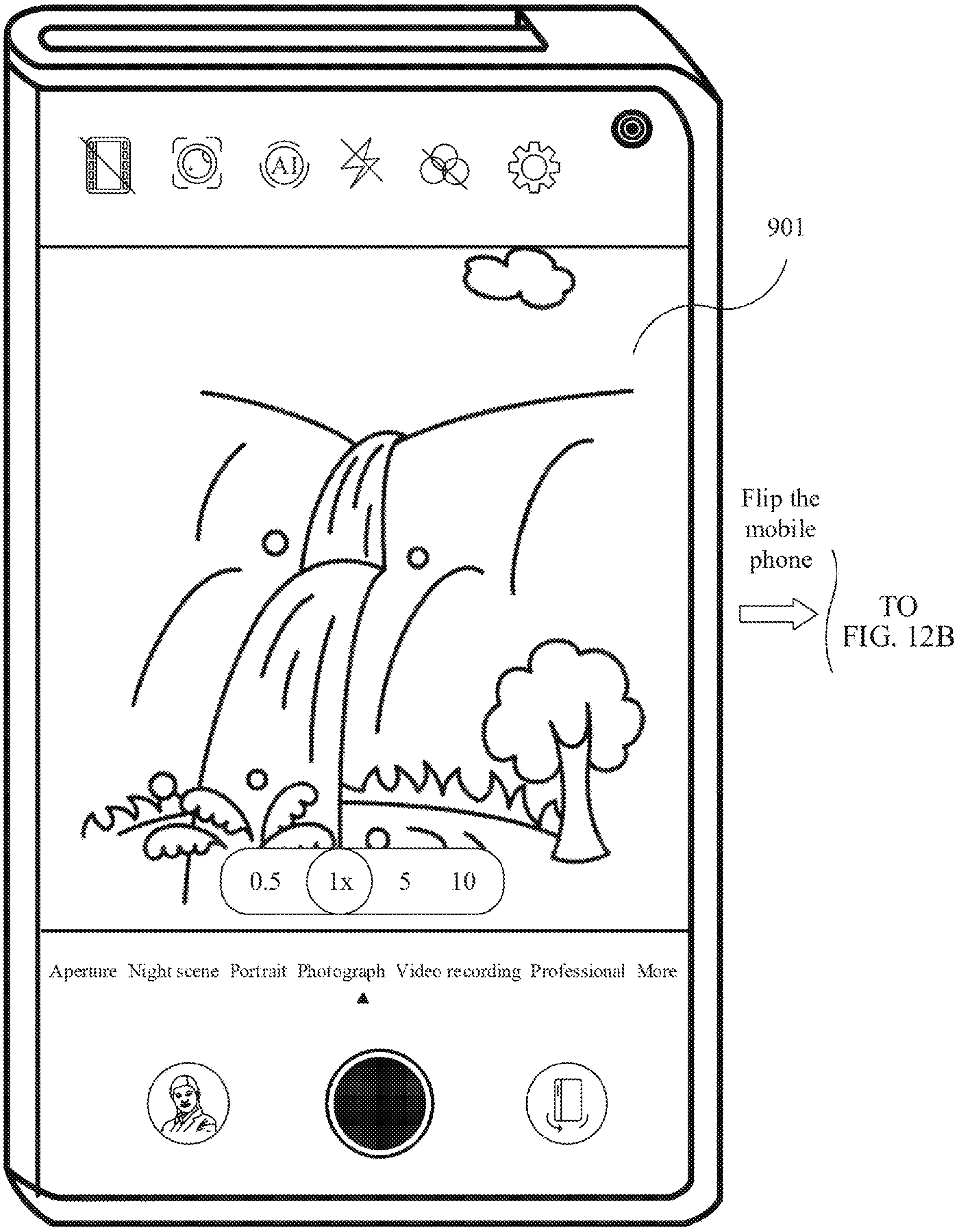
FIG. 12A and FIG. 12B are a schematic diagram of changes of an interface in a process in which a mobile phone is flipped to awaken rear-facing selfie according to an embodiment of this application.
Figure 12B:
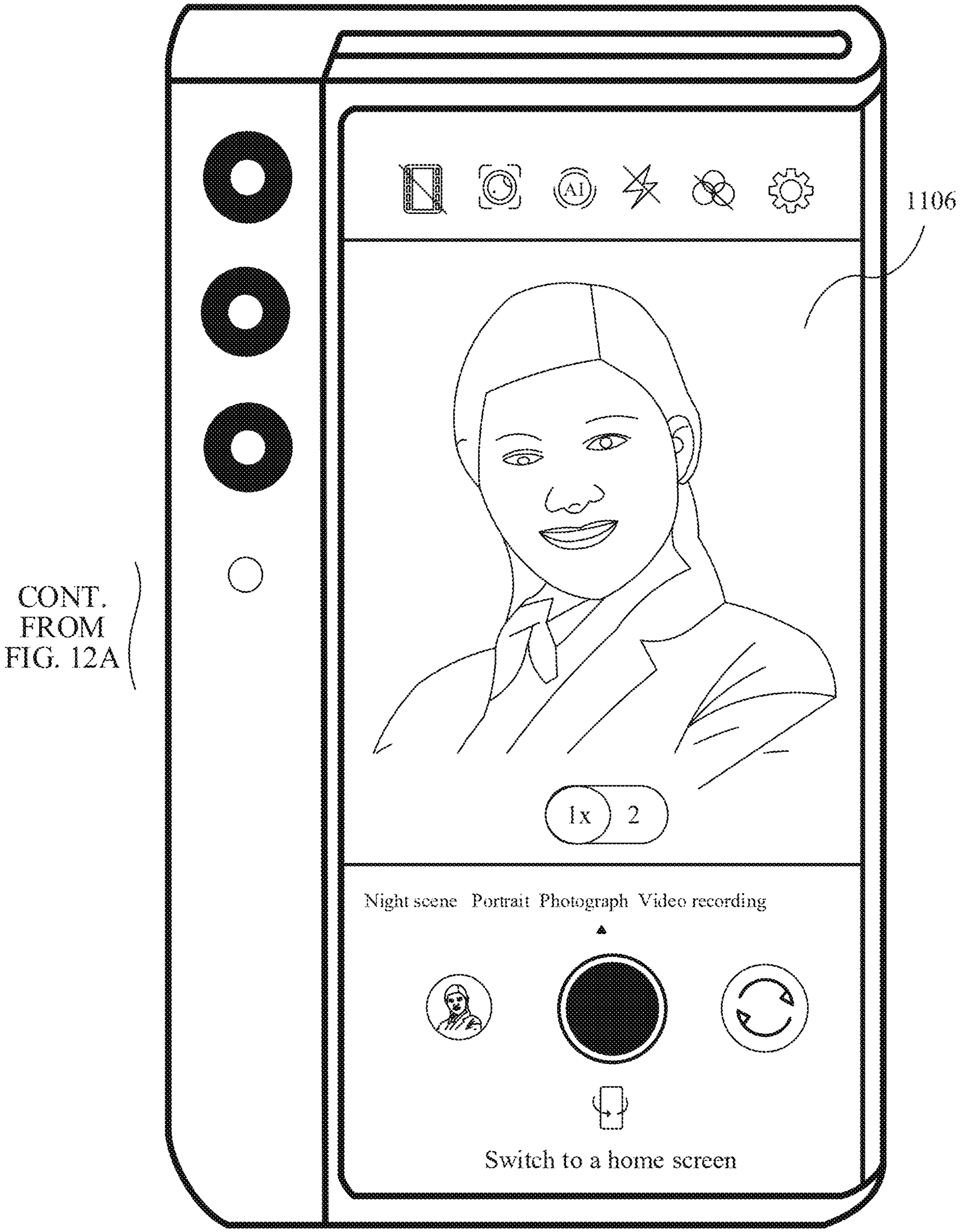

For example, FIG. 12A and FIG. 12B are a schematic diagram of changes of an interface in a process in which a mobile phone is flipped to awaken rear-facing selfie according to an embodiment of this application. As shown in FIG. 12A, when the foldable mobile phone is in the folded state, the sub screen of the foldable mobile phone is in the screen-off state, and the home screen is in the screen-on state. When the camera application is started in the foldable mobile phone, and the rear-facing selfie function is enabled but not entered, the photographing preview interface 901 is displayed on the home screen. In this case, the surface on which the home screen of the foldable mobile phone is located faces the user, and the surface on which the sub screen is located faces away from the user.

If the user wants to use the rear-facing selfie function, the user may lift up the foldable mobile phone based on the requirement of flipping to awaken, enable the home screen of the foldable mobile phone to face toward the face, and gazes at the screen. Then, the user flips the foldable mobile phone, to enable the surface on which the sub screen is located to face the user, and the surface on which the home screen is located to face away from the user. In this process, the foldable mobile phone recognizes the face by using the front-facing camera, detects, by using the sensor, that the user flips the mobile phone, and then recognizes the face by using the rear-facing camera. The camera application directly enters the rear-facing selfie function. The foldable mobile phone controls to turn off the home screen and turn on the sub screen, and displays the photographing preview interface 1106 on the sub screen, as shown in FIG. 12B.

When the user wants to exit the rear-facing selfie function, the user may operate according to a reverse process of the foregoing process, that is, lifting up the foldable mobile phone, enabling the sub screen of the foldable mobile phone to face toward the face, and gazing at the screen. Then, the user flips the foldable mobile phone, to enable the surface on which the home screen is located to face the user, and the surface on which the sub screen is located to face away from the user. After the foldable mobile phone recognizes the face by using the rear-facing camera, detects that the user flips the mobile phone, and recognizes the face by using the front-facing camera, the foldable mobile phone directly exits the rear-facing selfie function, turns off the sub screen, turns on the home screen, and displays the photographing preview interface 901 on the home screen, as shown in FIG. 12A.

3. Enter the Rear-Facing Selfie Function by Using a Desktop Shortcut Menu (which is Also Referred to as a Desktop Long Press Menu Shut Cut)

In this embodiment, when the rear-facing selfie function is enabled, alternatively, the user may directly enter the rear-facing selfie function by using the desktop shortcut menu, and the user does not need to perform the operation of opening the photographing preview interface 901 and the operation of tapping the rear-facing selfie control on the photographing preview interface 901, so that an operation process of entering the rear-facing selfie function by the user is simplified, and the user experience is improved.

Figure 13A:
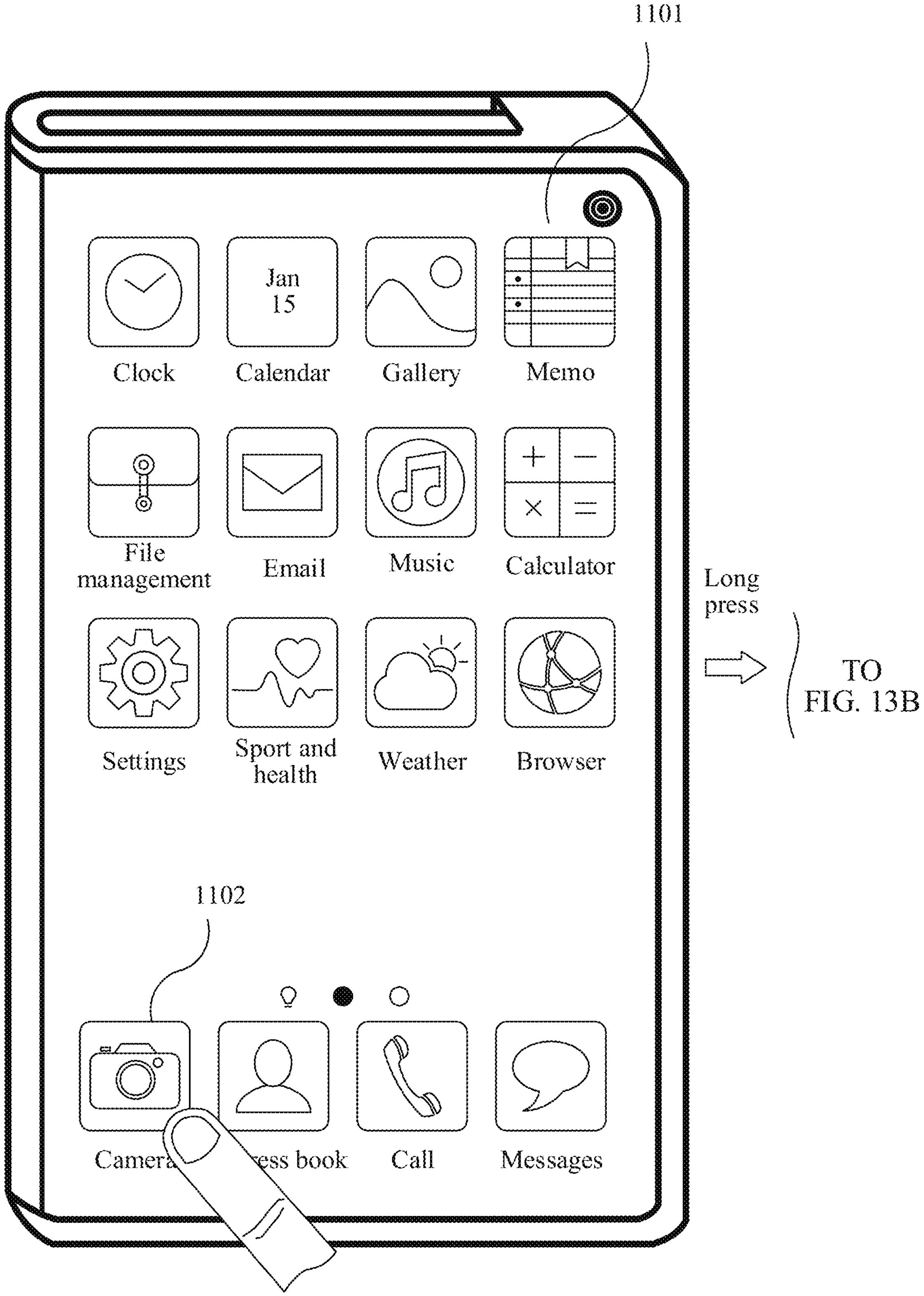
FIG. 13A to FIG. 13D are a schematic diagram of changes of an interface in a process in which a rear-facing selfie function is entered by using a desktop shortcut menu according to an embodiment of this application.

For example, FIG. 13A to FIG. 13D are a schematic diagram of changes of an interface in a process in which a rear-facing selfie function is entered by using a desktop shortcut menu according to an embodiment of this application. As shown in FIG. 13A, when the foldable mobile phone is in the folded state, the sub screen of the foldable mobile phone is in the screen-off state, the home screen is in the screen-on state, and the home screen displays the main interface 1101.

Figure 13B:
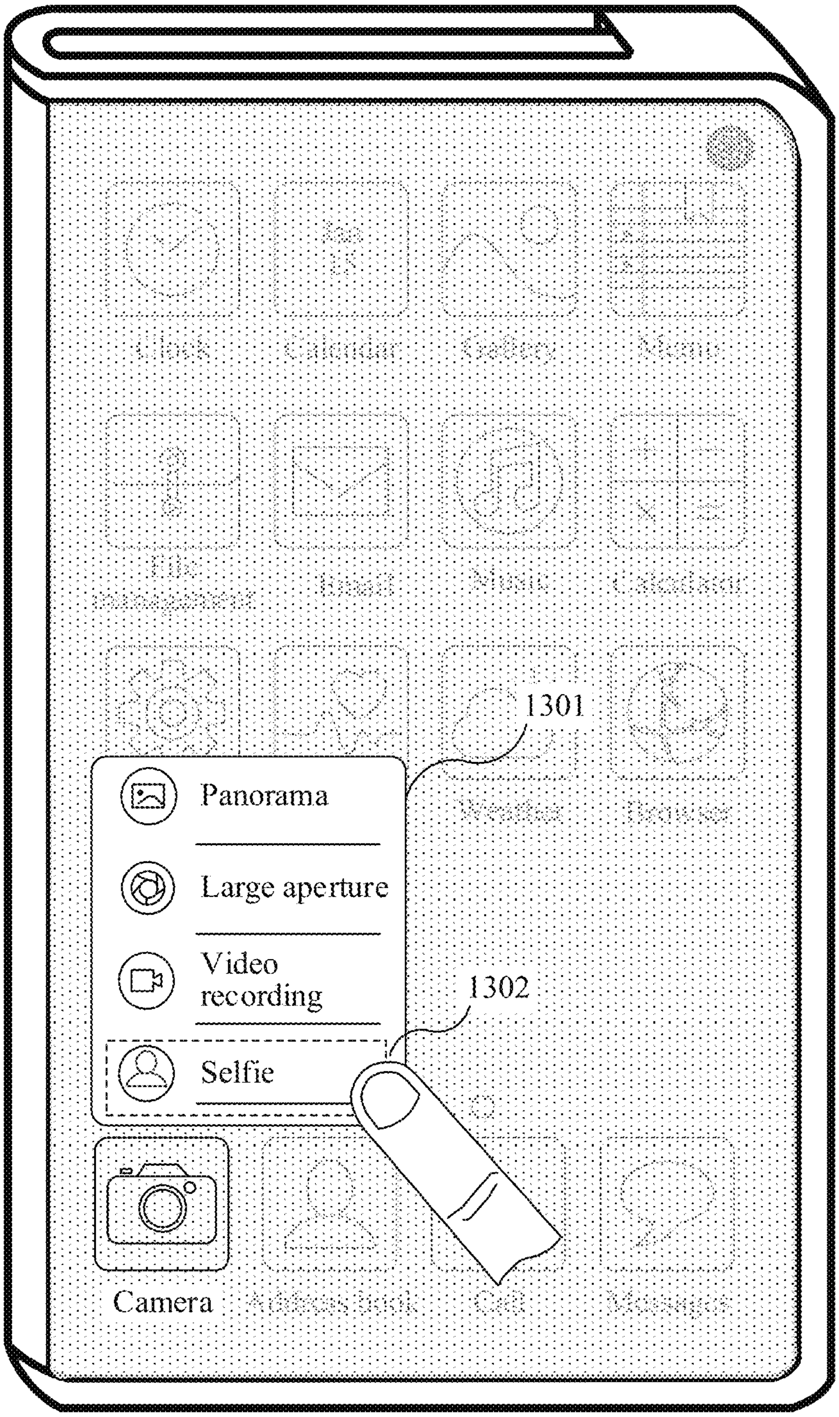

The main interface 1101 includes the icon 1102 of the camera application. The user long presses the icon 1102 of the camera application. In response to the operation of the user, the foldable mobile phone displays a mask on the interface, and displays a shortcut menu (which is also referred to as a first service card) 1301 of the camera application, as shown in FIG. 13B.

Figures 13B, 13C:
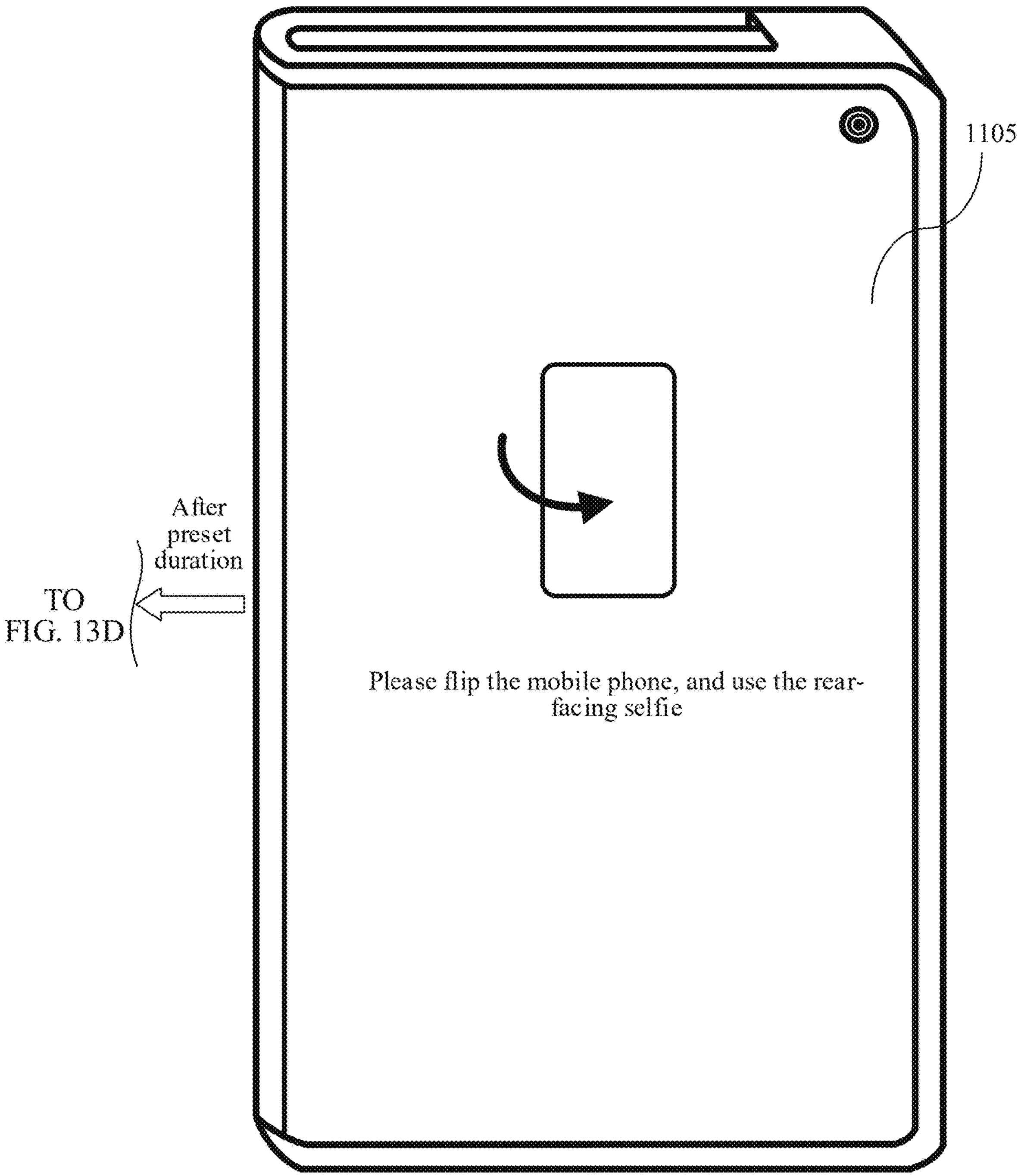

The shortcut menu 1301 includes a selfie option 1302. When the rear-facing selfie function is enabled, the user taps the selfie option 1302, the foldable mobile phone starts the camera application, and displays the flipping guidance interface 1105 by using the home screen, as shown in FIG. 13C.

Figure 13D:
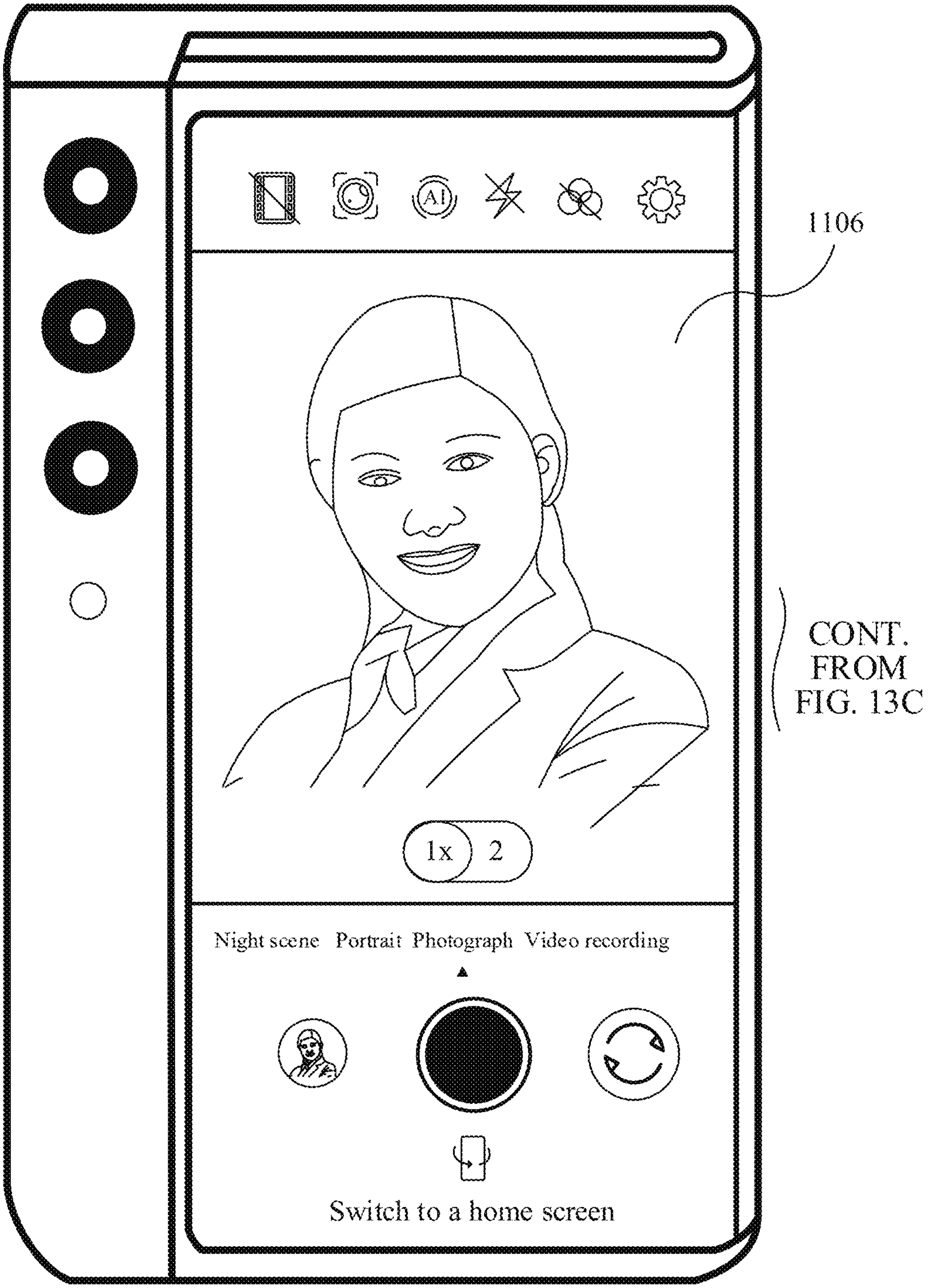

After the flipping guidance interface 1105 is displayed for the preset duration, the camera application enters the rear-facing selfie function. Specifically, as shown in FIG. 13D, the foldable mobile phone turns off the home screen, and controls to turn on the sub screen. Meanwhile, an image is obtained by using the rear-facing camera, and the photographing preview interface 1106 is displayed by using the sub screen. The photographing preview interface 1106 includes the image obtained by the rear-facing camera.

It should be noted that, when the user taps the selfie option 1302, if the rear-facing selfie function is disabled, the foldable mobile phone starts the camera application, obtains an image by using the front-facing camera, and displays the photographing preview interface 1501 (which is also referred to as a second photographing preview interface) by using the home screen. The photographing preview interface 1501 displays the image obtained by using the front-facing camera. The photographing preview interface 1501 is a preview interface in the front-facing selfie scenario. For the photographing preview interface 1501, refer to an interface 1501 in FIG. 15A to FIG. 15D in a subsequent embodiment.

Figure 14A:
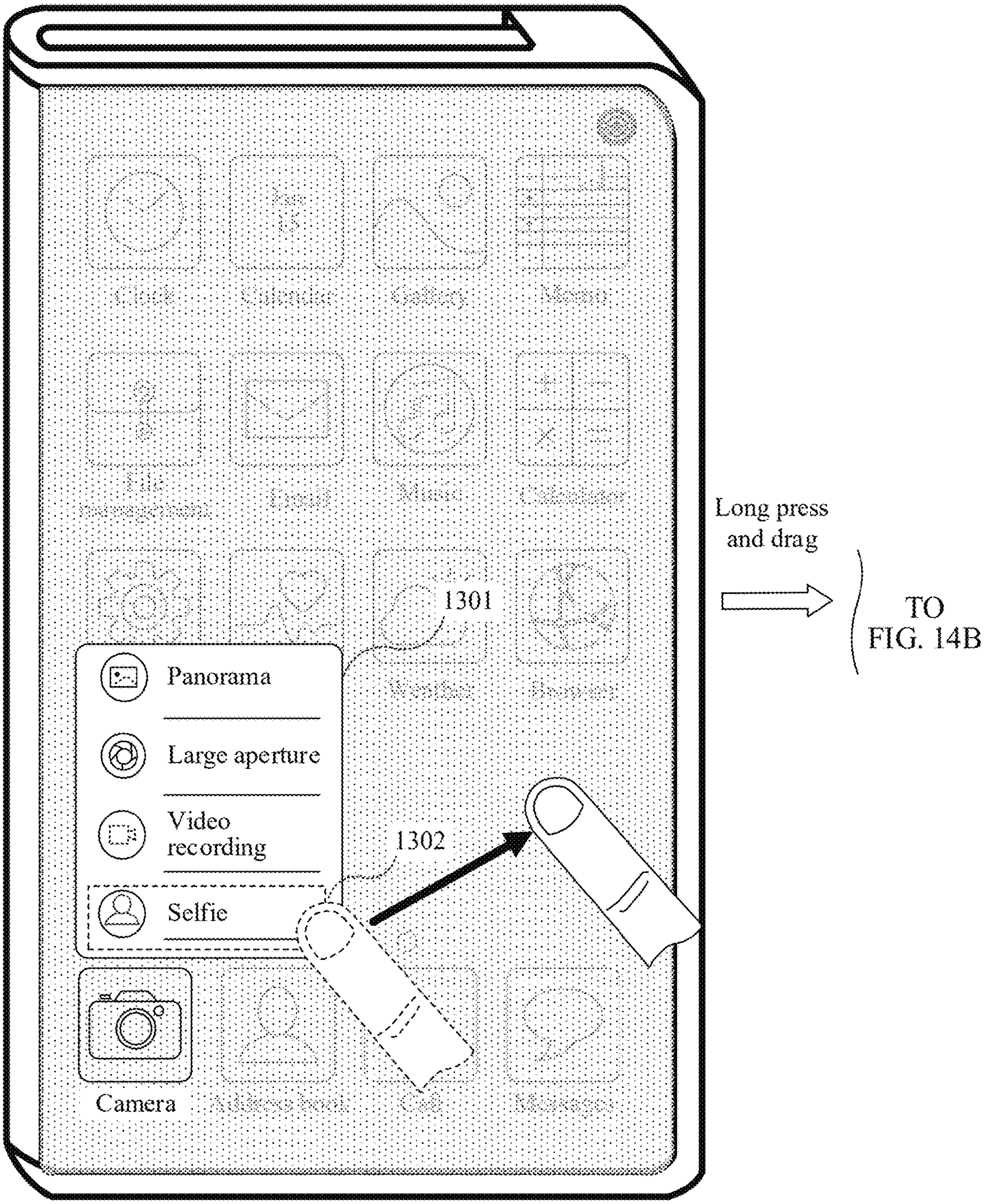
FIG. 14A to FIG. 14D are another schematic diagram of changes of an interface in a process in which a rear-facing selfie function is entered by using a desktop shortcut menu according to an embodiment of this application.
Figure 14B:
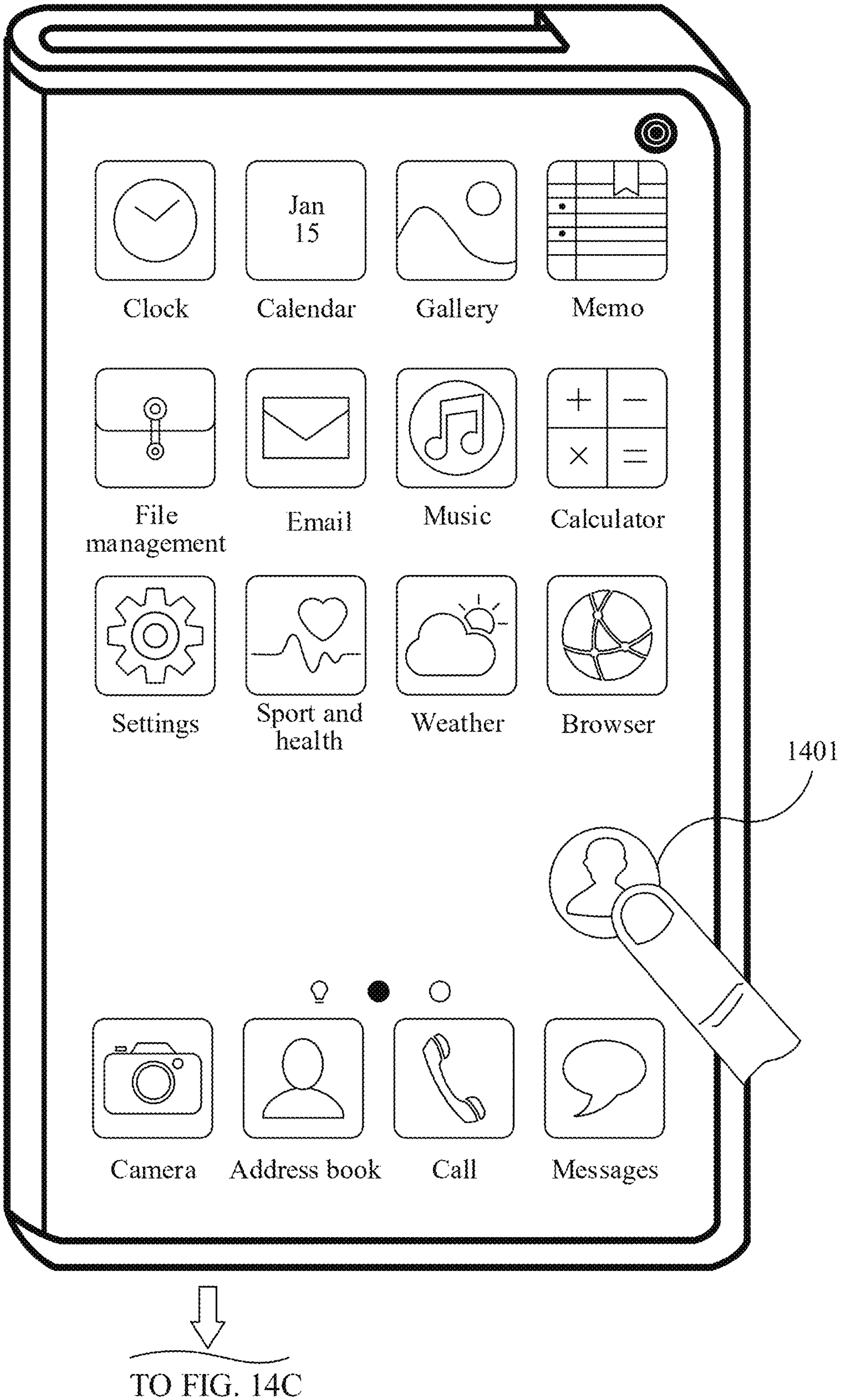

For example, FIG. 14A to FIG. 14D are another schematic diagram of changes of an interface in a process in which a rear-facing selfie function is entered by using a desktop shortcut menu according to an embodiment of this application. Following FIG. 13B, as shown in FIG. 14A, when the foldable mobile phone displays the shortcut menu 1301 of the camera application, the user may alternatively long press and drag the selfie option 1302 to a position on the main interface 1101. After the user lifts up a hand, a desktop shortcut icon (which is referred to as a selfie shortcut icon for short, and is also referred to as a selfie icon) 1401 of the selfie function is displayed at a position at which the hand is lifted up, as shown in FIG. 14B.

Figures 14B, 14C:
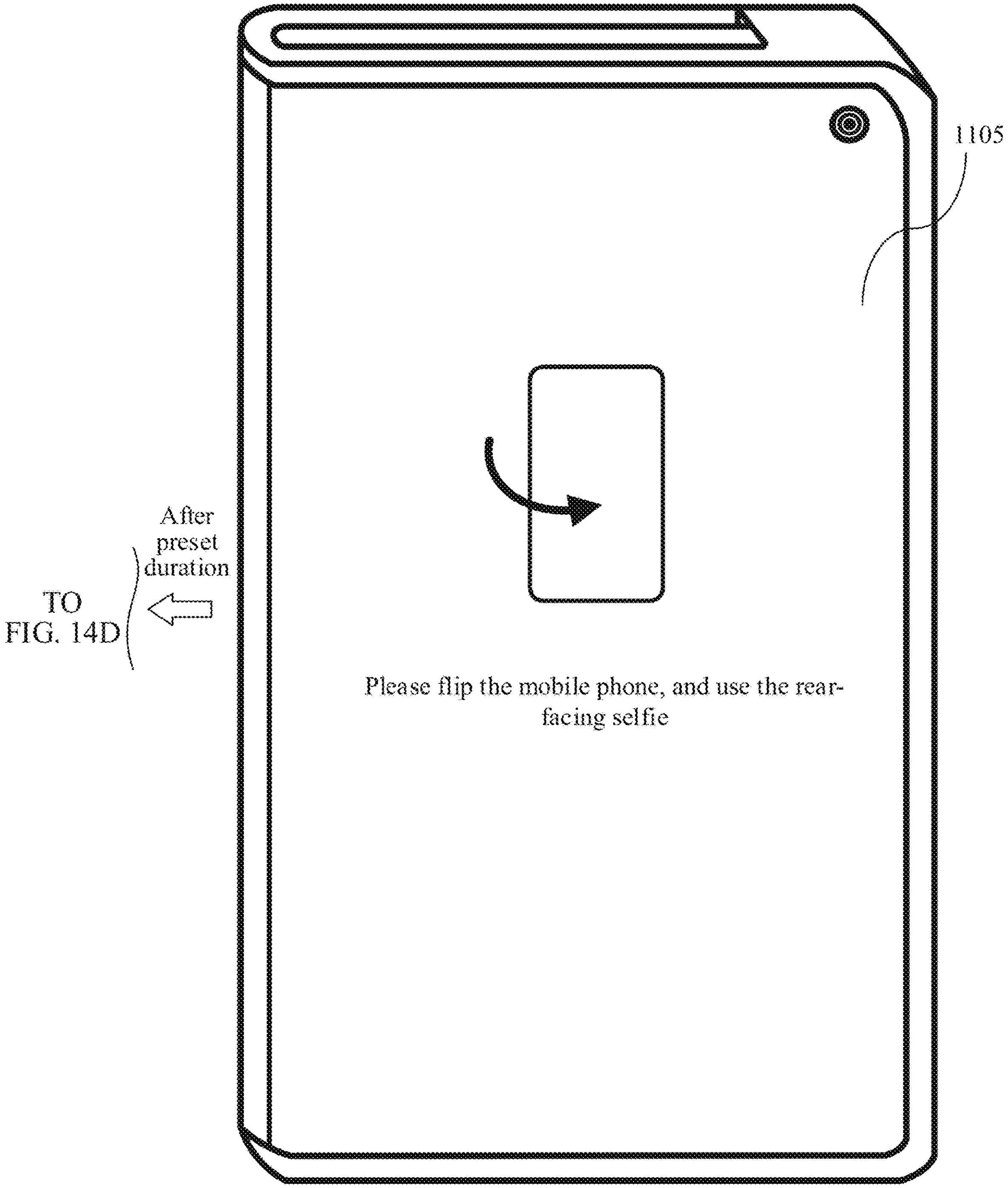
Figure 14D:
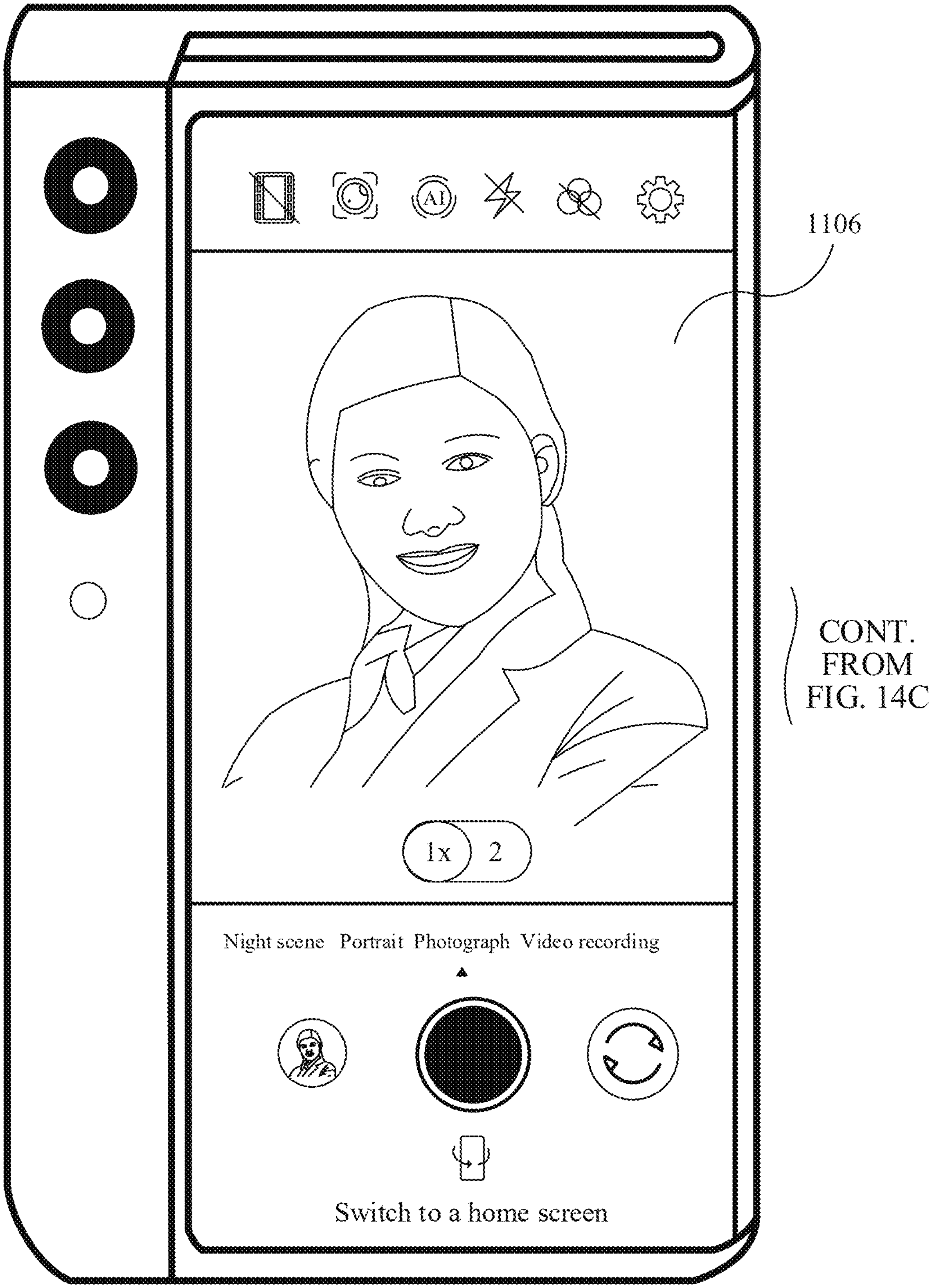

When the rear-facing selfie function is enabled, the user taps the selfie shortcut icon 1401. In response to the operation of the user, the foldable mobile phone starts the camera application, and displays the flipping guidance interface 1105 by using the home screen, as shown in FIG. 14C. After the flipping guidance interface 1105 is displayed for the preset duration, the camera application enters the rear-facing selfie function, and displays the photographing preview interface 1106, as shown in FIG. 14D.

Similarly, when the user taps the selfie shortcut icon 1401, if the rear-facing selfie function is disabled, the foldable mobile phone starts the camera application, obtains an image by using the front-facing camera, and displays the photographing preview interface 1501 by using the home screen. The photographing preview interface 1501 includes the image obtained by using the front-facing camera.

4. Enter the Rear-Facing Selfie Function from the Front-Facing Selfie Scenario

When the foldable mobile phone is in the folded state, and the rear-facing selfie function is disabled, the camera application may enter the front-facing selfie scenario. In the front-facing selfie scenario, the user may enable the rear-facing selfie function again. After the rear-facing selfie function is enabled, the foldable mobile phone directly guides the user to flip the mobile phone, and then the camera application automatically enters the rear-facing selfie function. The user does not need to return to the photographing preview interface again, and the user does not need to tap the rear-facing selfie control, so that use convenience of the user is improved, and the use experience is further improved.

Optionally, when the rear-facing selfie function is disabled, the user may enter the front-facing selfie scenario by tapping the selfie option 1302 shown in FIG. 13A to FIG. 13D, or may enter the front-facing selfie scenario by tapping the selfie shortcut icon 1401 shown in FIG. 14A to FIG. 14D.

Optionally, the user may alternatively enter the front-facing selfie scenario by using the camera flipping control 909 on the photographing preview interface 908. The following describes, with reference to the accompanying drawings, a process of entering the front-facing selfie scenario and a process of entering the rear-facing selfie function from the front-facing selfie scenario.

Figure 15A:
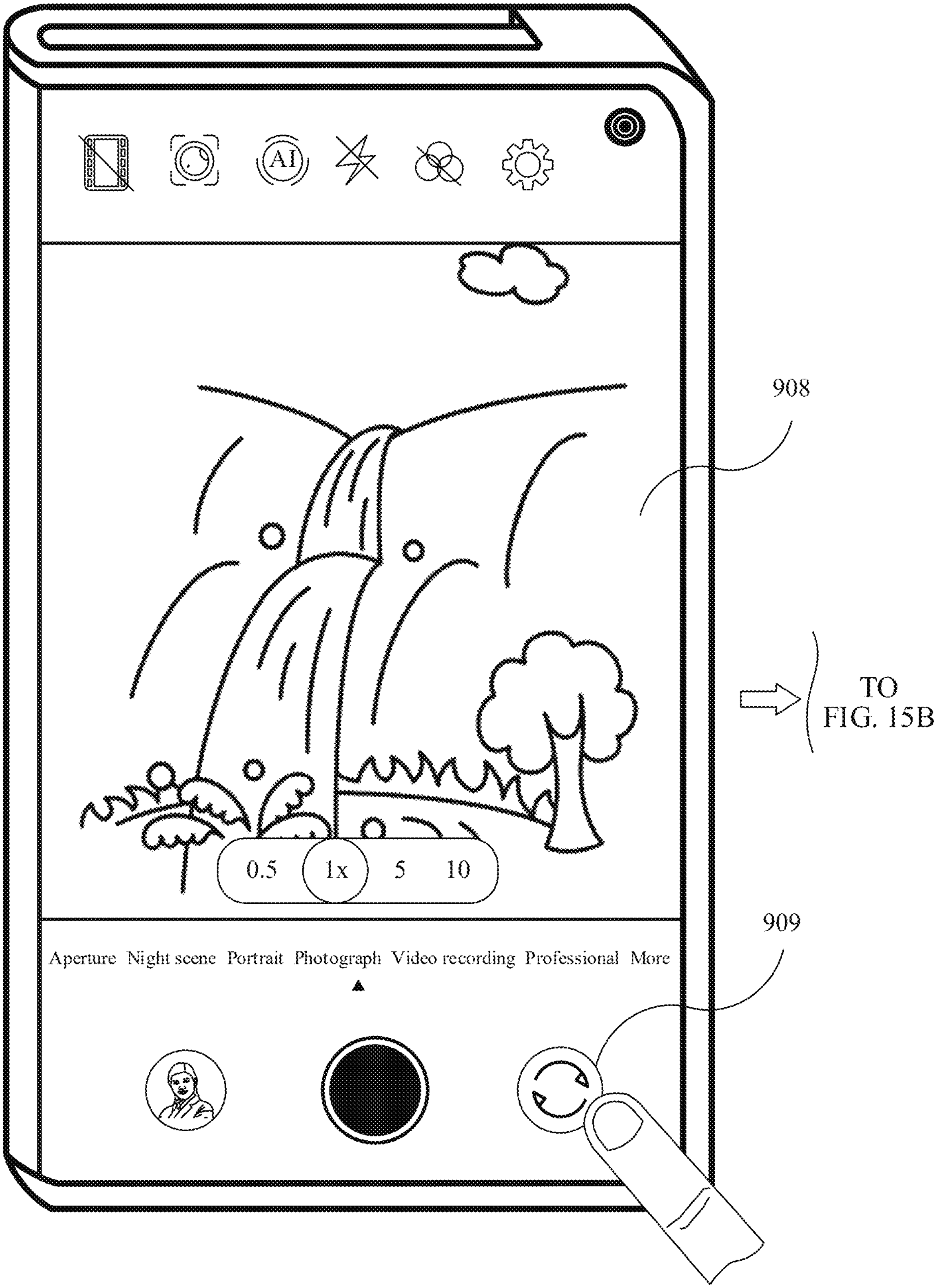
FIG. 15A to FIG. 15D are a schematic diagram 1 of changes of an interface in a process in which a rear-facing selfie function is entered from a front-facing selfie scenario according to an embodiment of this application.
Figure 15B:
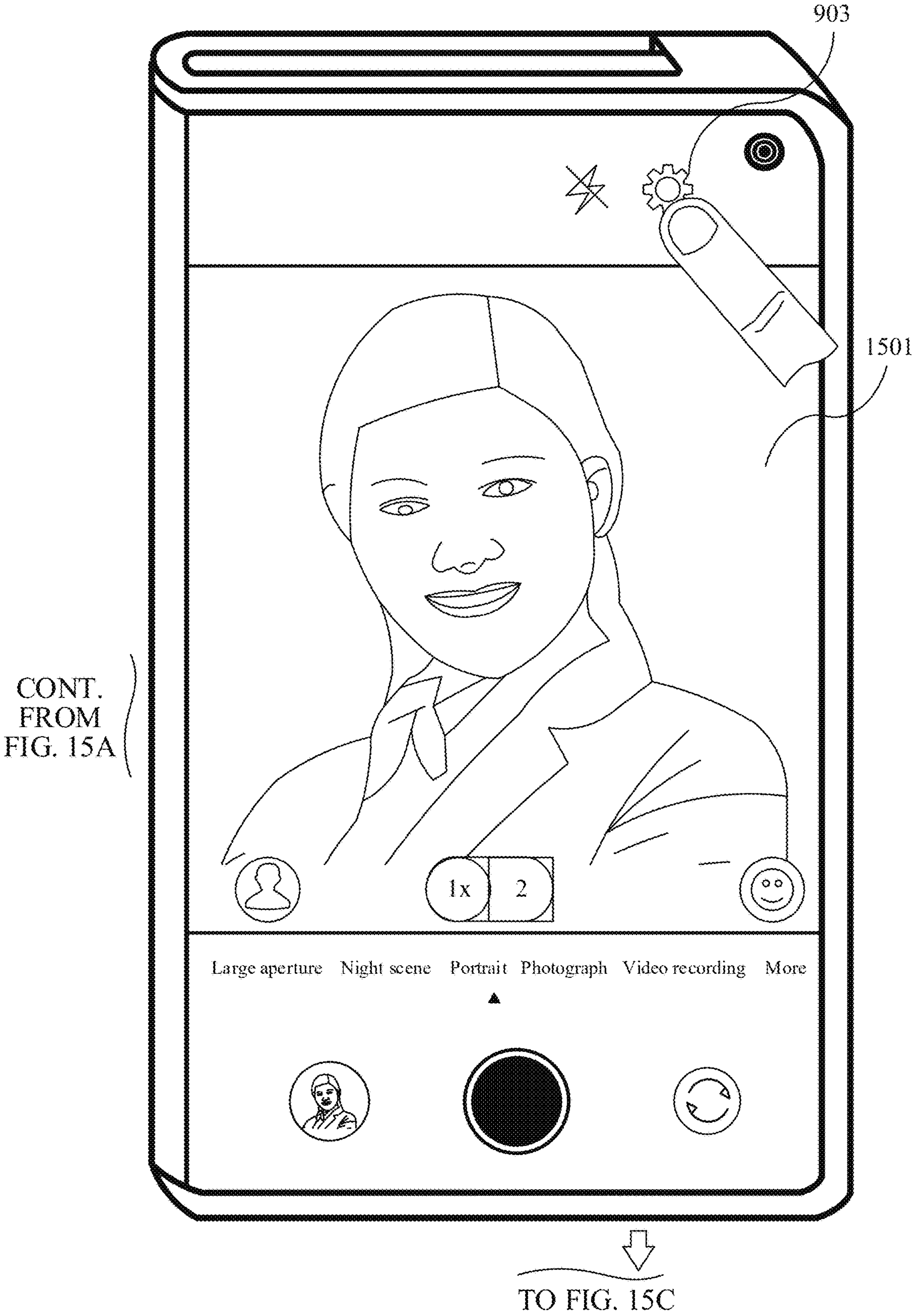
Figures 15B, 15C, 15D:
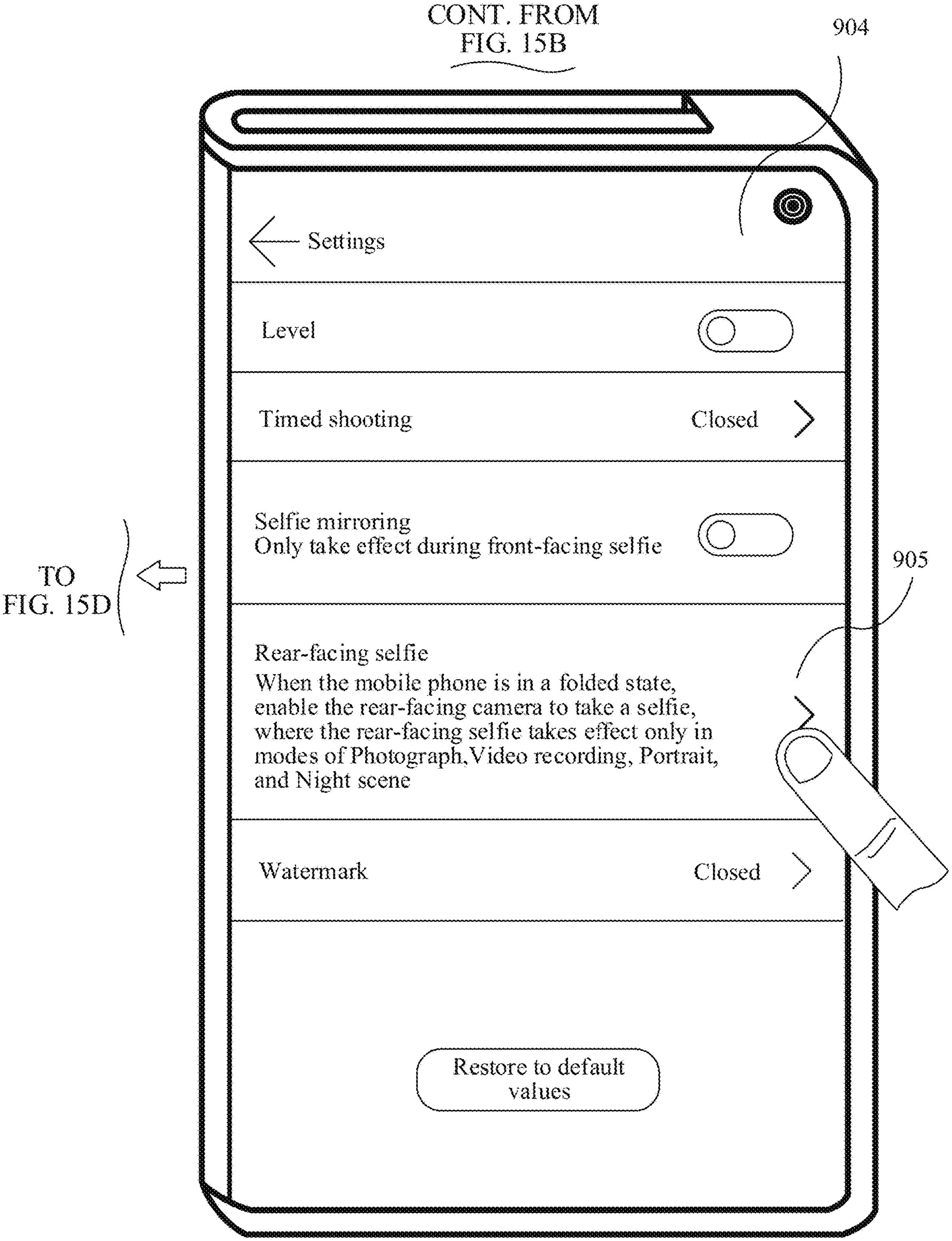
Figure 15D:
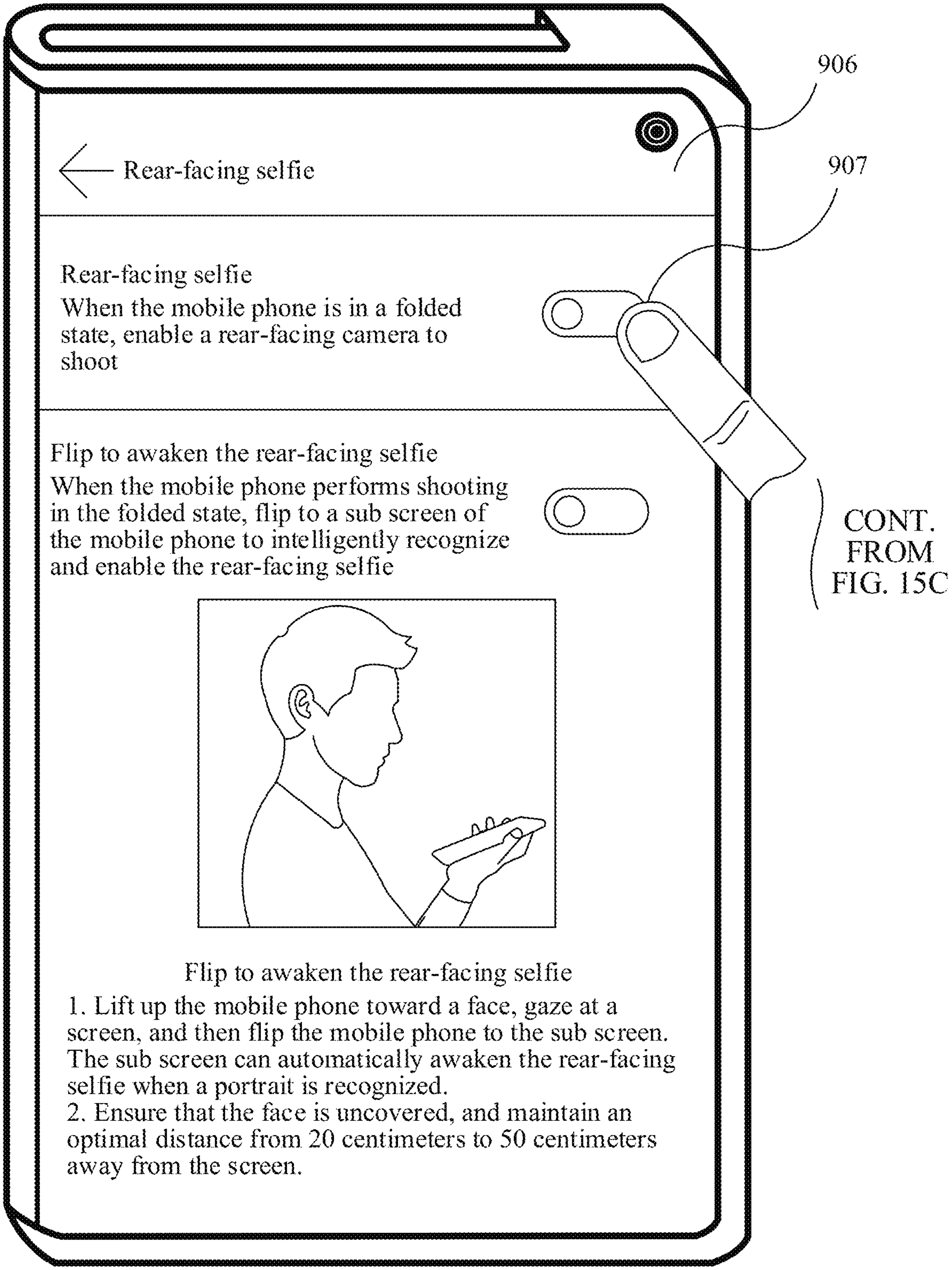
Figure 16A:
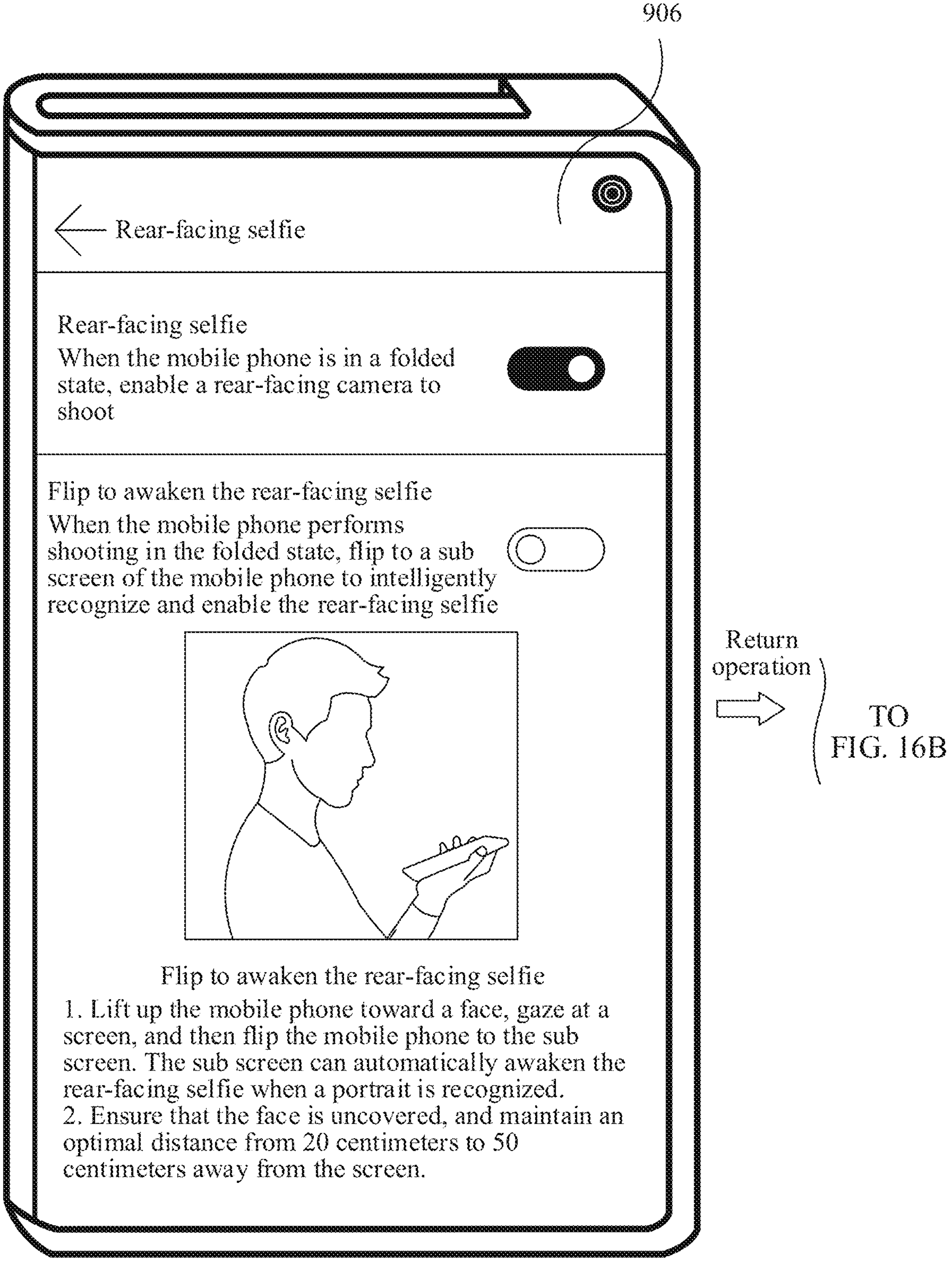
FIG. 16A to FIG. 16D are a schematic diagram 2 of changes of an interface in a process in which a rear-facing selfie function is entered from a front-facing selfie scenario according to an embodiment of this application.

For example, FIG. 15A to FIG. 15D and FIG. 16A to FIG. 16D are schematic diagrams of changes of an interface in a process in which a rear-facing selfie function is entered from a front-facing selfie scenario according to an embodiment of this application, where FIG. 16A follows FIG. 15D.

As shown in FIG. 15A, the foldable mobile phone is in the folded state, the sub screen of the foldable mobile phone is in the screen-off state, and the home screen is in the screen-on state. When the rear-facing selfie function is disabled, after the camera application of the foldable mobile phone is started, the home screen displays the photographing preview interface 908, and the photographing preview interface 908 includes the image obtained by using the rear-facing camera.

The photographing preview interface 908 further includes the camera flipping control 909. The user taps the camera flipping control 909. In response to the operation of the user, the foldable mobile phone switches from the rear-facing camera to the front-facing camera, obtains an image by using the front-facing camera, and displays the photographing preview interface 1501 by using the home screen, as shown in FIG. 15B.

The photographing preview interface 1501 includes the setting control 903. The user taps the setting control 903, and the foldable mobile phone displays the camera setting interface 904 in response to the operation of the user, as shown in FIG. 15C. The camera setting interface 904 includes the rear-facing selfie option 905. The user taps the rear-facing selfie option 905, and the foldable mobile phone displays the rear-facing selfie setting interface 906 in response to the operation of the user, as shown in FIG. 15D.

The rear-facing selfie setting interface 906 includes the rear-facing selfie switch 907. In this case, the rear-facing selfie switch 907 is in the turned-off state, and is displayed in gray. The user taps the rear-facing selfie switch 907, the foldable mobile phone enables the rear-facing selfie function in response to the operation of the user, and the rear-facing selfie switch 907 is highlighted, as shown in FIG. 16A.

Figure 16B:
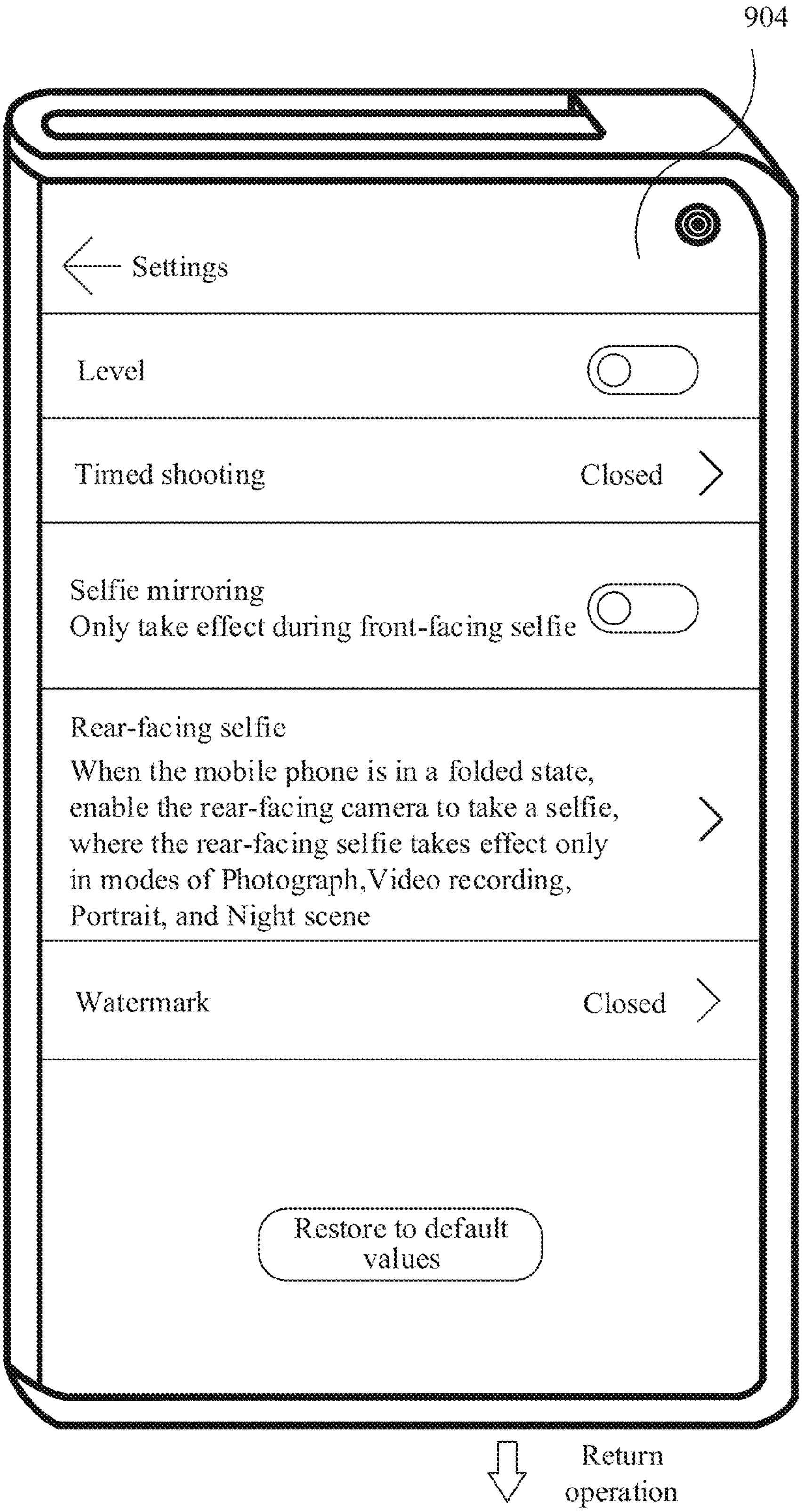
Figures 16B, 16C:
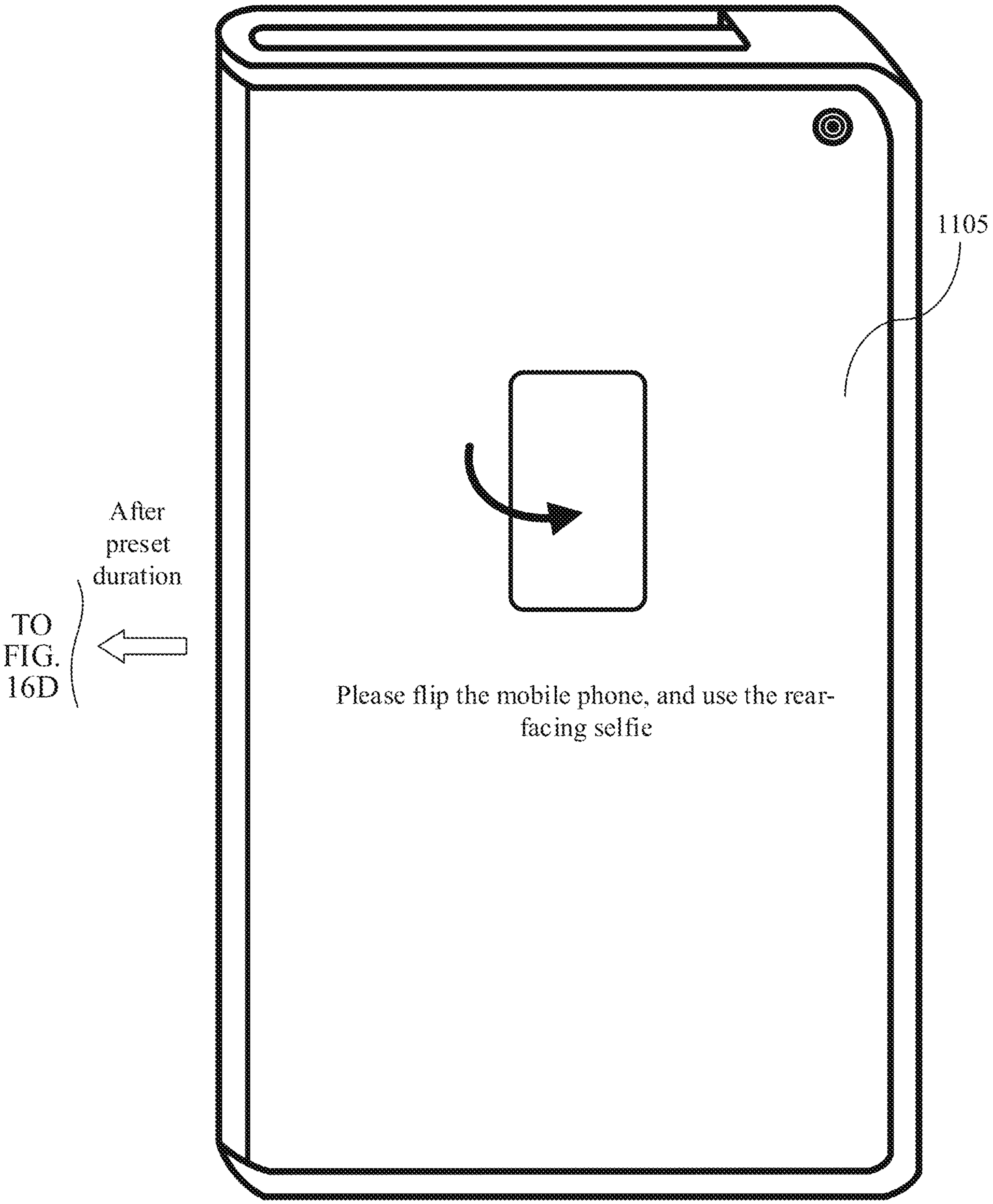

Then, the user performs the return operation once. In response to the operation of the user, the foldable mobile phone exits the rear-facing selfie setting interface 906, and displays the camera setting interface 904 by using the home screen, as shown in FIG. 16B. Then, the user performs the return operation again. In response to the operation of the user, the foldable mobile phone exits the camera setting interface 904, and displays the flipping guidance interface 1105 by using the home screen, as shown in FIG. 16C.

Figure 16D:
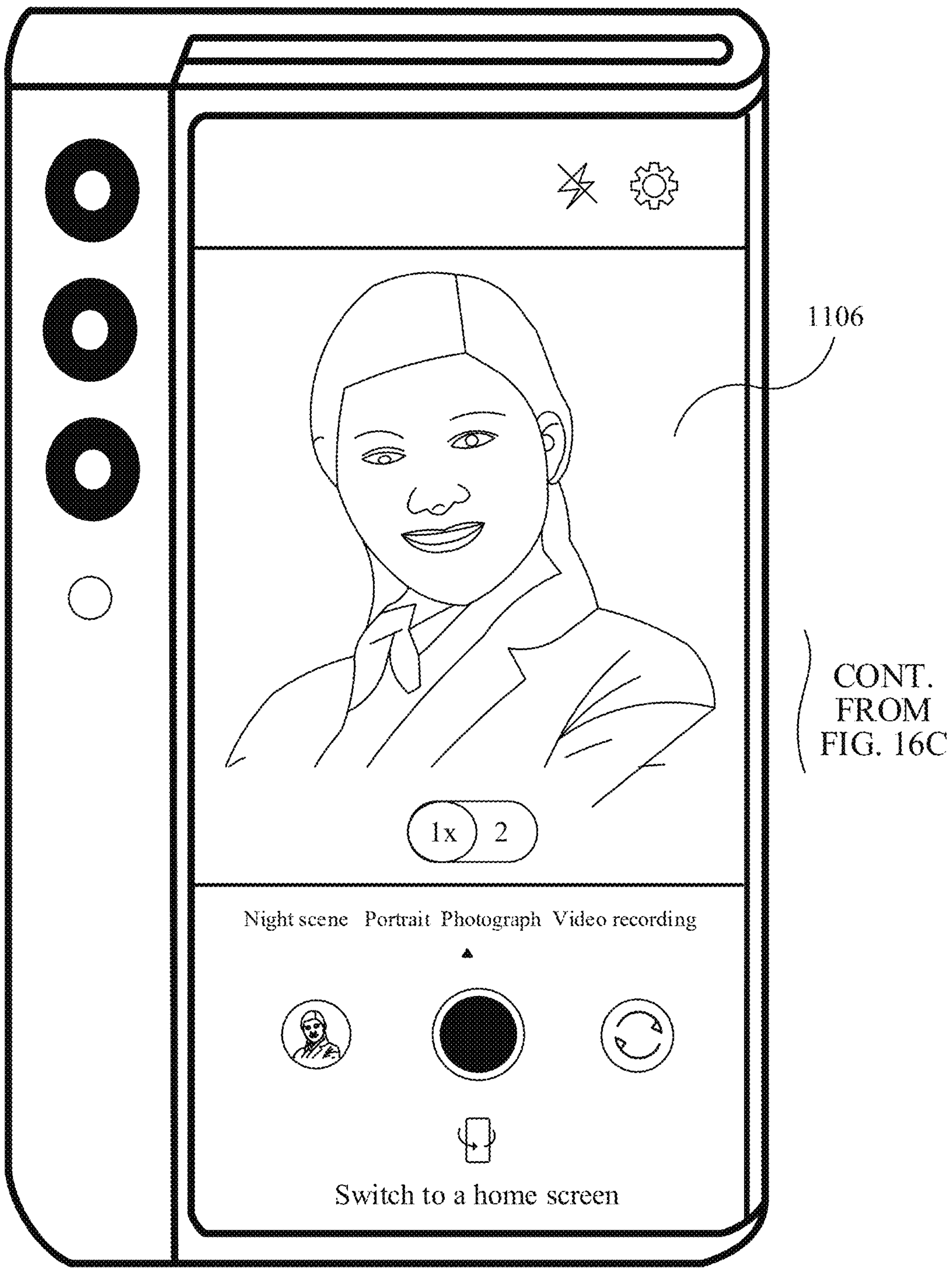

As shown in FIG. 16D, after the flipping guidance interface 1105 is displayed for the preset duration, the camera application enters the rear-facing selfie function. The foldable mobile phone controls to turn off the home screen and turn on the sub screen, obtains an image by using the rear-facing camera, and displays the photographing preview interface 1106 by using the sub screen. The photographing preview interface 1106 includes the image obtained by the rear-facing camera.

V. Exit the Camera Application to a Background after the Rear-Facing Selfie Function is Entered After the rear-facing selfie function is entered according to the method provided in 1, 3, and 4 in "IV. Enter the rear-facing selfie function", if the user exits the camera application to the background application, the foldable mobile phone may maintain, within preset duration (such as 15 minutes), a memory of running of the camera application, that is, when the user starts the camera application again within the preset duration, the rear-facing selfie function continues to run. In this way, for the user, the user does not need to perform repeated operations to enter the rear-facing selfie function, so that the user operation is simplified, and the user experience is improved.

Figure 17A:
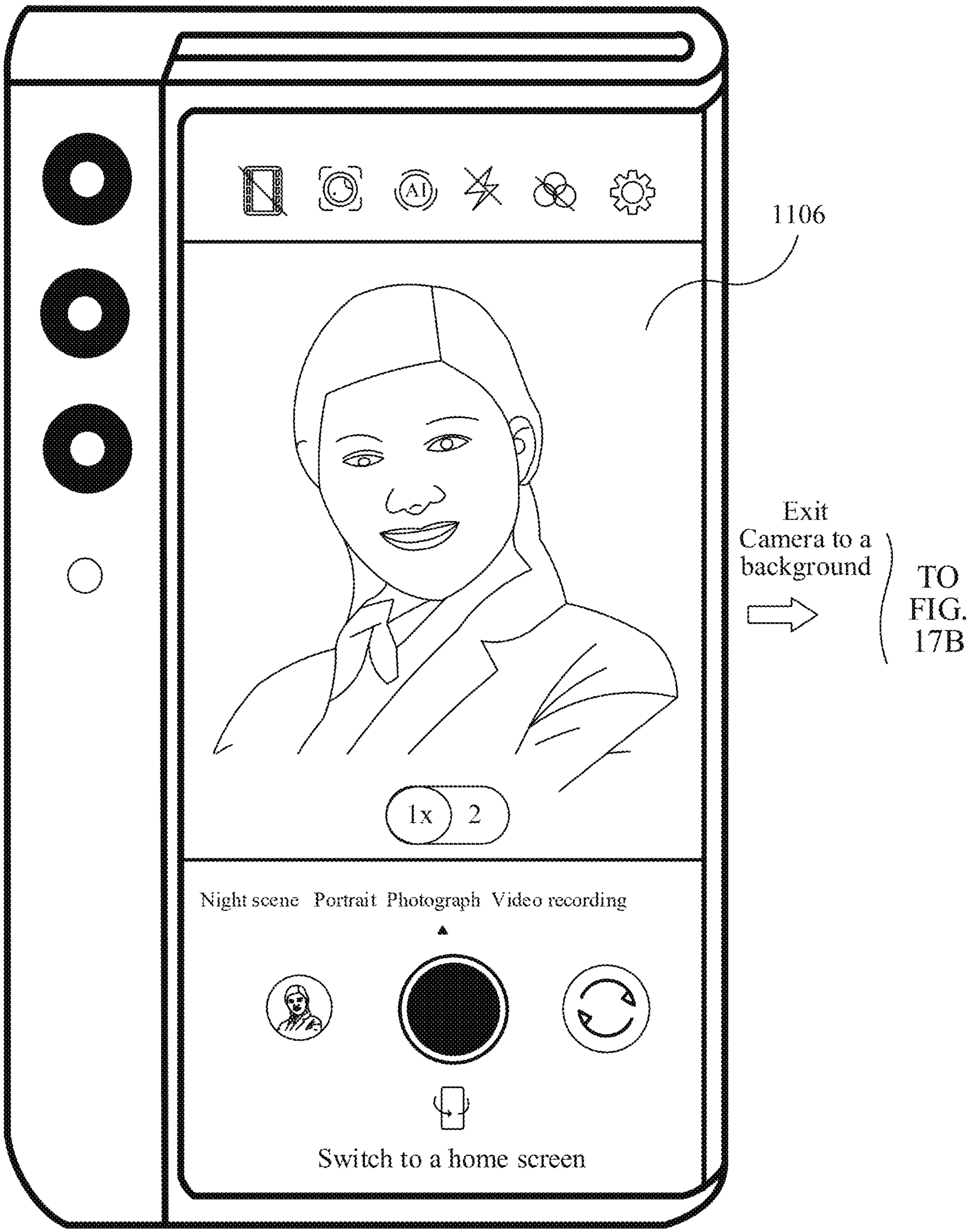
FIG. 17A to FIG. 17D are a schematic diagram of changes of an interface when a camera application is exited in a process in which a rear-facing selfie function is entered according to an embodiment of this application.

For example, FIG. 17A to FIG. 17D are a schematic diagram of changes of an interface when a camera application is exited in a process in which a rear-facing selfie function is entered according to an embodiment of this application. As shown in FIG. 17A, the camera application currently already enters the rear-facing selfie function, and the photographing preview interface 1106 is displayed by using the sub screen. Then, the user performs an operation (which is also referred to as a fourth operation) of exiting the camera to the background. The operation of exiting the camera to the background may be, for example, tapping a home-page key in a three-key navigation bar. After the user performs the operation, the foldable mobile phone exits the camera application to the background, and displays the main interface (which is also referred to as a desktop, a main page, or the like). The operation of exiting the camera to the background may alternatively be: sliding up from a bottom of the screen to enter a recent tasks screen, and the user tapping a thumbnail of an interface of another task (application) in the recent tasks screen. After the user performs the operation, the foldable mobile phone exits the camera application to the background and displays the interface of the another application. The operation of exiting the camera to the background is not limited in this embodiment of this application.

Figure 17B:
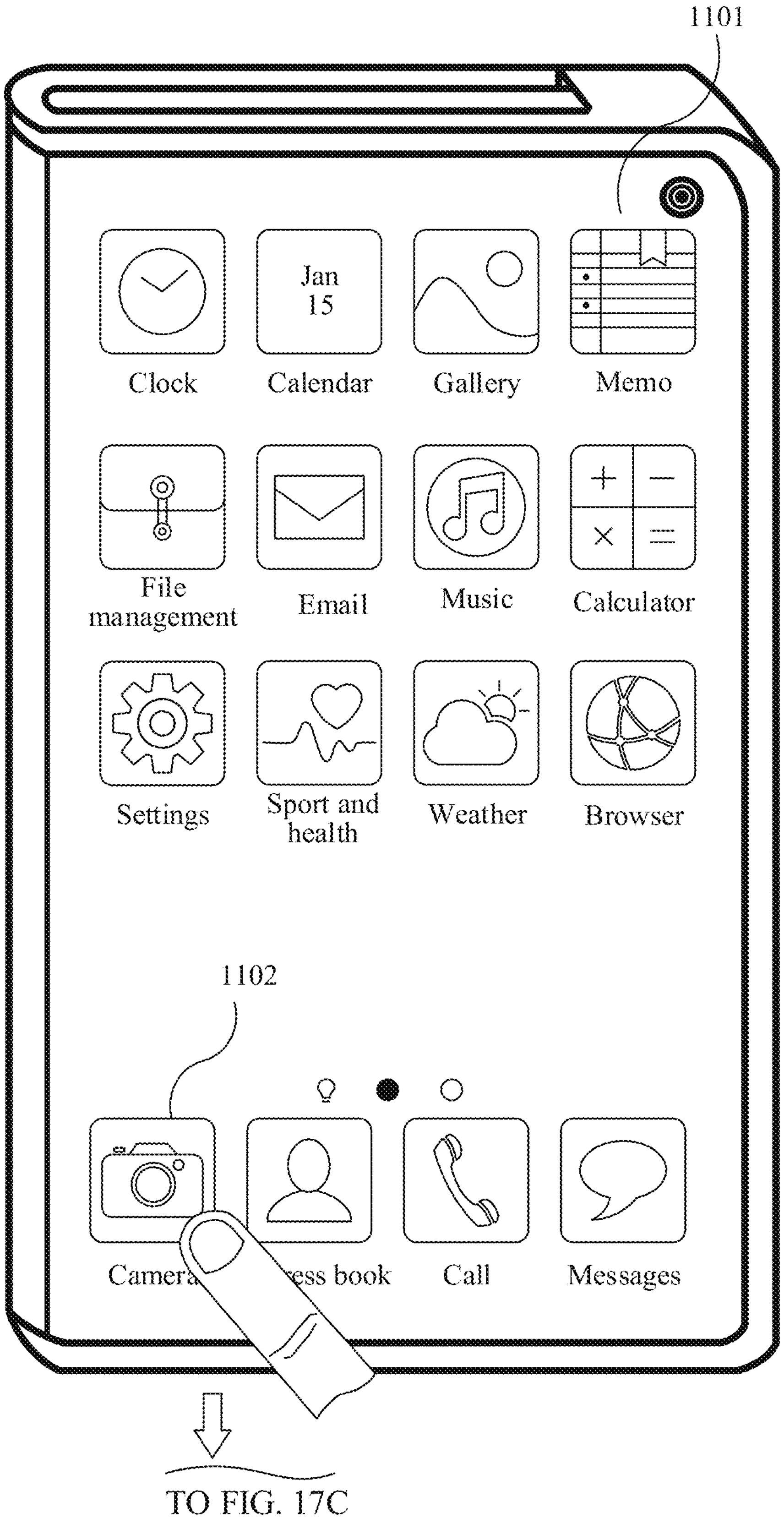

Using an example in which the user taps the home-page key in the three-key navigation bar, in response to the operation of the user, the foldable mobile phone controls to turn off the sub screen and turn on the home screen, and displays the main interface 1101 by using the home screen, as shown in FIG. 17B.

Figures 17B, 17C:
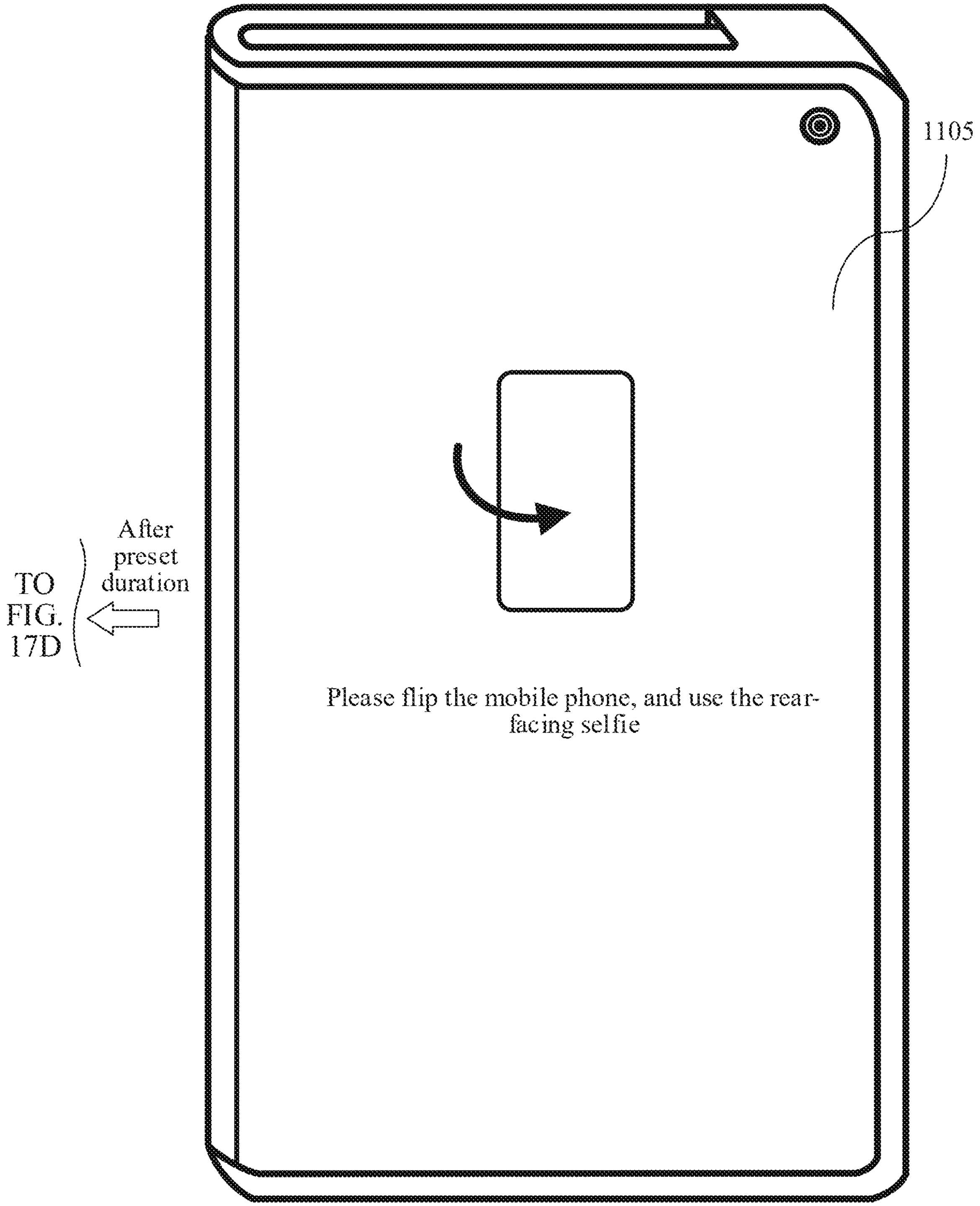
Figure 17D:
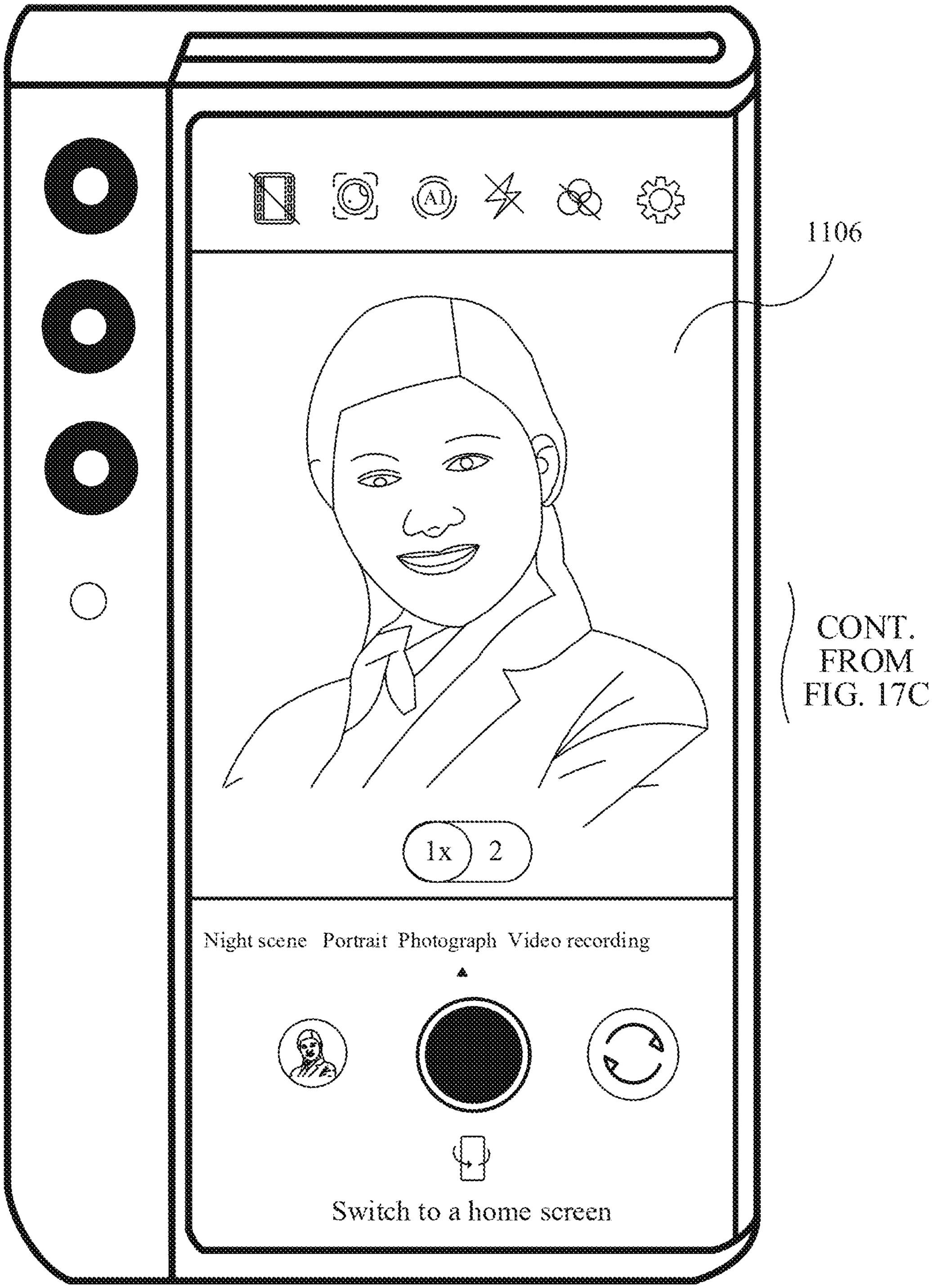

After performing some other operations on the home screen, the user taps the icon 1102 of the camera application on the main interface 1101 again within the preset duration (for example, 15 minutes). In response to the operation of the user, the foldable mobile phone starts the camera application, directly enters the rear-facing selfie function, and displays the flipping guidance interface 1105, as shown in FIG. 17C. After the flipping guidance interface 1105 is displayed for the preset duration, the camera application enters the rear-facing selfie function, and the foldable mobile phone controls to turn off the home screen and turn on the sub screen, and displays the photographing preview interface 1106 on the sub screen, as shown in FIG. 17D.

VI. Unfold the Mobile Phone in a Process in which the Rear-Facing Selfie Function is Used In this embodiment, if the user unfolds the foldable mobile phone in the process of using the rear-facing selfie function, the camera application exits the rear-facing selfie function, and enters the rear-facing non-selfie scenario in the unfolded state. The rear-facing non-selfie scenario in the unfolded state means that the foldable mobile phone obtains an image by using the rear-facing camera, and displays a photographing preview interface 1801 (which is also referred to as a fifth photographing preview interface) by using the home screen and the sub screen together. The photographing preview interface 1801 includes the image obtained by the rear-facing camera. In other words, the photographing preview interface 1801 is a photographing preview interface in the rear-facing non-selfie scenario in the unfolded state. When the user unfolds the foldable mobile phone to the unfolded state, it indicates that the user no longer needs the rear-facing selfie function. Therefore, a rear-facing photographing scenario after the foldable mobile phone is in the unfolded state is directly entered, so that there is a high probability that a use requirement of the user is satisfied, and the user experience is improved.

Figure 18A:
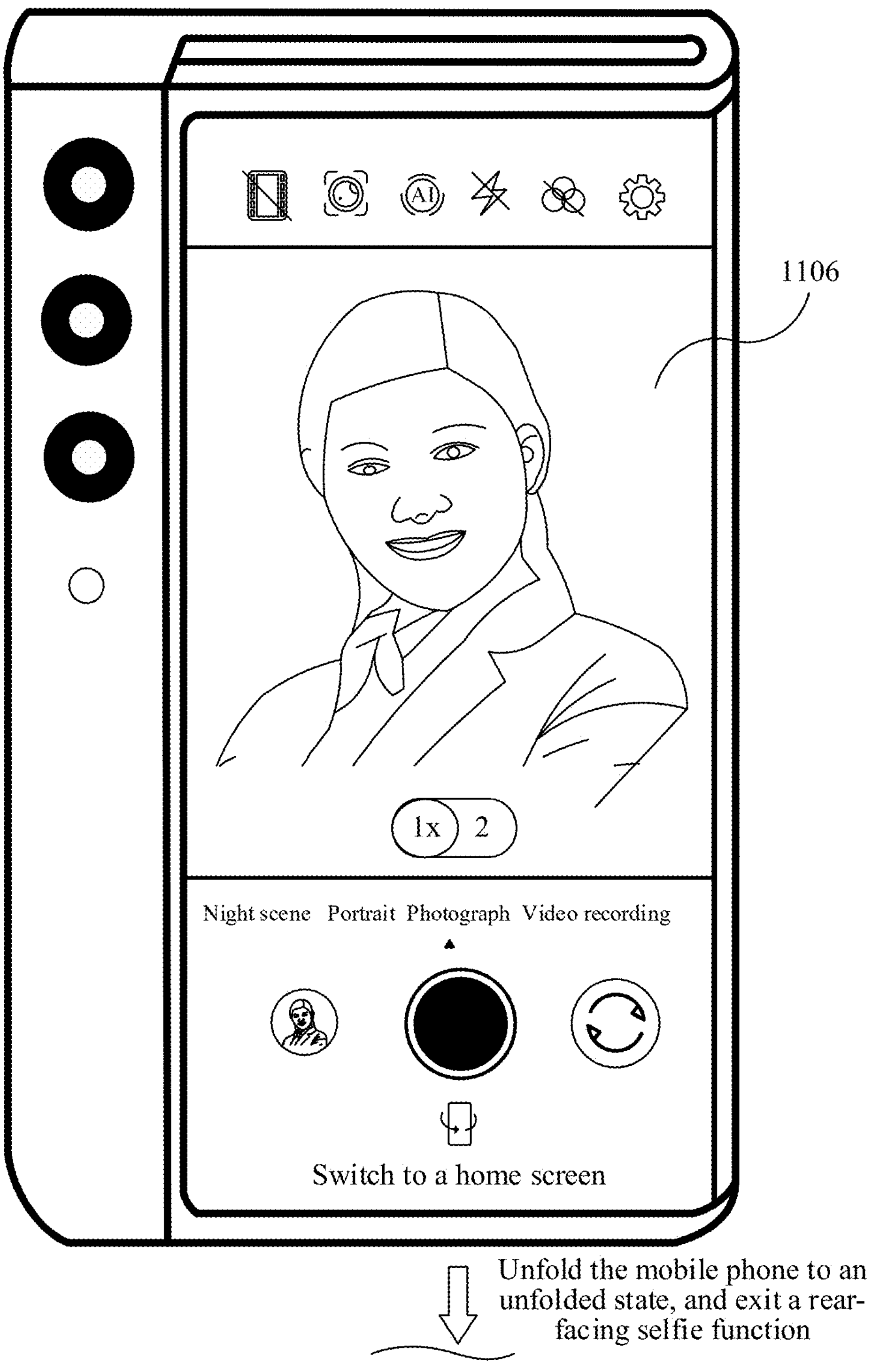
FIG. 18A and FIG. 18B are a schematic diagram of changes of an interface when a mobile phone is unfolded in a process in which a rear-facing selfie function is used according to an embodiment of this application.
Figure 18B:

For example, FIG. 18A and FIG. 18B are a schematic diagram of changes of an interface when a mobile phone is unfolded in a process in which a rear-facing selfie function is used according to an embodiment of this application. As shown in FIG. 18A, the user currently uses the rear-facing selfie function, and the foldable mobile phone displays the photographing preview interface 1106 by using the sub screen. The photographing preview interface 1106 includes the image obtained by using the rear-facing camera. In this case, the surface on which the sub screen of the foldable mobile phone is located (that is, the surface on which the rear-facing camera is located) faces the user, and the surface on which the home screen is located faces away from the user.

The user unfolds the foldable mobile phone, so that the foldable mobile phone is switched to the unfolded state. In this way, the home screen and the sub screen of the foldable mobile phone both face the user, and the first back housing, the second back housing, and the rear-facing camera face away from the user. In response to the operation of the user, the foldable mobile phone continues to obtain an image by using the rear-facing camera. Meanwhile, the sub screen is turned on, and the home screen and the sub screen together display the photographing preview interface 1801. The photographing preview interface 1801 includes the image obtained by the rear-facing camera, as shown in FIG. 18B.

Optionally, after the user unfolds the foldable mobile phone according to the foregoing process, and the foldable mobile phone enters the rear-facing photographing scenario after the foldable mobile phone is in the unfolded state, a default photographing mode is consistent with the photographing mode during use of the rear-facing selfie function, that is, a photographing mode on the photographing preview interface 1801 is consistent with the photographing mode on the photographing preview interface 1106. In this way, selection of the user can be inherited, and the user experience is improved.

VII. View an Image in the Process in which the Rear-Facing Selfie Function is Used In this embodiment, in the process in which the user uses the rear-facing selfie function, the user may view a photographed image through an image thumbnail on the photographing preview interface 1106. The image may be displayed by using the sub screen, and supports functions such as adding to favorites, deleting, and zooming for displaying. In this way, the user can view the image at any time without exiting the rear-facing selfie function, thereby facilitating use of the user, and improving the user experience.

In addition, in a process in which the user views the image, if the user unfolds the foldable mobile phone, the foldable mobile phone displays the image by using the home screen and the sub screen together, and supports functions such as sharing, adding to favorites, editing, and deleting. In other words, when viewing the image by using the sub screen, the user may unfold the foldable screen at any time, and the image is displayed by using the home screen and the sub screen together, that is, large-image preview is supported, thereby facilitating the use of the user, and improving the user experience.

Descriptions are provided below with reference to the accompanying drawings.

Figure 19A:
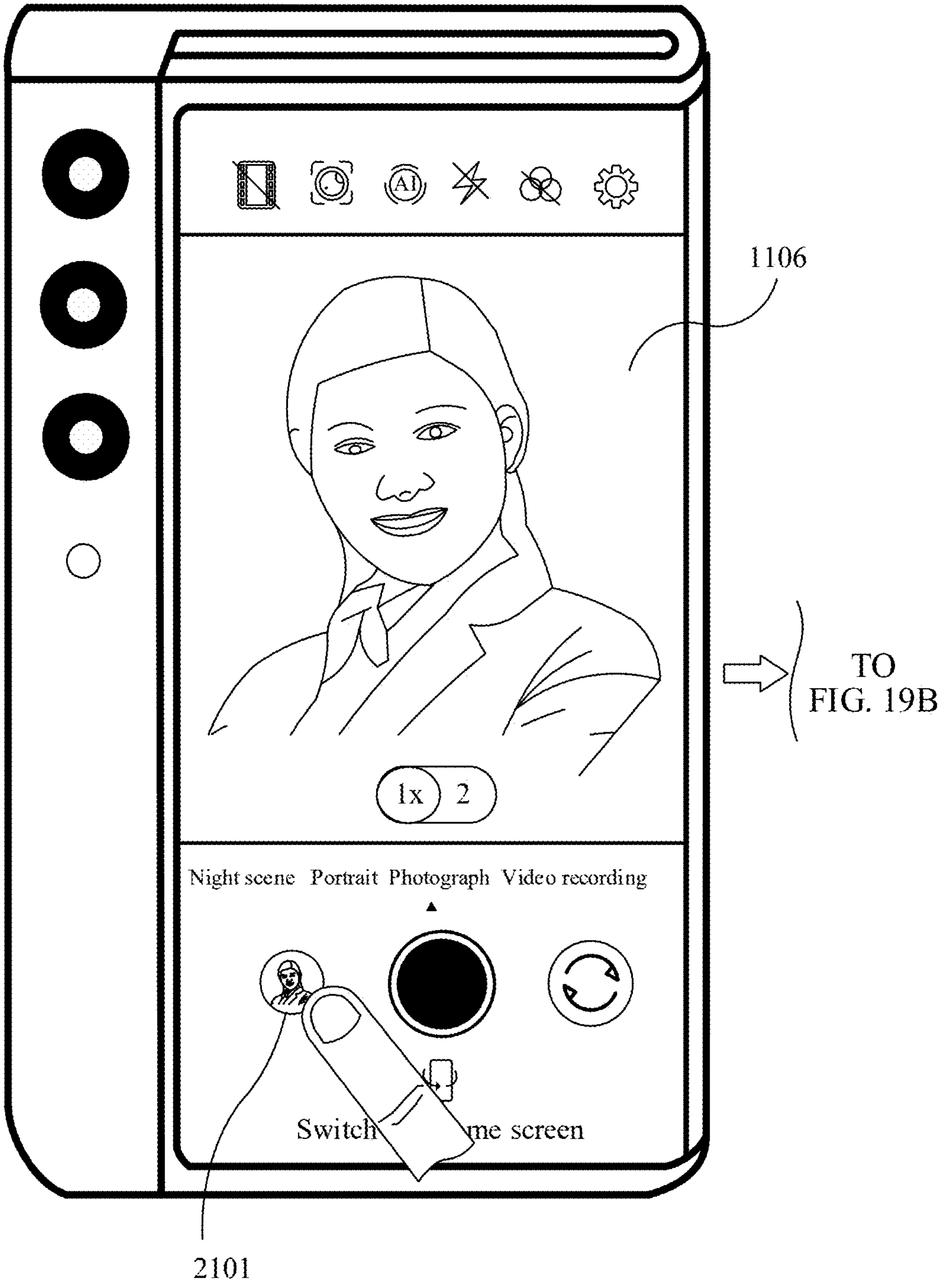
FIG. 19A to FIG. 19D are a schematic diagram of changes of an interface when an image is viewed in a process in which a rear-facing selfie function is used according to an embodiment of this application.

For example, FIG. 19A to FIG. 19D are a schematic diagram of changes of an interface when an image is viewed in a process in which a rear-facing selfie function is used according to an embodiment of this application. As shown in FIG. 19A, the user currently uses the rear-facing selfie function, and the foldable mobile phone displays the photographing preview interface 1106 by using the sub screen. The photographing preview interface 1106 includes a thumbnail (which is also referred to as a third control) 2101 of an image photographed by the user.

Figure 19B:
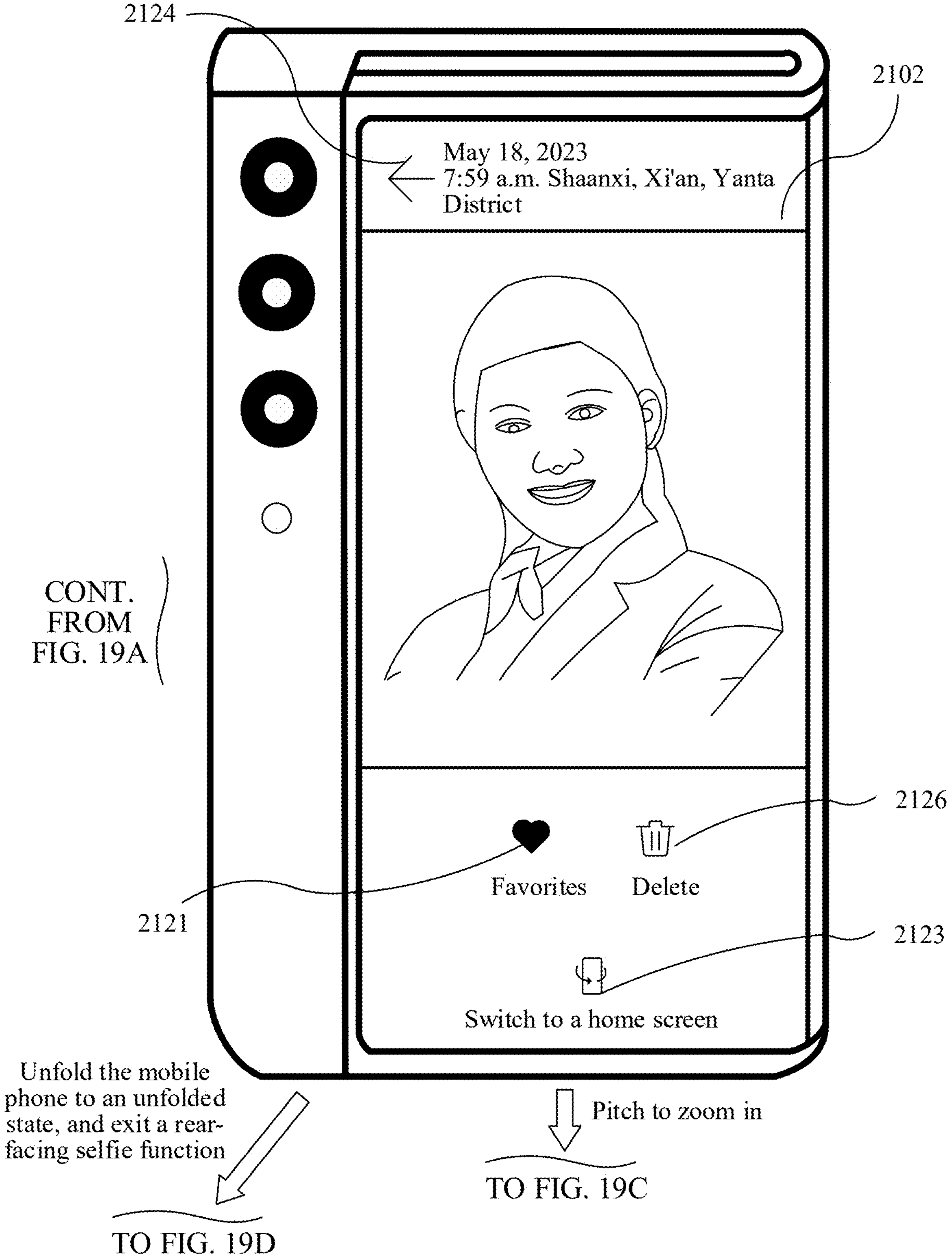
Figures 19B, 19C:
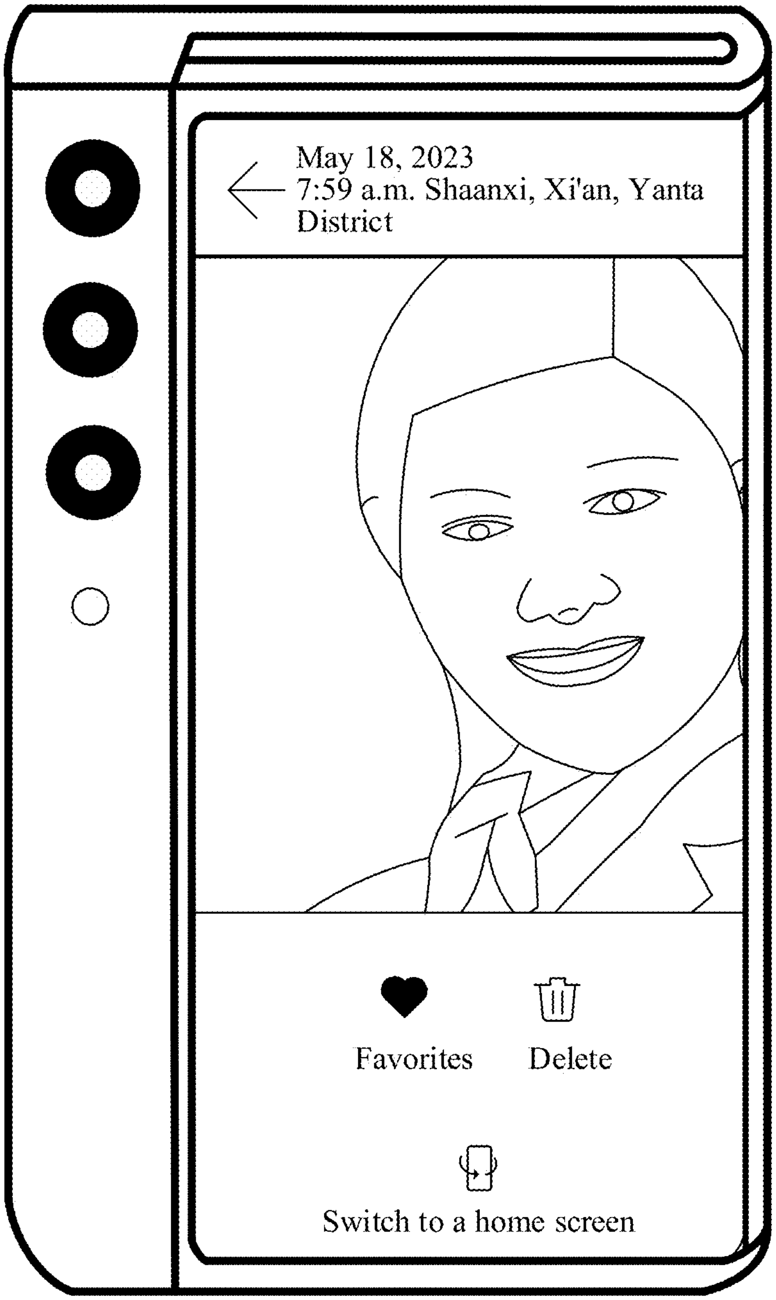

The user taps the thumbnail 2101, and in response to the operation of the user, the foldable mobile phone displays an image preview interface 2102 (which is also referred to as a first interface) by using the sub screen. As shown in FIG. 19B, the image preview interface 2102 includes the image corresponding to the thumbnail 2101. In addition, the image preview interface 2102 includes a favorites control 2121, a delete control 2126, a control (which is also referred to as a fourth control) 2123 for switching to the home screen, a return control 2124, and the like. When the user taps the favorites control 2121, the foldable mobile phone collects the image. When the user taps the delete control 2126, the foldable mobile phone deletes the image. When the user taps the control 2123 for switching to the home screen, the camera application exits the rear-facing selfie function and enters the rear-facing non-selfie scenario in the folded state, and the foldable mobile phone displays the photographing preview interface 901. When the user taps the return control 2124, the foldable mobile phone exits the current image preview interface 2102 and restores to display the photographing preview interface 1106.

In addition, if the user performs a pinch-to-zoom operation at the image displayed on the image preview interface 2102, the foldable mobile phone zooms out or zooms in the image in response to the operation of the user. Using an example in which the user performs a pinch-to-zoom-in operation, an image displayed by the foldable mobile phone in a zoom-in manner by using the sub screen may be shown in FIG. 19C. The pinch-to-zoom operation may be, for example, a two-finger pinch operation.

Figure 19D:
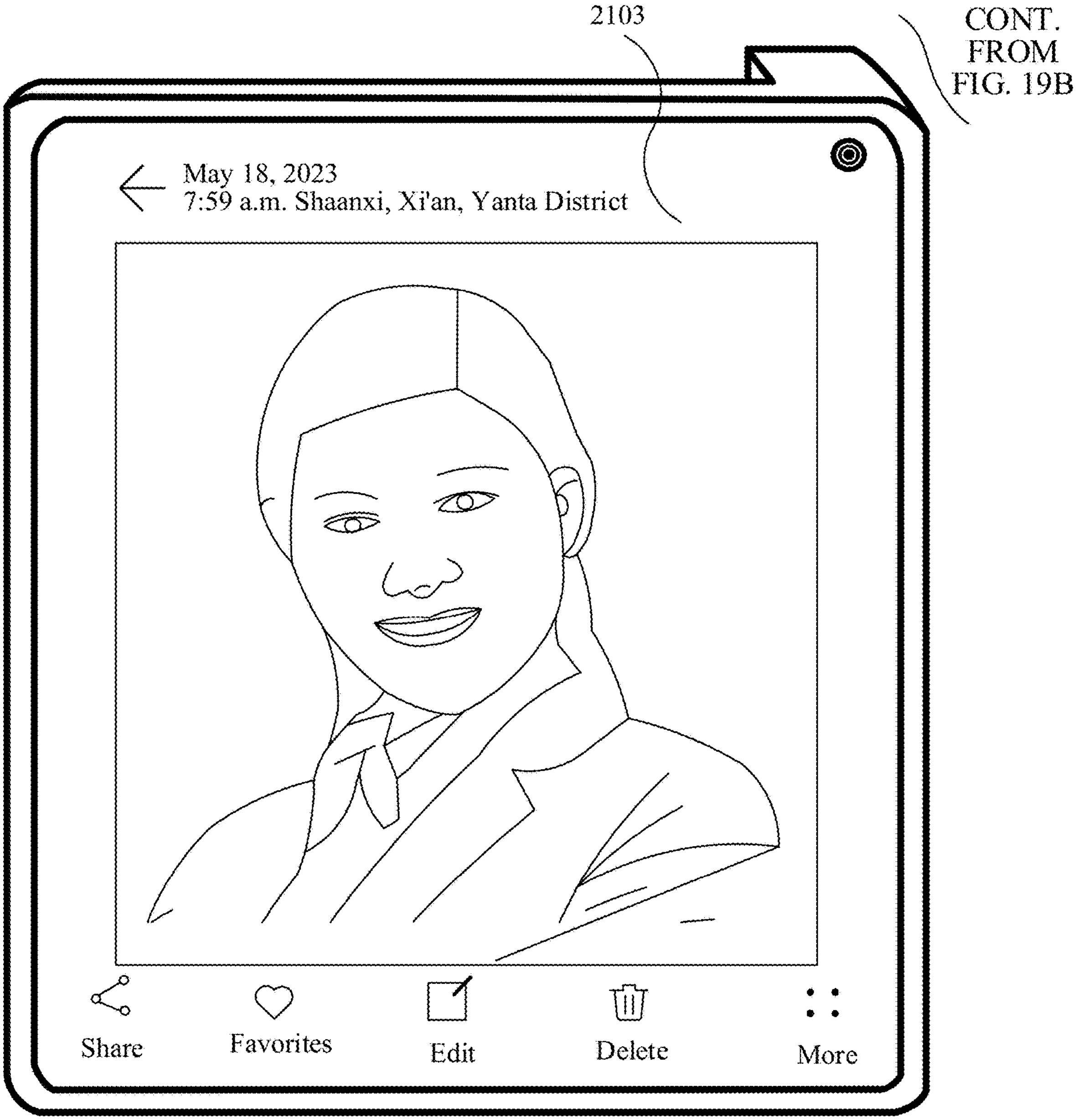

In another embodiment, when the foldable mobile phone displays the interface shown in FIG. 19B, if the user unfolds the foldable screen to the unfolded state, the home screen and the sub screen simultaneously display an image preview interface 2103 (which is also referred to as a second interface), as shown in FIG. 19D.

VIII. Exit the Rear-Facing Selfie Function

In a process of using the rear-facing selfie function, the user may exit the rear-facing selfie function by using the control for switching to the home screen or the camera flipping control on the photographing preview interface 1106, or by using the control for switching to the home screen on the image preview interface. After the rear-facing selfie function is exited, the camera application enters the rear-facing non-selfie scenario in the folded state, and the foldable mobile phone turns off the sub screen, and displays the photographing preview interface 901 by using the home screen. In other words, in a process of using the rear-facing selfie function, the user may exit the function by using one key at any time, thereby facilitating the user operation and use, and improving the user experience.

Figure 20A:
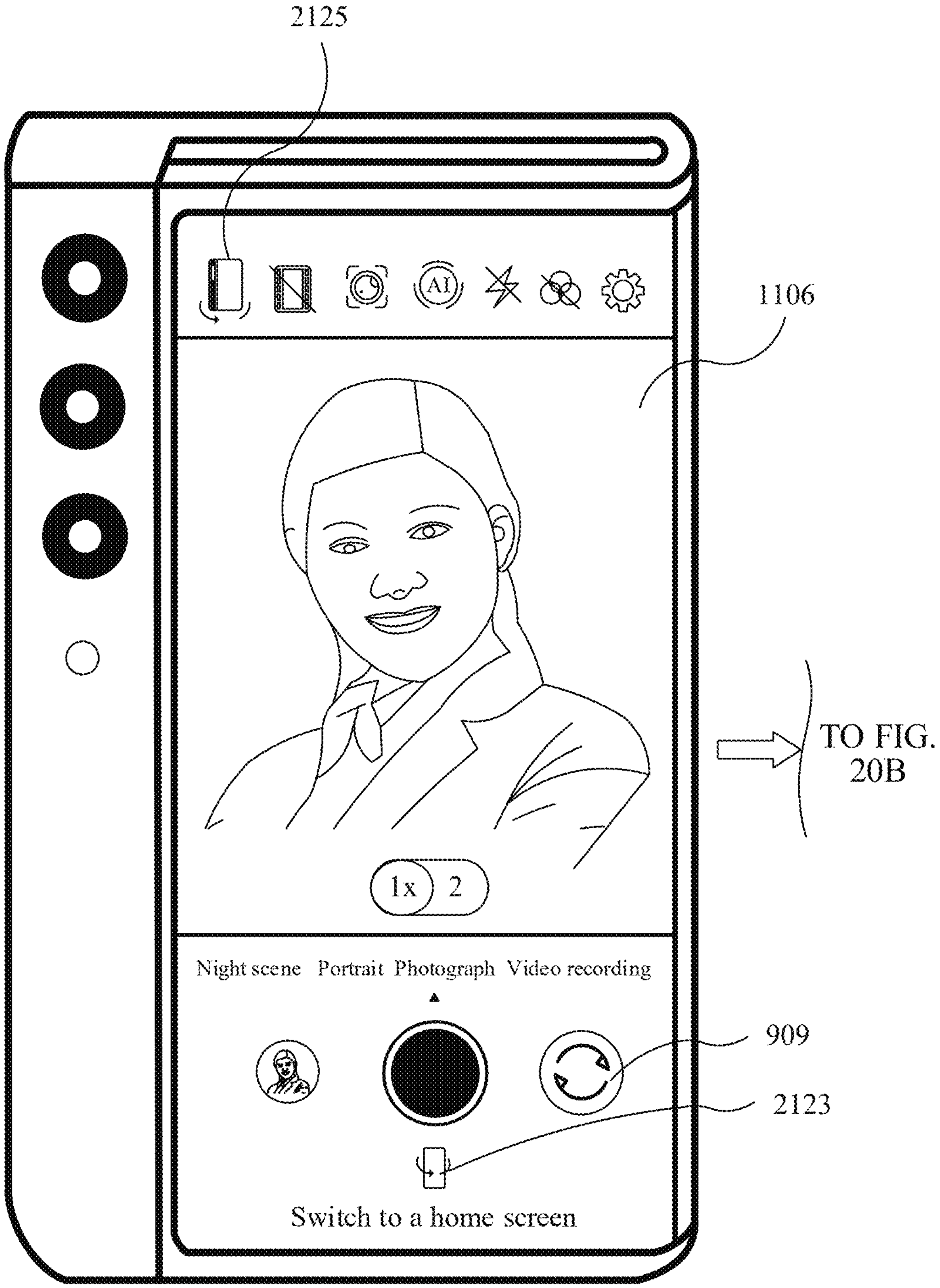
FIG. 20A to FIG. 20C are a schematic diagram of changes of an interface when a rear-facing selfie function is exited according to an embodiment of this application.
Figures 20A, 20B:
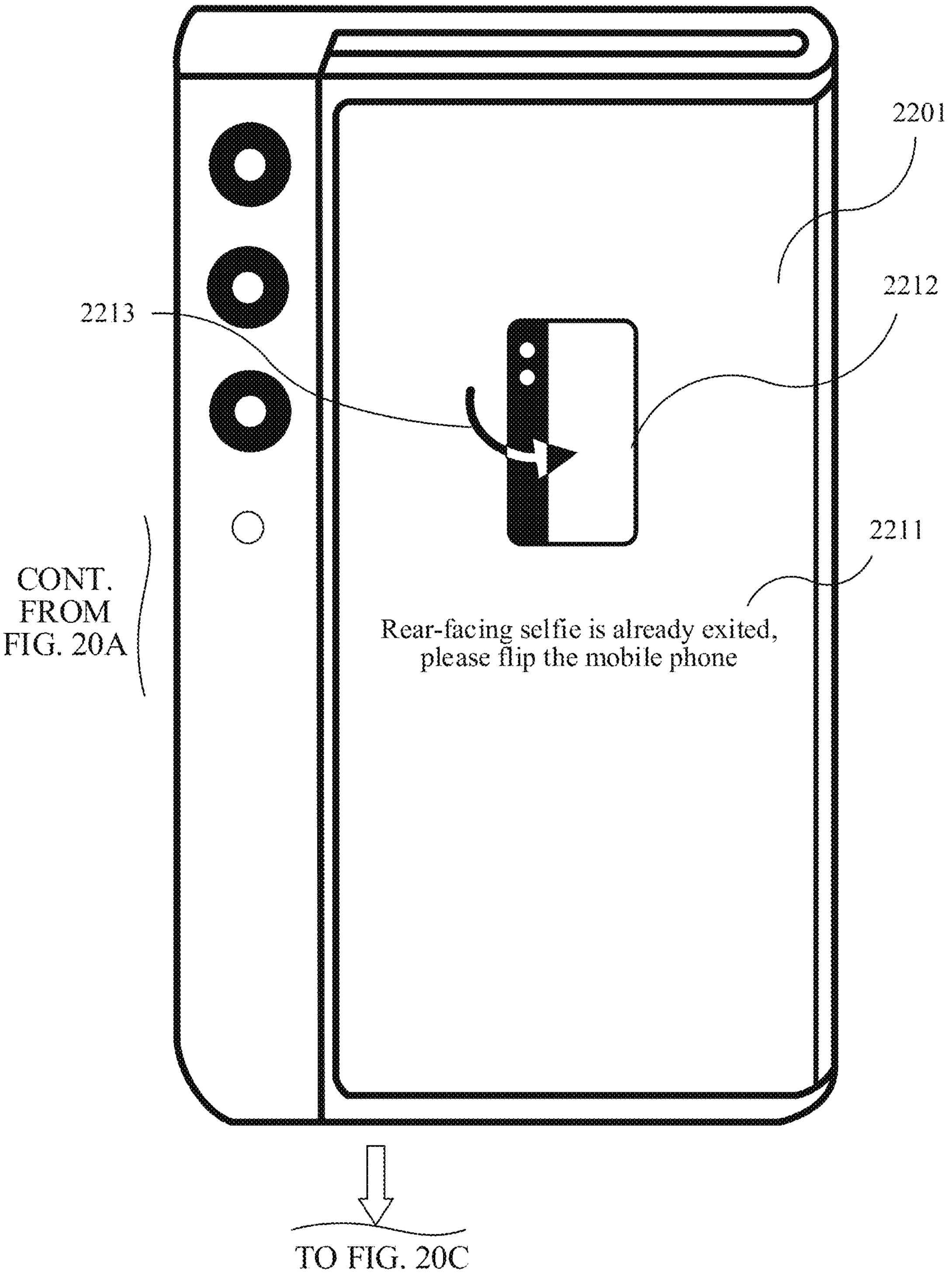
Figure 20C:
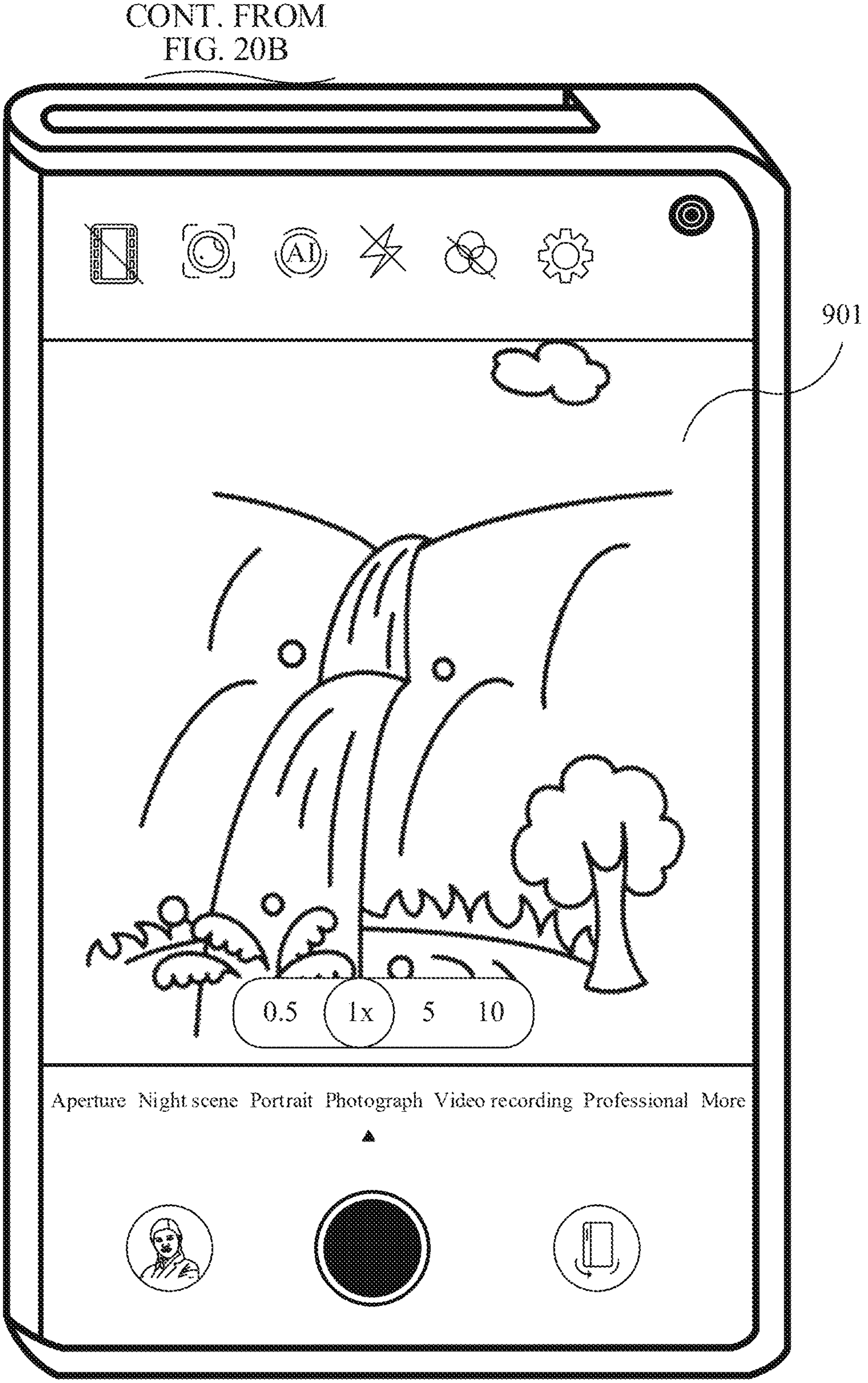

For example, FIG. 20A to FIG. 20C are a schematic diagram of changes of an interface when a rear-facing selfie function is exited according to an embodiment of this application. As shown in FIG. 20A, the user currently uses the rear-facing selfie function, and the foldable mobile phone displays the photographing preview interface 1106 by using the sub screen. The photographing preview interface 1106 includes the control 2123 for switching to the home screen and the camera flipping control 909. In this case, the surface on which the sub screen of the foldable mobile phone is located (that is, the surface on which the rear-facing camera is located) faces the user, and the surface on which the home screen is located faces away from the user.

The user taps the control 2123 for switching to the home screen, or taps the camera flipping control 909. In response to the operation of the user, the foldable mobile phone displays a flipping guidance interface 2201 (which is also referred to as a second flipping guidance interface) by using the sub screen, as shown in FIG. 20B. The flipping guidance interface 2201 is configured to guide the user to flip the foldable mobile phone, to enable the surface on which the home screen is located to face the user, and the surface on which the sub screen is located (that is, the surface on which the rear-facing camera is located) to face away from the user. Optionally, the flipping guidance interface 2201 may include text prompt information 2211, an arrow 2212 indicating a flipping direction, and a schematic diagram 2213 of the foldable mobile phone. Optionally, a plurality of schematic diagrams of the foldable mobile phone from different angles may be continuously displayed, to present a dynamic image of flipping the mobile phone on the flipping guidance interface 2201, so as to more clearly guide the user to flip the mobile phone, thereby improving the user experience. Optionally, on the interface, the text prompt information 2211 may be, for example, "Rear-facing selfie is already exited, please flip the mobile phone".

After the flipping guidance interface 2201 is displayed for preset duration, the camera application exits the rear-facing selfie function. Specifically, as shown in FIG. 20C, the foldable mobile phone turns off the sub screen, and controls to turn on the home screen. Meanwhile, an image is obtained by using the rear-facing camera, and the photographing preview interface 901 is displayed by using the home screen. The photographing preview interface 901 includes the image obtained by the rear-facing camera. After the user flips the mobile phone, the photographing preview interface 901 may display an image of a surrounding person or object obtained by using the rear-facing camera.

In some other embodiments, the photographing preview interface 1106 shown in FIG. 20A may further include a control 2125 (which is also referred to as a fourth control) for exiting the rear-facing selfie. The user may alternatively exit the rear-facing selfie function by tapping the control 2125 for exiting the rear-facing selfie. After the user taps the control 2125 for exiting the rear-facing selfie, an interface change process is the same as that shown in (b) and FIG. 20C, and details are not described again.

In the foregoing embodiment, an example in which the user can actively control enabling and disabling of the rear-facing selfie function is used for description. In some other embodiments, the rear-facing selfie function of the electronic device may alternatively be continuously enabled, that is, the rear-facing selfie function is continuously available. In this case, the user does not need to control the enabling and disabling of the rear-facing selfie function. However, the user may set a default selfie manner as the rear-facing selfie or the rear-facing non-selfie, to select the rear-facing selfie control or the camera flipping control as a control displayed by default on the photographing preview interface. In this way, display of the interface more conforms to habit selection of the user, and the user experience is improved. In addition, after one of the two default controls is displayed, the user may awaken the other one, to conveniently and quickly implement selection of the two selfie manners. Descriptions are further provided below with reference to the accompanying drawings.

Figure 21A:
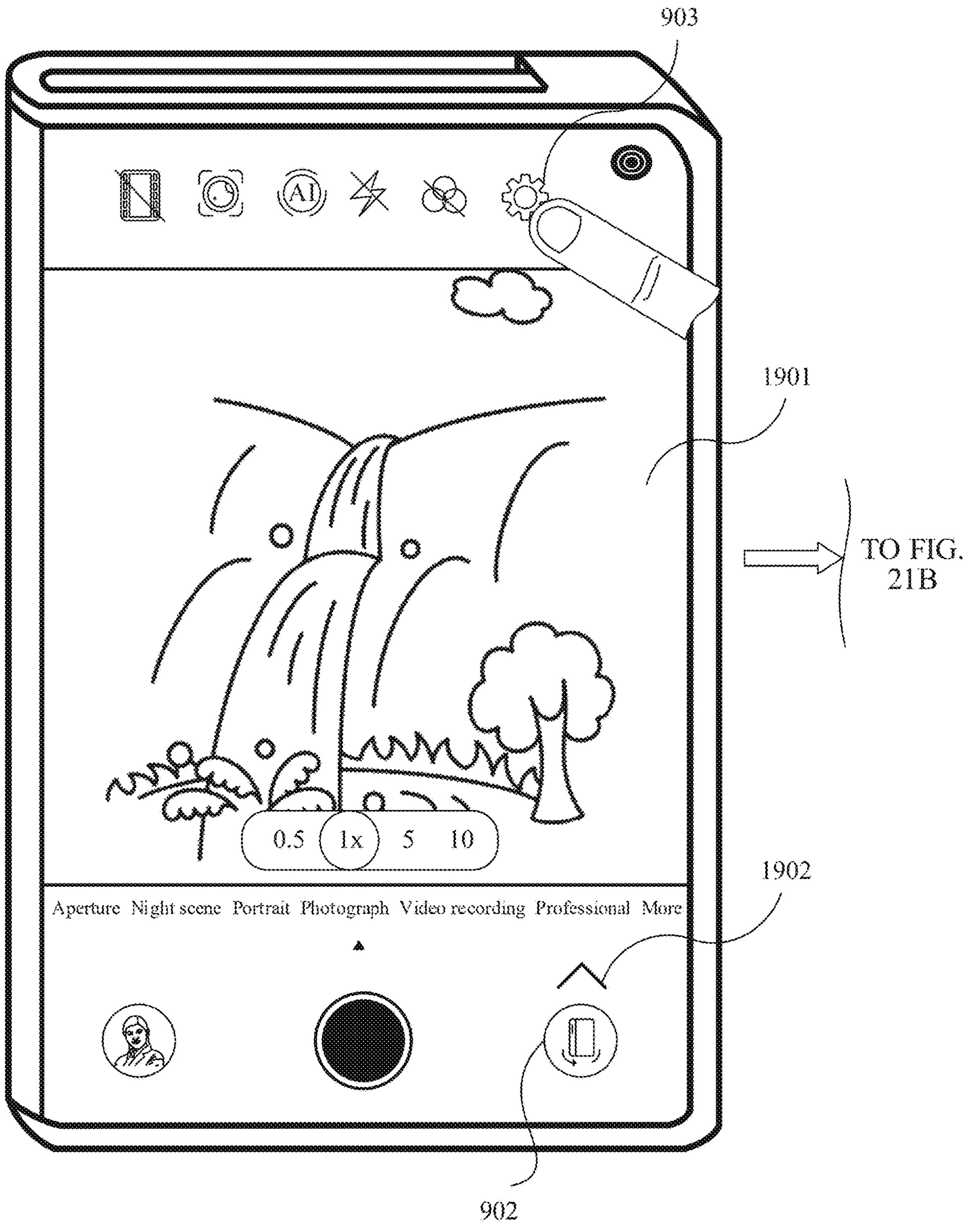
FIG. 21A to FIG. 21F are a schematic diagram of changes of an interface when a default selfie manner is set according to an embodiment of this application.

For example, FIG. 21A to FIG. 21F are a schematic diagram of changes of an interface when a default selfie manner is set according to an embodiment of this application. As shown in FIG. 21A, still using the outward-foldable mobile phone as an example, the foldable mobile phone is in the folded state, the home screen is in the screen-off state, and the sub screen is in the screen-on state. After the camera application is started, the rear-facing non-selfie scenario is entered by default. The foldable mobile phone obtains an image by using the rear-facing camera and displays the photographing preview interface 1901 by using the home screen. The photographing preview interface 1901 includes the image obtained by the rear-facing camera. Optionally, a default selfie manner of the foldable mobile phone may be the rear-facing selfie. Therefore, the photographing preview interface 1901 includes the rear-facing selfie control 902, and the arrow identifier 1902 is displayed above the rear-facing selfie control 902. The user may awaken the capsule 1903 by tapping the arrow identifier 1902, through the slide-up operation, or the like. For details of the rear-facing selfie control 902 and the camera flipping control 909 in the capsule 1903, refer to the embodiment shown in FIG. 9A to FIG. 9C, and details are not described again.

Figure 21B:
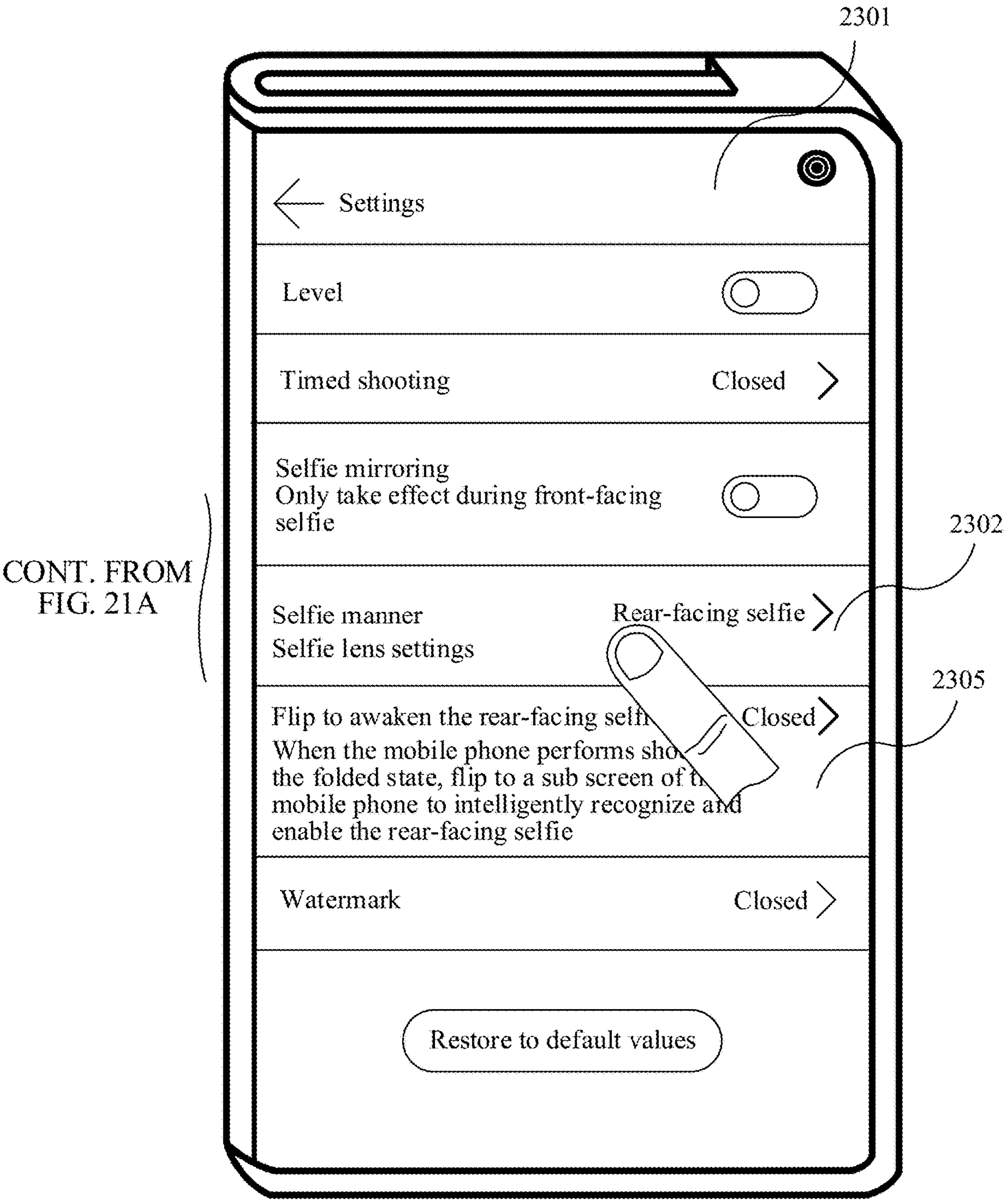

The photographing preview interface 1901 further includes the setting control 903. The user taps (which is also referred to as a third operation) the setting control 903, and the foldable mobile phone displays a camera setting interface 2301 in response to the operation of the user, as shown in FIG. 21B. The camera setting interface 2301 includes a setting option (which is referred to as a selfie manner option for short) 2302 of a selfie manner. A selfie manner currently displayed in the option is the rear-facing selfie. In addition, the camera setting interface 2301 may further include an option 2305 for flipping to awaken the rear-facing selfie, and the user may tap the option 2305 to enter a setting interface of the function of flipping to awaken. Optionally, the setting interface of the function of flipping to awaken may be similar to FIG. 10A, and a difference lies in that the setting interface of the function of flipping to awaken in this embodiment does not include the rear-facing selfie switch.

Figure 21C:
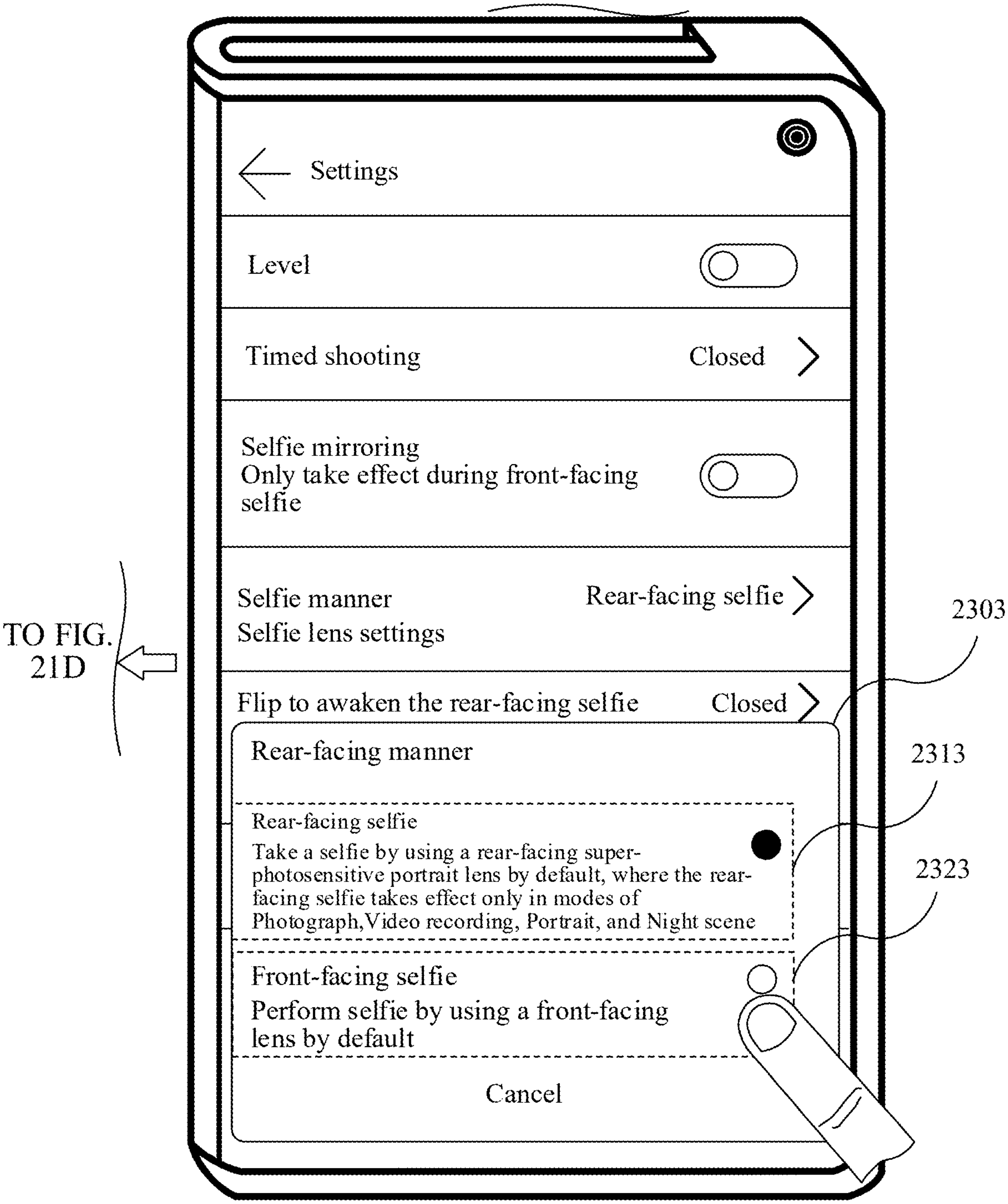

As shown in FIG. 21C, the user taps the selfie-manner option 2302, and the foldable mobile phone displays a selfie-manner selection pop-up window 2303 in response to the operation of the user.

Figure 21D:
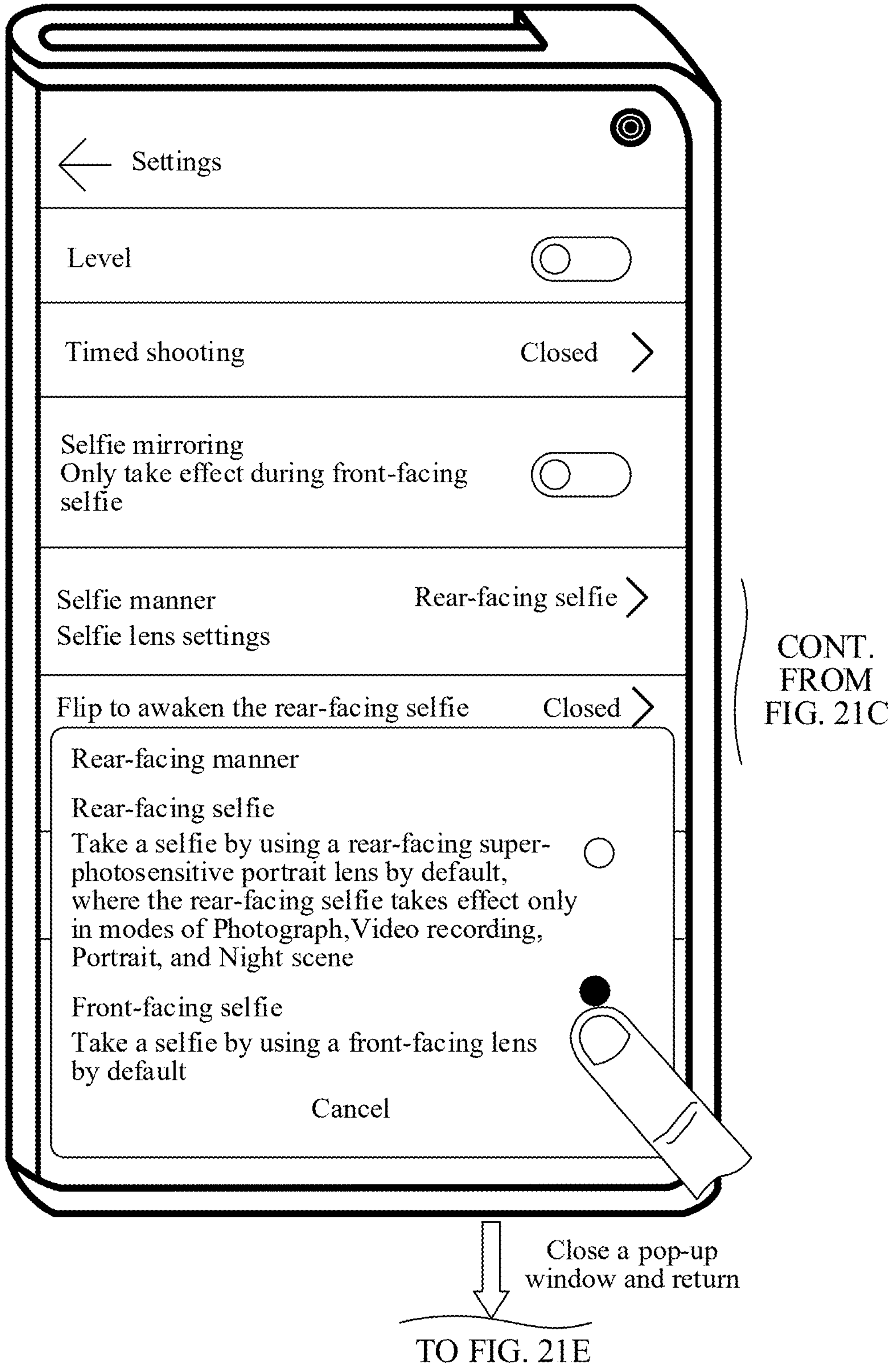

The selfie-manner selection pop-up window 2303 (which is also referred to as a first pop-up window) includes a rear-facing selfie option 2313 and a front-facing selfie option 2323. The rear-facing selfie option 2313 is currently selected. The user may tap the front-facing selfie option 2323, to select to take a selfie by using the front-facing camera by default. As shown in FIG. 21D, in response to the operation of the user, the foldable mobile phone displays an interface 2304 (which is also referred to as a third photographing preview interface).

Figures 21D, 21E:
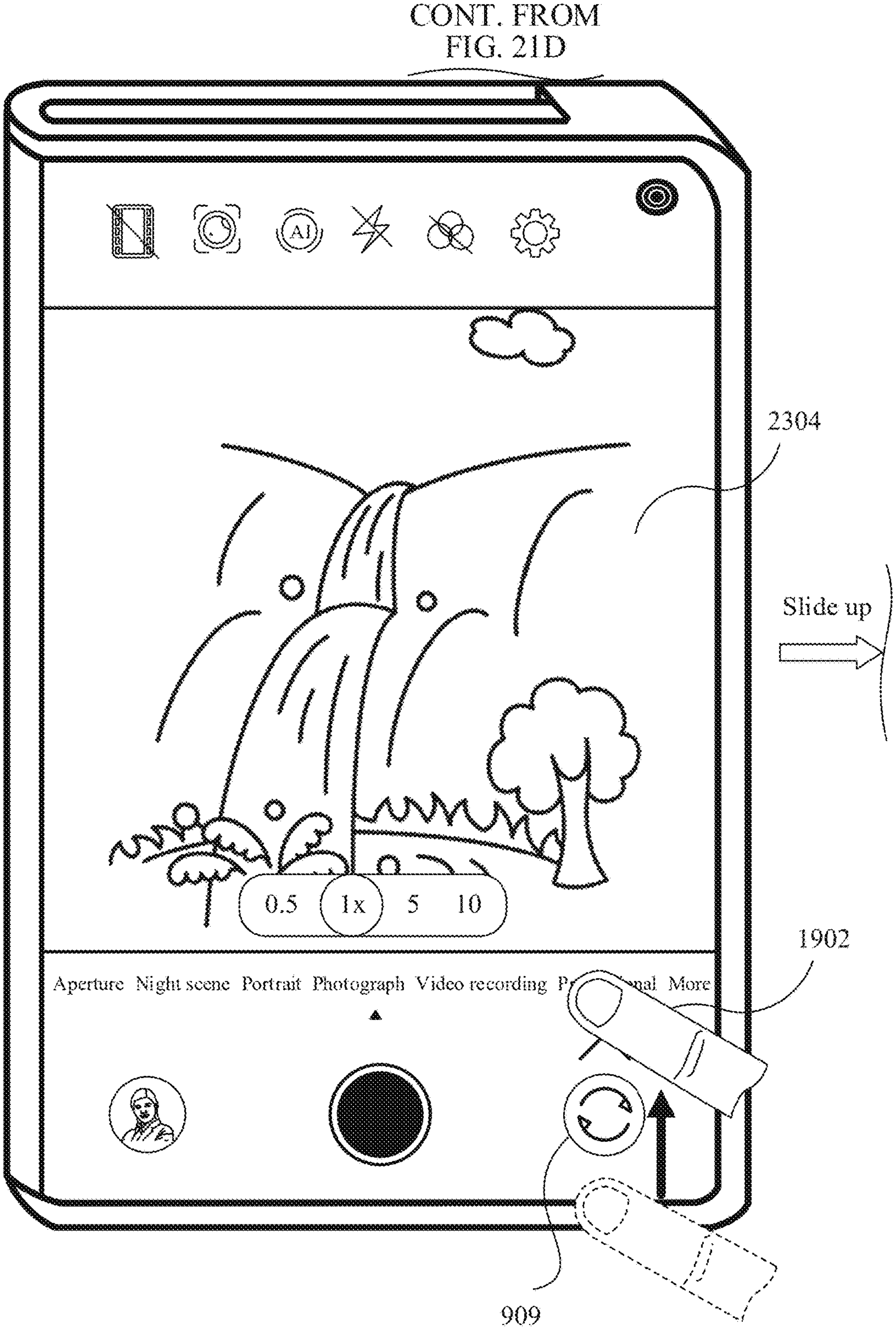

Then, the user closes the selfie-manner selection pop-up window 2303, and exits the camera setting interface 2301. In response to the operation of the user, the foldable mobile phone displays a photographing preview interface 2304 by using the home screen, as shown in FIG. 21E. The photographing preview interface includes the image obtained by using the rear-facing camera, and includes the camera flipping control 909. The arrow identifier 1902 may be displayed above the camera flipping control 909.

Figure 21F:
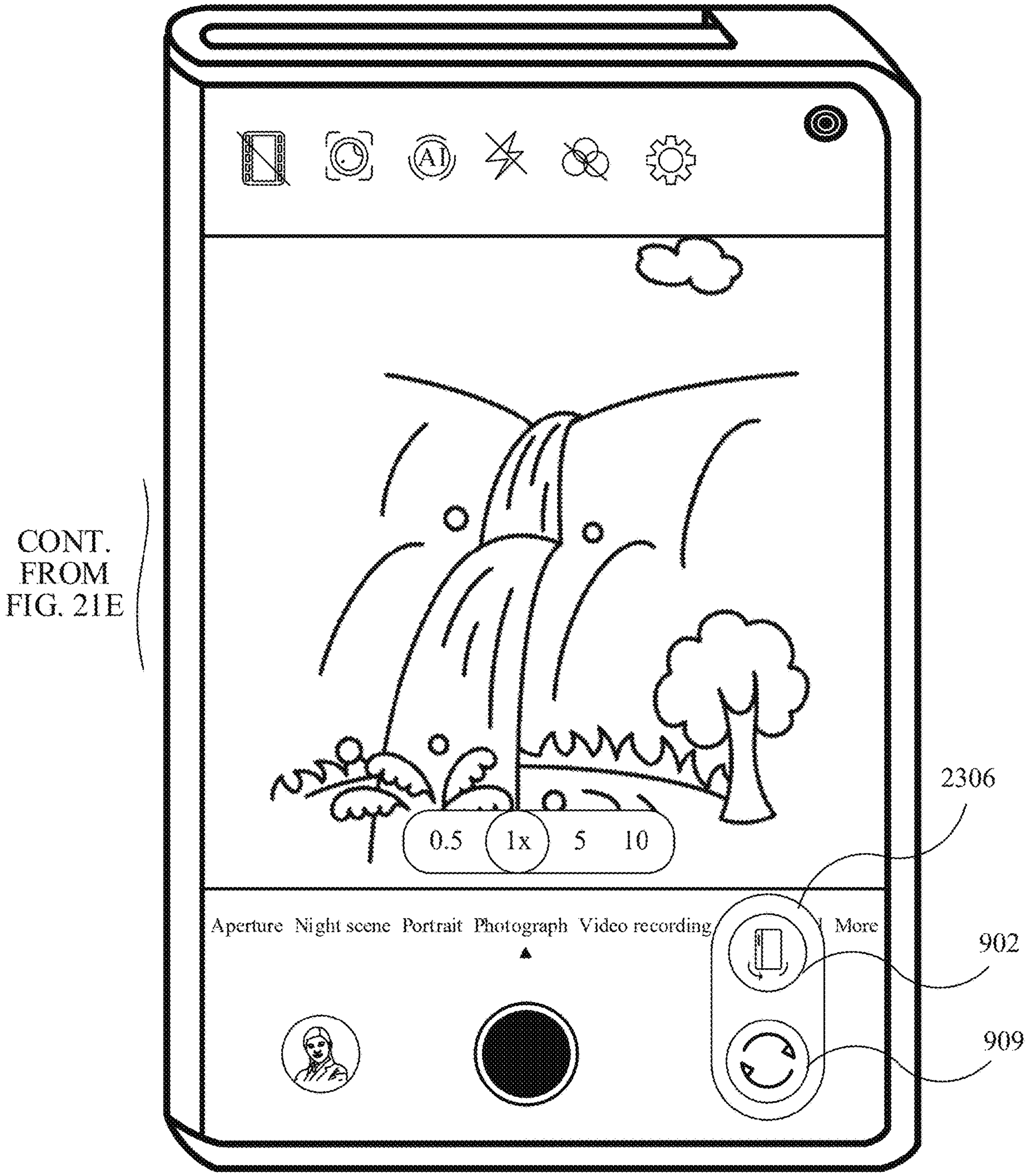

Optionally, the user may tap the arrow identifier 1902, or slide upward at the camera flipping control 909. In response to the operation of the user, the foldable mobile phone displays a capsule 2306 in a region in which the camera flipping control 909 is originally located, as shown in FIG. 21F. Similar to FIG. 9B, the capsule 2306 includes the rear-facing selfie control 902 and the camera flipping control 909. Different from those in the capsule 1903, display locations of the rear-facing selfie control 902 and the camera flipping control 909 in the capsule are different. In the capsule 1903, the rear-facing selfie control 902 is displayed at the bottom, and the camera flipping control 909 is displayed on the top. However, in this embodiment, in the capsule 2306, the camera flipping control 909 is displayed at the bottom, and the rear-facing selfie control 902 is displayed on the top. In other words, when the rear-facing selfie control 902 is displayed on the photographing preview interface by default, the user may additionally display, through a slide-up operation, the camera flipping control 909 on the interface. When the camera flipping control 909 is displayed on the photographing preview interface by default, the user may additionally display, through a slide up operation, the rear-facing selfie control 902 on the interface.

If the user does not select the control in the capsule 2306 after the capsule 2306 is displayed for preset duration, that is, the user performs no operation on the capsule 2306 within the preset duration, the capsule 2306 is hidden, and the interface is restored to the photographing preview interface 2304.

When the rear-facing selfie function is continuously available, when the camera application is in the front-facing selfie scenario, the photographing preview interface may further include the rear-facing selfie control, so that the user directly taps the rear-facing selfie control to enter the rear-facing selfie function. Descriptions are provided below with reference to the accompanying drawings.

Figure 22A:
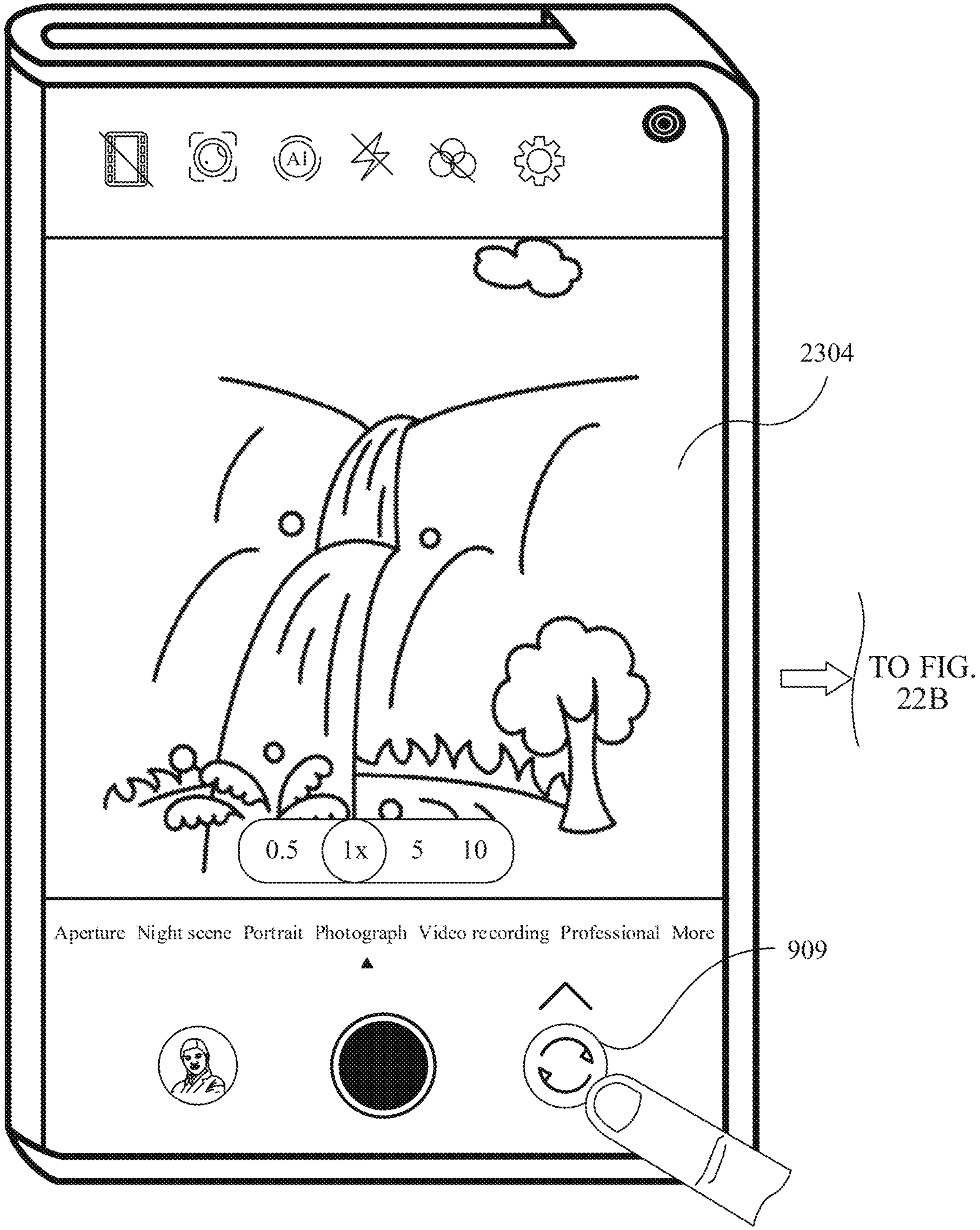
FIG. 22A to FIG. 22D are another schematic diagram of changes of an interface in a process in which a rear-facing selfie function is entered from a front-facing selfie scenario according to an embodiment of this application.

For example, FIG. 22A to FIG. 22D are another schematic diagram of changes of an interface in a process in which a rear-facing selfie function is entered from a front-facing selfie scenario according to an embodiment of this application. As shown in FIG. 22A, the foldable mobile phone is in the folded state, the home screen is in the screen-on state, the sub screen is in the screen-off state, the camera application is started, and the home screen displays the photographing preview interface 2304. The photographing preview interface 2304 includes an image obtained by using the rear-facing camera.

Figure 22B:
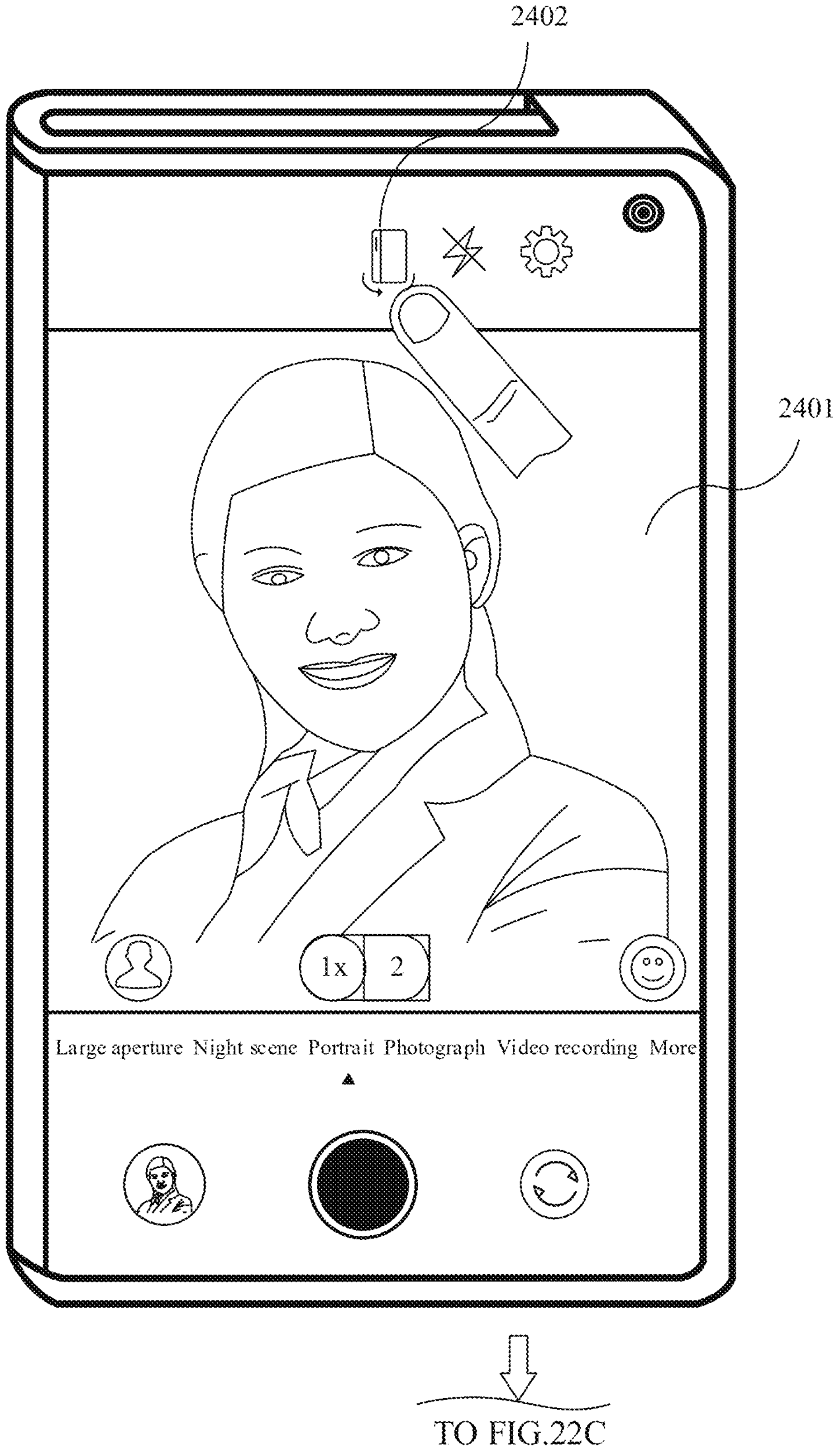

The photographing preview interface 2304 includes the camera flipping control 909. The user taps the camera flipping control 909. In response to the operation of the user, the front-facing selfie scenario is entered, and a photographing preview interface 2401 (which is also referred to as a fourth photographing preview interface) is displayed. The photographing preview interface 2401 includes an image obtained by using the front-facing camera, as shown in FIG. 22B. In addition, the photographing preview interface 2401 further includes a rear-facing selfie control 2402 (which is also referred to as a first control). Optionally, when detecting that the foldable mobile phone is currently in a dark-light environment, the foldable mobile phone may display prompt information at the rear-facing selfie control 2402, to prompt the user to use the rear-facing selfie function. Optionally, the prompt information may be displayed for preset duration in a form such as a bubble. Content of the prompt information may be, for example, "A better effect is achieved when a selfie is taken by using a rear-facing super-photosensitive lens".

Figure 22C:
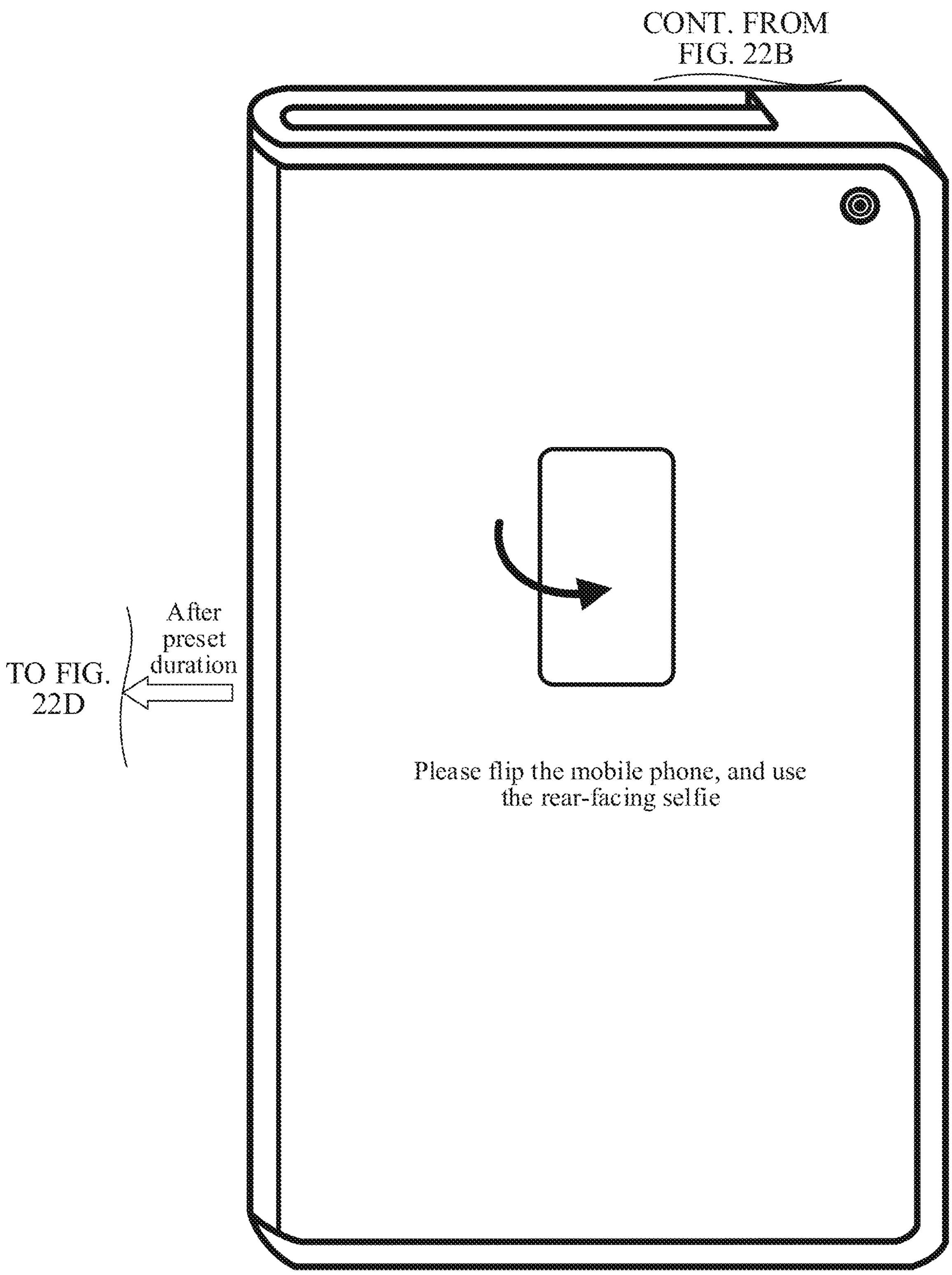

The user taps the rear-facing selfie control 2402 (where this operation is also referred to as a first operation), and the foldable mobile phone displays, in response to the operation of the user, the flipping guidance interface 1105 by using the home screen, as shown in FIG. 22C.

Figure 22D:
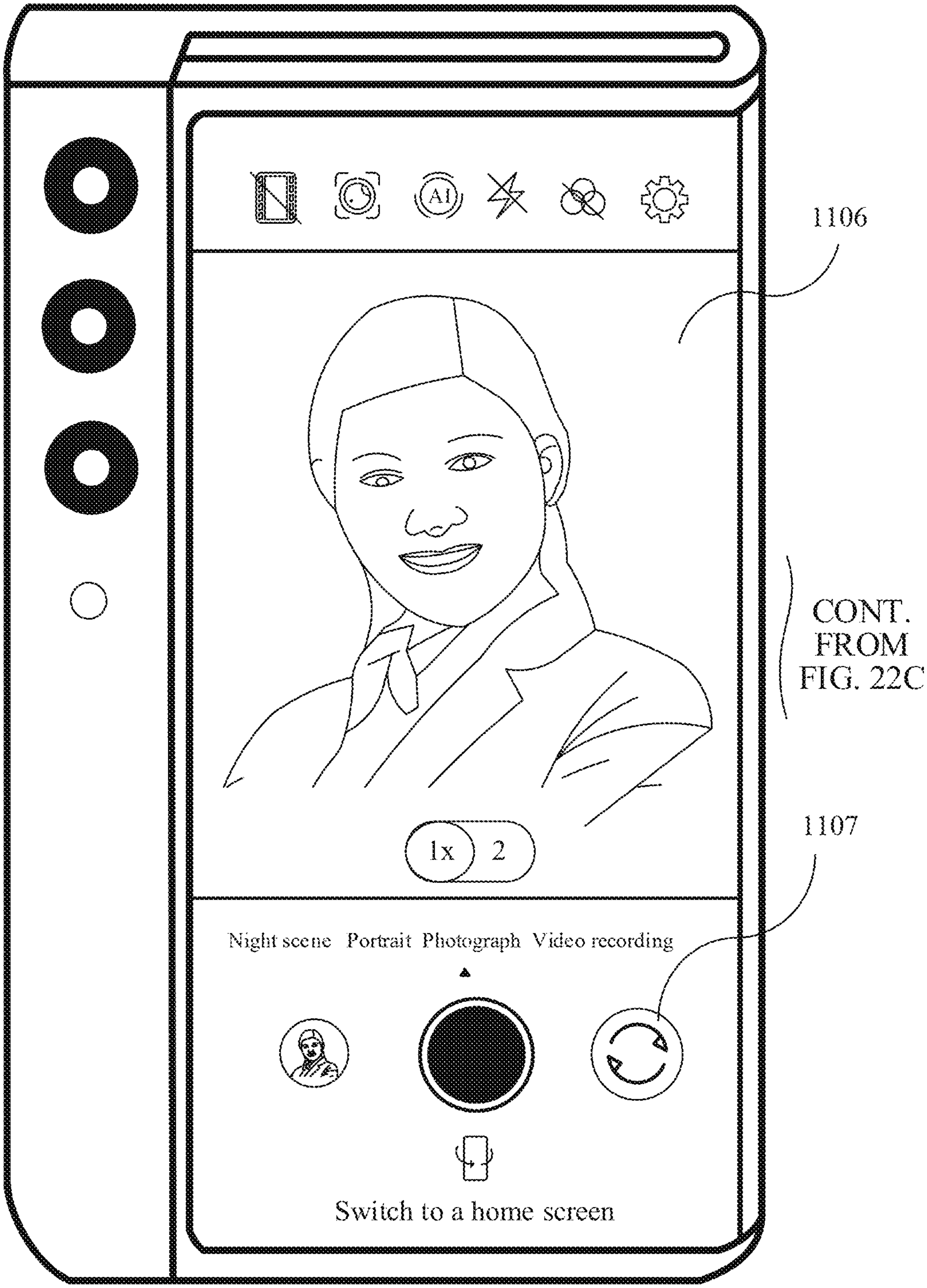

After the flipping guidance interface 1105 is displayed for the preset duration, the camera application enters the rear-facing selfie function. Specifically, as shown in FIG. 22D, the foldable mobile phone turns off the home screen, and controls to turn on the sub screen. Meanwhile, an image is obtained by using the rear-facing camera, and the photographing preview interface 1106 is displayed by using the sub screen. The photographing preview interface 1106 includes the image obtained by the rear-facing camera.

In this embodiment, in the front-facing selfie scenario, the interface includes the rear-facing selfie control, and the user may directly tap the control to enter the rear-facing selfie function, thereby facilitating the user operation, and improving the user experience.

In another embodiment, when the rear-facing selfie function is continuously available, when the foldable mobile phone is in the folded state, the home screen is in the screen-on state, the sub screen is in the screen-off state, the camera application is already started, and the home screen displays the photographing preview interface 2304 shown in FIG. 22A, the user may tap a setting control on the photographing preview interface 2304 to enter the interface shown in FIG. 21B. Then, the user sets the front-end selfie as the default selfie manner according to the operations described in (b), (c), and FIG. 21D. Then, the user closes the selection pop-up window 2303 and exits the camera setting interface 2301, and the foldable mobile phone displays the flipping guidance interface 1105 by using the home screen, as shown in FIG. 22C. After the flipping guidance interface 1105 is displayed for the preset duration, the camera application enters the rear-facing selfie function. Specifically, as shown in FIG. 22D, the foldable mobile phone turns off the home screen, and controls to turn on the sub screen. Meanwhile, an image is obtained by using the rear-facing camera, and the photographing preview interface 1106 is displayed by using the sub screen. The photographing preview interface 1106 includes the image obtained by the rear-facing camera.

When the rear-facing selfie function is continuously available, when the user enters the rear-facing selfie function by using the desktop shortcut menu according to the manner in FIG. 13A to FIG. 13D or FIG. 14A to FIG. 14D, the camera application is started in response to tapping the selfie option 1302 or the selfie shortcut icon 1401 by the user, and a corresponding photographing preview interface is entered based on the default selfie manner set by the user.

It may be understood that, when the rear-facing selfie function is continuously available, a manner of entering the rear-facing selfie function in another scenario is the same as or similar to a case in which the user can set the enabling and disabling of the rear-facing selfie function, and details are not described herein again.

Figure 23A:
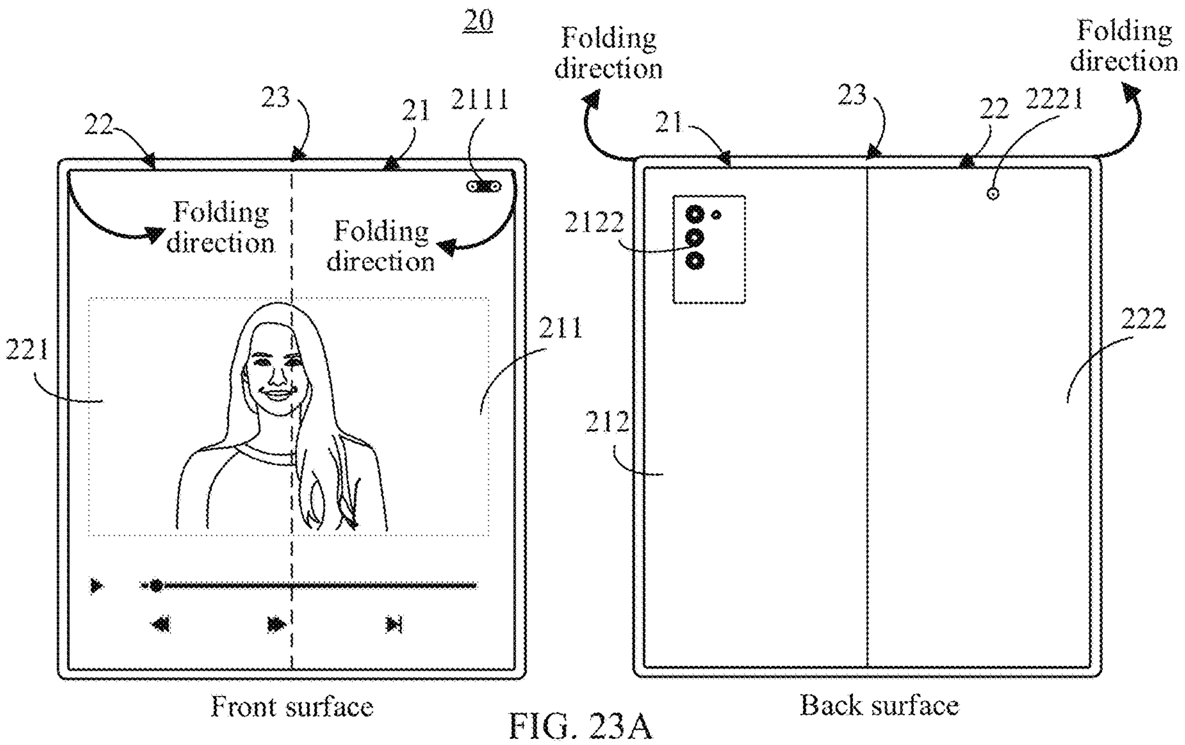
FIG. 23A to FIG. 23C are a schematic diagram of a structure of a foldable mobile phone 20 according to an embodiment of this application.
Figure 23B:
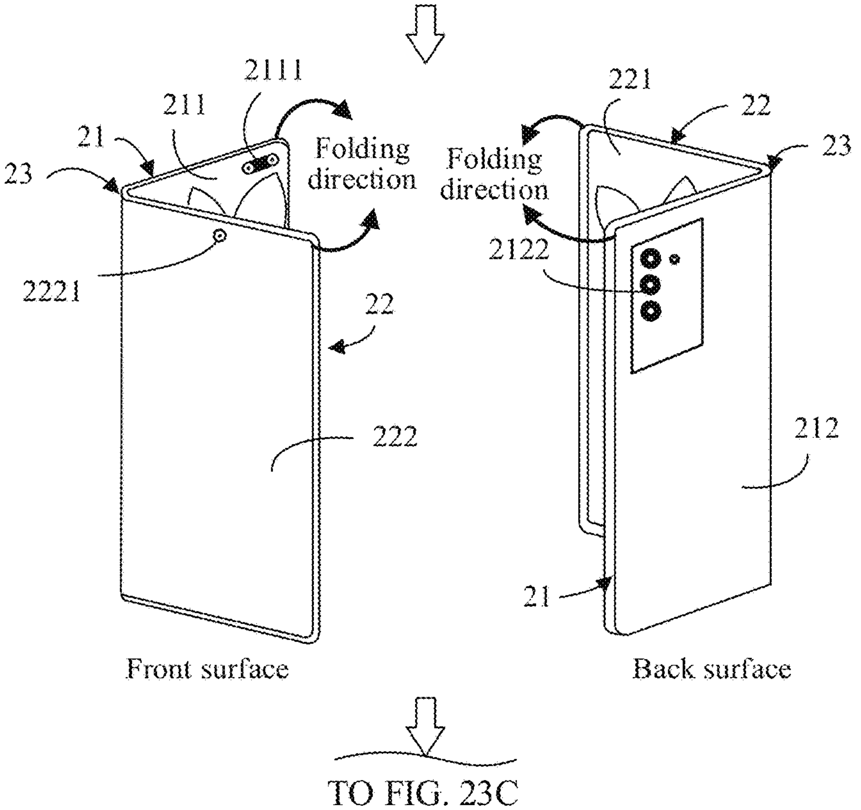
Figure 23C:
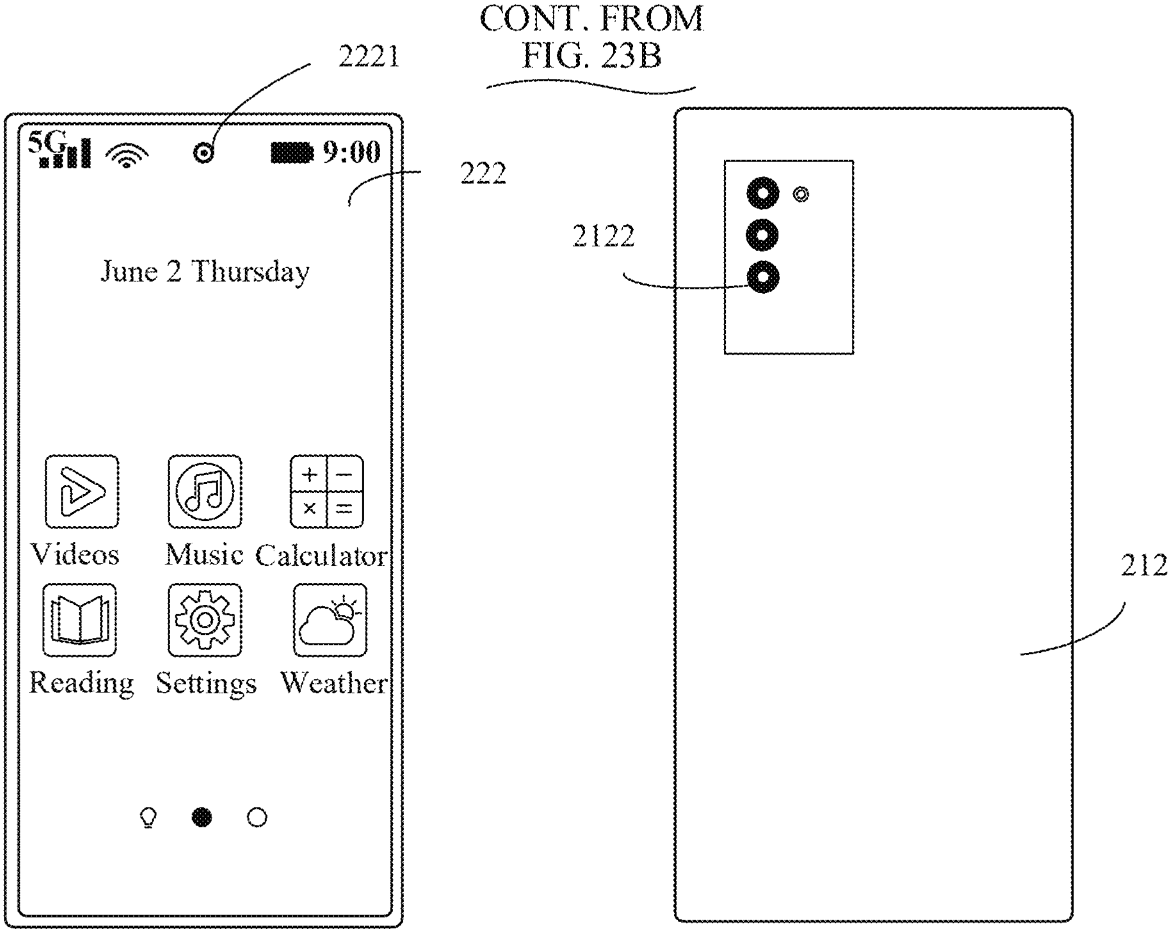

The method provided in this application is described above by using the outward-foldable mobile phone as an example. In some other embodiments, the foregoing method may also be applied to the inward-foldable mobile phone. A structure of the inward-foldable mobile phone is different from that of the outward-foldable mobile phone. For example, FIG. 23A to FIG. 23C are a schematic diagram of a structure of a foldable mobile phone 20 according to an embodiment of this application. The foldable mobile phone 20 is an inward-foldable mobile phone. As shown in FIG. 23A to FIG. 23C, the foldable mobile phone 20 includes a first structural member 21, a second structural member 22, and a connection assembly 23 (which is located at a position shown by a dashed line in FIG. 23A) connecting the first structural member 21 and the second structural member 22. The first structural member 21 and the second structural member 22 are flipped and folded by using the connection assembly 23.

The first structural member 21 may include a first inner display screen 211 and a back housing 212. A first front-facing camera 2111 is disposed on the first inner display screen 211. A first back housing 212 is disposed at a back of the first inner display screen 211. A rear-facing camera 2122 may be disposed on the back housing 212.

The second structural member 12 may include a second inner display screen 221 and an outer display screen 222. The second inner display screen 221 is disposed opposite to the outer display screen 222. A second front-facing camera 2221 may be disposed on the outer display screen 222.

During use, an angle between the first structural member 21 and the second structural member 22 is changed by using the connection assembly 23, to implement a plurality of states of the foldable mobile phone 20. It may be understood that the second inner display screen 221 and the first inner display screen 211 may actually be an integrally formed flexible display screen (that is, a foldable screen, which is also referred to as an inner display screen of the inward-foldable mobile phone). When the foldable mobile phone 20 is folded by using the connection assembly 23, the connection assembly 23 divides the screen into two parts: the second inner display screen 221 and the first inner display screen 211.

As shown in FIG. 23A, when the angle between the first structural member 21 and the second structural member 22 is approximately 180°, the foldable mobile phone 20 is in the unfolded state. In this case, a surface of the first back housing 212 and a surface of the outer display screen 222 are approximately located on a same plane. In this case, the outer display screen 222 and the rear-facing camera 2122 are located on a same side. Surfaces of the first inner display screen 211 and the second inner display screen 221 are approximately located on a same plane. In the unfolded state, a light outlet direction of the outer display screen 222 is opposite to a light inlet direction of the rear-facing camera 2122. In the unfolded state, the outer display screen 222 is in the screen-off state, and the foldable mobile phone 20 simultaneously displays, by using both the first inner display screen 211 and the second inner display screen 221, content that needs to be displayed. It should be noted that, when the outer display screen 222 is in the screen-off state, the outer display screen 222 cannot receive a touch operation of the user.

As shown in FIG. 23B, when the foldable mobile phone 20 is in the unfolded state shown in FIG. 23A, and the first inner display screen 211 and the second inner display screen 221 are simultaneously turned on, the user may gradually fold the foldable mobile phone 20 inward (in a direction shown by an arrow in FIG. 23A), so that the foldable mobile phone 20 enters a bracket state.

When the foldable mobile phone 20 is in the bracket state, if the angle between the first structural member 21 and the second structural member 22 is greater than 45°, the first inner display screen 211 and the second inner display screen 221 are maintained to be simultaneously turned on. When the angle between the first structural member 21 and the second structural member 22 is gradually reduced to approximately 45°, the first inner display screen 211 and the second inner display screen 221 are turned off, and the outer display screen 222 is turned on. The outer display screen 222 displays the content that needs to be displayed. In a subsequent folding process, only the outer display screen 222 is maintained to be turned on until the angle between the first structural member 21 and the second structural member 22 is approximately 0°, and a folded state shown in FIG. 23C is presented.

As shown in FIG. 23C, when the foldable mobile phone 20 is in the folded state, the first inner display screen 211 is at a position opposite to that of the second inner display screen 221, and is folded to the inside, and the outer display screen 222 is located at the outside. In the folded state, the light outlet direction of the outer display screen 222 is the same as the light inlet direction of the rear-facing camera.

When the inward-foldable mobile phone implements the functions described in the foregoing embodiments, a difference from the outward-foldable mobile phone lies in that, when the inward-foldable screen is in the unfolded state, the interface on the home screen when the outward-foldable mobile phone is in the folded state is displayed by using the first inner display screen and the second inner display screen together. After the camera application enters the rear-facing selfie function, the first inner display screen and the second inner display screen are turned off, the outer display screen is turned on, and the photographing preview interface in the rear-facing selfie function is displayed by using the outer display screen. In addition, in the foregoing embodiment, for the inward-foldable screen, the interface change triggered by unfolding the outward-foldable mobile phone to the unfolded state may be triggered by folding the inward-foldable mobile phone to the folded state.

Figure 24A:
FIG. 24A to FIG. 24C are a schematic diagram of changes of an interface when a rear-facing selfie function is entered based on an inward-foldable mobile phone according to an embodiment of this application.
Figures 24A, 24B:
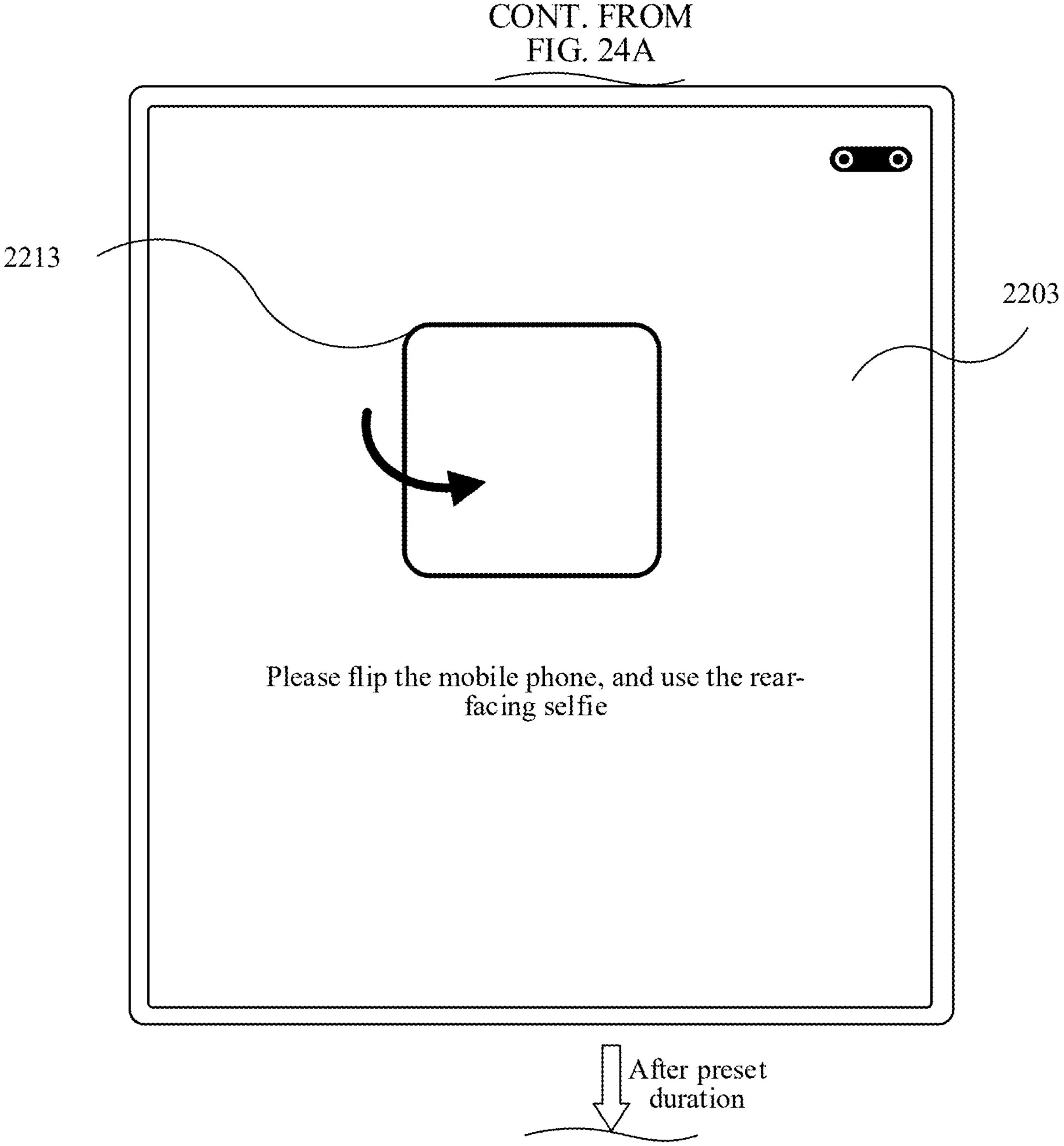
Figures 24B, 24C:
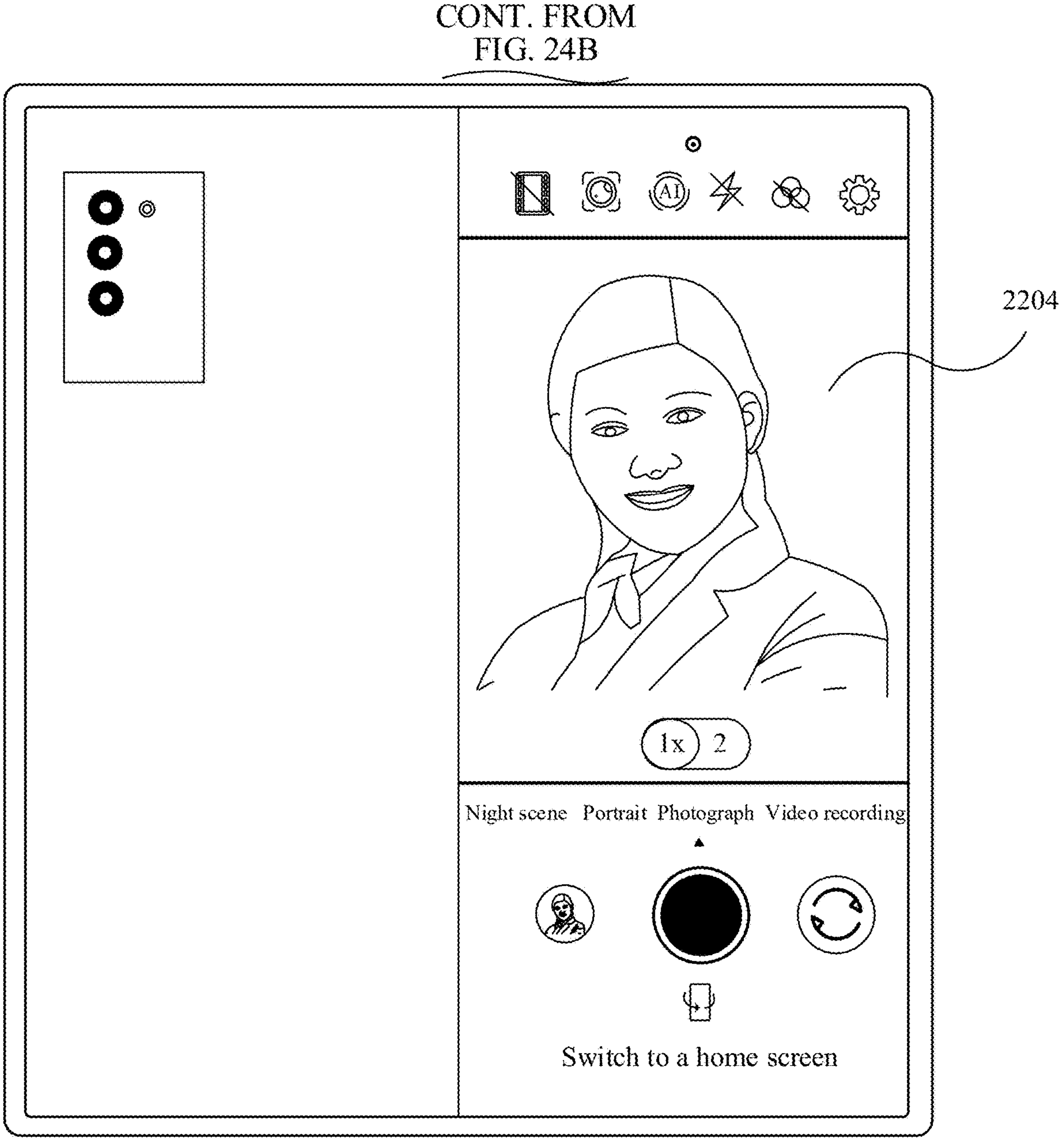

For example, FIG. 24A to FIG. 24C are a schematic diagram of changes of an interface when a rear-facing selfie function is entered based on an inward-foldable mobile phone according to an embodiment of this application. As shown in FIG. 24A, when the foldable (outward-foldable) mobile phone is in the unfolded state, both the first inner display screen and the second inner display screen of the foldable mobile phone are in the screen-on state, the outer display screen is in the screen-off state, and the first inner display screen and the second inner display screen display a photographing preview interface 2205. The photographing preview interface 2205 includes a rear-facing selfie control 2202.

The user taps the rear-facing selfie control 2202. In response to the operation of the user, the foldable mobile phone displays a flipping guidance interface 2203 by using both the first inner display screen and the second inner display screen, as shown in FIG. 24B. Content on the flipping guidance interface 2203 may be similar to that on the flipping guidance interface 1105, and a difference lies in that a structural form of the schematic diagram 2213 of the foldable mobile phone is different.

After the flipping guidance interface 2203 is displayed for preset duration (for example, three seconds), the camera application enters the rear-facing selfie function. Specifically, the first inner display screen and the second inner display screen of the foldable mobile phone are turned off, and the outer display screen is controlled to be turned on. In addition, an image is obtained by using the rear-facing camera, and a photographing preview interface 2204 is displayed by using the outer display screen. The photographing preview interface 2204 includes the image obtained by the rear-facing camera. After the user flips the foldable mobile phone, a surface on which the outer display screen is located (that is, a surface on which the rear-facing camera is located) faces the user, and a surface on which the first inner display screen and the second inner display screen are located faces away from the user. In this way, as shown in FIG. 24C, the photographing preview interface 2204 may display the image (that is, a selfie image) of the user that is obtained by using the rear-facing camera.

An example of the photographing method provided in the embodiments of this application is described above in detail. It may be understood that, to implement the foregoing functions, the electronic device includes corresponding hardware and/or software modules for performing the functions. A person skilled in the art easily realizes that this application may be implemented in hardware or a combination of hardware and computer software with reference to the units and algorithm steps in the examples described in the embodiments disclosed in this specification. Whether a function is implemented by hardware or computer software driving hardware depends upon a particular application and design constraint of the technical solution. A person skilled in the art may use different methods to implement the described functions for each particular application with reference to embodiments, but it should not be considered that the implementation goes beyond the scope of this application.

In the embodiments of this application, division on functional modules of the electronic device may be performed based on the method examples. For example, the functional modules may be correspondingly divided for each function, such as a detection unit, a processing unit, and a display unit, or two or more functions may be integrated in one module. The integrated module may be implemented in a form of hardware or in a form of a software functional module. It should be noted that the division on the modules in the embodiments of this application is illustrative and is merely logical functional division. During actual implementation, there may be another division manner.

It should be noted that all related content of the steps in the foregoing method embodiments may be cited in function descriptions of the corresponding functional modules. Details are not described herein again.

The electronic device provided in this embodiment is configured to perform the foregoing photographing method, and therefore can achieve an effect the same as that of the foregoing implementation method.

When an integrated unit is used, the electronic device may further include a processing module, a storage module, and a communication module. The processing module may be configured to control and manage actions of the electronic device. The storage module may be configured to support the electronic device to execute and store program code, data, and the like. The communication module may be configured to support communication between the electronic device and another device.

The processing module may be a processor or a controller. The processing module may implement or execute various exemplary logical blocks, modules, and circuits described with reference to content disclosed in this application. Alternatively, the processor may be a combination implementing a computing function, for example, a combination of one or more microprocessors, or a combination of a digital signal processor (digital signal processor, DSP) and a microprocessor. The storage module may be a memory. The communication module may be specifically a device that interacts with another electronic device, such as a radio frequency circuit, a Bluetooth chip, or a Wi-Fi chip.

In an embodiment, when the processing module is a processor and the storage module is a memory, the electronic device involved in this embodiment may be a device having the structure shown in FIG. 6.

An embodiment of this application further provides a computer-readable storage medium. The computer-readable storage medium stores a computer program, and when the computer program is executed by a processor, the processor is enabled to perform the photographing method in any one of the foregoing embodiments.

An embodiment of this application further provides a computer program product. When the computer program product runs on a computer, the computer is enabled to perform the foregoing related steps, to implement the photographing method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the photographing method in the foregoing method embodiments.

The electronic device, the computer-readable storage medium, the computer program product, or the chip provided in this embodiment is configured to perform the corresponding method provided above. Therefore, for beneficial effect that can be achieved, refer to the beneficial effect of the corresponding method provided above. Details are not described herein again.

According to the descriptions of the foregoing implementations, a person skilled in the art may learn that for convenience and brief of the descriptions, the descriptions are illustrated with an example of division of the foregoing function modules. In practical application, the foregoing functions may be allocated to and completed by different function modules according to requirements, that is, the internal structure of the apparatus is divided into different function modules, so as to complete all or part of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual coupling or direct coupling or communication connection may be indirect coupling or a communication connection through some interfaces, apparatuses, or units, and may be in an electronic form, a mechanical form, or another form.

The units described as separate parts may or may not be physically separate, and components displayed as units may be one or more physical units, that is, may be located in one position, or may be distributed on a plurality of positions. Some or all of the units may be selected based on an actual requirement to achieve the objectives of the solutions of the embodiments.

In addition, the functional units in the embodiments of this application may be integrated into one processing unit, or each of the units may independently exist physically, or two or more units may be integrated into one unit. The integrated unit may be implemented in a form of hardware or in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technologies, or all or some of the technical solutions may be implemented in a form of a software product. The software product is stored in a storage medium and includes a plurality of instructions for instructing a device (which may be a single-chip microcomputer or a chip) or a processor (processor) to perform all or some of the steps of the methods described in the embodiments of this application. The foregoing storage medium includes any medium that can store program code, such as a USB flash drive, a removable hard disk, a read-only memory (read only memory, ROM), a random access memory (random access memory, RAM), a magnetic disk, or an optical disc.

The foregoing content is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A photographing method, performed by an electronic device, wherein the electronic device comprises a foldable screen, a front-facing camera and a rear-facing camera, the foldable screen comprises a first screen and a second screen, the front-facing camera and the first screen are located on a same side, the rear-facing camera is disposed away from the first screen, the first screen and the second screen are located on a same side when the electronic device is in an unfolded state, the second screen and the rear-facing camera are located on a same side when the electronic device is in a folded state, and the method comprises:

displaying a second photographing preview interface by using the first screen when the electronic device is in the folded state, the first screen is in a screen-on state, and the second screen is in a screen-off state, wherein the second photographing preview interface comprises a first control and an image obtained by using the rear-facing camera; and when receiving a first operation performed by the user on the first control, in response to the first operation, controlling to turn off the first screen and turn on the second screen, and displaying a first photographing preview interface by using the second screen, wherein the first photographing preview interface comprises the image obtained by using the rear-facing camera;

when receiving a second operation performed by the user on the first control, in response to the second operation, additionally displaying a second control on the second photographing preview interface;

in response to tapping the second control by the user, displaying a fourth photographing preview interface by using the first screen, wherein the fourth photographing preview interface comprises the image obtained by using the front-facing camera.

2. The method according to claim 1, wherein the in response to the first operation, controlling to turn off the first screen and turn on the second screen, and displaying a first photographing preview interface by using the second screen comprises:

in response to the first operation, displaying a first flipping guidance interface by using the first screen, wherein the first flipping guidance interface is used to guide the user to flip the electronic device; and after the first flipping guidance interface is displayed for first preset duration, controlling to turn off the first screen and turn on the second screen, and displaying the first photographing preview interface by using the second screen.

3. The method according to claim 2, wherein the second photographing preview interface further comprises guidance information, and the guidance information is used to guide the user to tap the first control.

4. The method according to claim 3, wherein the second photographing preview interface further comprises a setting control, and the method further comprises:

when the second photographing preview interface is displayed on the first screen, in response to a third operation performed by the user on the setting control, displaying a camera setting interface by using the first screen, wherein the camera setting interface comprises a setting option of a selfie manner;

displaying a first pop-up window in response to an operation performed by the user on the setting option, wherein the first pop-up window comprises a front-facing selfie option and a rear-facing selfie option, and the rear-facing selfie option is in a selected state;

in response to an operation performed by the user on the front-facing selfie option, displaying the rear-facing selfie option in an unselected state, and displaying the front-facing selfie option in the selected state; and in response to an operation of closing the first pop-up window and exiting the camera setting interface by the user, displaying a third photographing preview interface by using the first screen, wherein the third photographing preview interface comprises the image obtained by the rear-facing camera and the second control.

5. The method according to claim 4, wherein the fourth photographing preview interface comprises the first control, and the method further comprises:

in response to a fourth operation performed by the user on the first control on the fourth photographing preview interface, displaying the first flipping guidance interface by using the first screen, wherein the first flipping guidance interface is used to guide the user to flip the electronic device; and after the first flipping guidance interface is displayed for the first preset duration, controlling to turn off the first screen and turn on the second screen, and displaying the first photographing preview interface by using the second screen.

6. The method according to claim 5, wherein a photographing mode on the first photographing preview interface is the same as a photographing mode on the second photographing preview interface.

7. The method according to claim 1, wherein before the receiving a first operation of a user, the method further comprises:

displaying a main interface by using the first screen, wherein the main interface comprises an icon of a camera application; and in response to long pressing the icon of the camera application by the user, displaying a first service card by using the first screen, wherein the first service card comprises a selfie option.

8. The method according to claim 1, wherein before the receiving a first operation of a user, the method further comprises:

displaying a main interface by using the first screen, wherein the main interface comprises an icon of a camera application;

in response to tapping the icon of the camera application by the user, displaying a first service card by using the first screen, wherein the first service card comprises a selfie option; and in response to dragging the selfie option to the main interface by the user, displaying, on the main interface, a selfie icon corresponding to the selfie option.

9. The method according to claim 7, wherein the method further comprises:

starting the camera application;

displaying a first flipping guidance interface by using the first screen, wherein the first flipping guidance interface is used to guide the user to flip the electronic device; and after the first flipping guidance interface is displayed for first preset duration, controlling to turn off the first screen and turn on the second screen, and displaying the first photographing preview interface by using the second screen.

10. The method according to claim 9, wherein the method further comprises:

when the first photographing preview interface is displayed on the second screen, in response to a fourth operation performed by the user on the first screen, exiting the camera application to a background;

controlling to turn off the second screen and turn on the first screen;

in response to the fourth operation performed by the user on the first screen, controlling to run the camera application at a foreground, and displaying the first flipping guidance interface by using the first screen;

after the first flipping guidance interface is displayed for the first preset duration, controlling to turn off the first screen and turn on the second screen, and displaying the first photographing preview interface by using the second screen.

11. The method according to claim 1, wherein the first photographing preview interface comprises a third control, the third control comprises a thumbnail, and the method further comprises:

when the first photographing preview interface is displayed on the second screen, in response to tapping the third control by the user, displaying a first interface by using the second screen, wherein the first interface comprises an image corresponding to the thumbnail.

12. The method according to claim 11, wherein the method further comprises:

when the first interface is displayed on the second screen, in response to unfolding the electronic device to the unfolded state by the user, controlling to turn on the first screen, and displaying a second interface by using the first screen and the second screen together, wherein the second interface comprises the image corresponding to the thumbnail.

13. The method according to claim 1, wherein the method further comprises:

when the first photographing preview interface is displayed on the second screen, in response to unfolding the electronic device to the unfolded state by the user, controlling to turn on the first screen, and displaying a fifth photographing preview interface by using the first screen and the second screen together, wherein the fifth photographing preview interface comprises the image obtained by using the rear-facing camera.

14. The method according to claim 1, wherein the first photographing preview interface comprises the second control and a fourth control, and the method further comprises:

when the first photographing preview interface is displayed on the second screen, in response to tapping the fourth control or the second control by the user, displaying a second flipping guidance interface by using the second screen, wherein the second flipping guidance interface is used to guide the user to flip the electronic device; and after the second flipping guidance interface is displayed for second preset duration, controlling to turn off the second screen and turn on the first screen, and displaying the second photographing preview interface by using the first screen, wherein the second photographing preview interface comprises the image obtained by using the rear-facing camera.

15. An electronic device, comprising a processor, a memory, and an interface, the electronic device further comprises a foldable screen, a front-facing camera and a rear-facing camera, the foldable screen comprises a first screen and a second screen, the front-facing camera and the first screen are located on a same side, the rear-facing camera is disposed away from the first screen, the first screen and the second screen are located on a same side when the electronic device is in an unfolded state, the second screen and the rear-facing camera are located on a same side when the electronic device is in a folded state wherein the processor, the memory, and the interface cooperating with each other, to enable the electronic device to perform the following operations:

displaying a second photographing preview interface by using the first screen when the electronic device is in the folded state, the first screen is in a screen-on state, and the second screen is in a screen-off state, wherein the second photographing preview interface comprises a first control and an image obtained by using the rear-facing camera; and when receiving a first operation performed by the user on the first control, in response to the first operation, controlling to turn off the first screen and turn on the second screen, and displaying a first photographing preview interface by using the second screen, wherein the first photographing preview interface comprises the image obtained by using the rear-facing camera;

when receiving a second operation performed by the user on the first control, in response to the second operation, additionally displaying a second control on the second photographing preview interface;

in response to tapping the second control by the user, displaying a fourth photographing preview interface by using the first screen, wherein the fourth photographing preview interface comprises the image obtained by using the front-facing camera.

16. A non-transitory computer-readable storage medium, wherein the computer-readable storage medium stores a computer program, and when the computer program is executed by a processor, the processor is enabled to invoke instructions, to enable electronic device to perform the following operations:

displaying a second photographing preview interface by using a first screen when the electronic device is in a folded state, the first screen is in a screen-on state, and a second screen is in a screen-off state, wherein the electronic device comprises a foldable screen, a front-facing camera and a rear-facing camera, the foldable screen comprises the first screen and the second screen, the front-facing camera and the first screen are located on a same side, the rear-facing camera is disposed away from the first screen, the first screen and the second screen are located on a same side when the electronic device is in an unfolded state, the second screen and the rear-facing camera are located on a same side when the electronic device is in a folded state, the second photographing preview interface comprises a first control and an image obtained by using the rear-facing camera; and when receiving a first operation performed by the user on the first control, in response to the first operation, controlling to turn off the first screen and turn on the second screen, and displaying a first photographing preview interface by using the second screen, wherein the first photographing preview interface comprises the image obtained by using the rear-facing camera;

when receiving a second operation performed by the user on the first control, in response to the second operation, additionally displaying a second control on the second photographing preview interface;

in response to tapping the second control by the user, displaying a fourth photographing preview interface by using the first screen, wherein the fourth photographing preview interface comprises the image obtained by using the front-facing camera.

17. The method according to claim 1, wherein the first operation is a tap operation, the second operation is a slide operation.

18. The electronic device according to claim 15, wherein when the electronic device executes the computer instructions, the electronic device performs the following operations:

in response to the first operation, displaying a first flipping guidance interface by using the first screen, wherein the first flipping guidance interface is used to guide the user to flip the electronic device; and after the first flipping guidance interface is displayed for first preset duration, controlling to turn off the first screen and turn on the second screen, and displaying the first photographing preview interface by using the second screen.

19. The electronic device according to claim 18, wherein when the electronic device executes the computer instructions, the electronic device performs the following operations:

when the second photographing preview interface is displayed on the first screen, in response to a third operation performed by the user on a setting control, displaying a camera setting interface by using the first screen, wherein the camera setting interface comprises a setting option of a selfie manner;

displaying a first pop-up window in response to an operation performed by the user on the setting option, wherein the first pop-up window comprises a front-facing selfie option and a rear-facing selfie option, and the rear-facing selfie option is in a selected state;

in response to an operation performed by the user on the front-facing selfie option, displaying the rear-facing selfie option in an unselected state, and displaying the front-facing selfie option in the selected state; and in response to an operation of closing the first pop-up window and exiting the camera setting interface by the user, displaying a third photographing preview interface by using the first screen, wherein the third photographing preview interface comprises the image obtained by the rear-facing camera and the second control.

20. The electronic device according to claim 19, wherein when the electronic device executes the computer instructions, the electronic device performs the following operations:

in response to a fourth operation performed by the user on the first control on the fourth photographing preview interface, displaying the first flipping guidance interface by using the first screen, wherein the fourth photographing preview interface comprises the first control, and the first flipping guidance interface is used to guide the user to flip the electronic device; and after the first flipping guidance interface is displayed for the first preset duration, controlling to turn off the first screen and turn on the second screen, and displaying the first photographing preview interface by using the second screen.

* * * * *